US007003176B1

(12) United States Patent
Suzuki et al.

(10) Patent No.: US 7,003,176 B1
(45) Date of Patent: Feb. 21, 2006

(54) METHOD, COMPUTER READABLE MEDIUM AND APPARATUS FOR CONVERTING COLOR IMAGE RESOLUTION

(75) Inventors: Hiroaki Suzuki, Ichikawa (JP); Manabu Komatsu, Akabanenishi (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/567,477

(22) Filed: May 8, 2000

(30) Foreign Application Priority Data

| May 6, 1999 | (JP) | ................................. 11-126021 |
| Sep. 29, 1999 | (JP) | ................................. 11-276996 |
| Oct. 18, 1999 | (JP) | ................................. 11-295819 |

(51) Int. Cl.
*G06K 9/32* (2006.01)

(52) U.S. Cl. .................. 382/299; 382/162; 358/1.2; 358/451; 345/3.3; 345/698

(58) Field of Classification Search ........... 382/162, 382/163, 164, 165, 166, 167, 298, 299, 300; 358/1.2, 3.07, 451, 525, 528, 518, 519, 520, 358/521, 522, 523; 345/3.3, 589, 590, 591, 345/592, 593, 594, 595, 596, 597, 598, 599, 345/600, 601, 602, 603, 604, 605, 698

See application file for complete search history.

(56) References Cited

U.S. PATENT DOCUMENTS

| 5,611,023 A | * | 3/1997 | Hanyu .......................... 358/1.9 |
| 5,767,992 A | * | 6/1998 | Tanaka et al. ................ 358/520 |
| 5,875,268 A | * | 2/1999 | Miyake ........................ 382/276 |
| 6,091,519 A | * | 7/2000 | Ito ............................... 358/521 |
| 6,208,767 B1 | * | 3/2001 | Chapin ........................ 382/296 |
| 6,219,454 B1 | * | 4/2001 | Kawano et al. .............. 382/232 |
| 6,366,694 B1 | * | 4/2002 | Acharya ...................... 382/167 |
| 6,441,913 B1 | * | 8/2002 | Anabuki et al. ............. 358/1.12 |
| 6,556,711 B1 | * | 4/2003 | Koga et al. .................. 382/173 |
| 6,621,944 B1 | * | 9/2003 | Takahagi et al. ............ 382/319 |

FOREIGN PATENT DOCUMENTS

| JP | 5-94521 | 4/1993 |
| JP | 6-189116 | 7/1994 |

(Continued)

Primary Examiner—Samir Ahmed
Assistant Examiner—Charles Kim
(74) Attorney, Agent, or Firm—Oblon, Spivak, McClelland, Maier & Neustadt, P.C.

(57) ABSTRACT

A method, computer readable medium and apparatus for converting color image resolution including inputting an image enlarging ratio, inputting target pixel data of an image in a first color space to be enlarged in a sequence, sampling reference pixels including the target pixel and pixels at least one of which links to the target pixel, and converting the reference pixel data into a second color space data. Other functions include extracting image feature quantities from the reference pixel data, selecting one of a plurality of pixel multiplying methods according to the extracted image feature quantities, multiplying the target pixel by the selected image multiplying method with an integer value based on the input image enlarging ratio, and outputting pixel data that have been generated by the target pixel multiplying step in a sequence.

12 Claims, 35 Drawing Sheets

FOREIGN PATENT DOCUMENTS

| | | |
|---|---|---|
| JP | 7-50752 | 2/1995 |
| JP | 7-93563 | 4/1995 |
| JP | 7-105359 | 4/1995 |
| JP | 7-210669 | 8/1995 |
| JP | 7-221976 | 8/1995 |
| JP | 7-221977 | 8/1995 |
| JP | 7-262351 | 10/1995 |
| JP | 10-126609 | 5/1998 |

* cited by examiner

FIG.6

| IMG | | | | | TEMP | | | | | | | |
|---|---|---|---|---|---|---|---|---|---|---|---|---|
| P11 | P12 | P13 | P14 | • • • | • • • | • • • | • • • | • • • | • • • | • • • | • • • | P1K |
| P21 | | | R11 | R12 | R13 | R14 | R15 | | | | | |
| • | | | R21 | R22 | R23 | R24 | R25 | | | | | |
| • | | | R31 | R32 | X | R34 | R35 | | | | | |
| • | | | R41 | R42 | R43 | R44 | R45 | | | | | |
| • | | | R51 | R52 | R53 | R54 | R55 | | | | | |
| • | | | | | | | | | | | | |
| PJ1 | | | | | | | | | | | | PJK |

| R11 | R12 | R13 | R14 | R15 |
|-----|-----|-----|-----|-----|
| R21 | R22 | R23 | R24 | R25 |
| R31 | R32 | X   | R34 | R35 |
| R41 | R42 | R43 | R44 | R45 |
| R51 | R52 | R53 | R54 | R55 |

| R11 | R12 | R13 | R14 | R15 |
|-----|-----|-----|-----|-----|
| R21 | R22 | R23 | R24 | R25 |
| R31 | R32 | X   | R34 | R35 |
| R41 | R42 | R43 | R44 | R45 |
| R51 | R52 | R53 | R54 | R55 |

FROM STEP S18

S21-1: MULTIPLY TARGET PIXEL RED COMPONENT BY MULTIPLIER MR SQUARED

S21-2: MULTIPLY TARGET PIXEL GREEN COMPONENT BY MULTIPLIER MR SQUARED

S21-3: MULTIPLY TARGET PIXEL BLUE COMPONENT BY MULTIPLIER MR SQUARED

TO STEP S20

TARGET PIXEL X → OUTPUT PIXELS

FIG.14
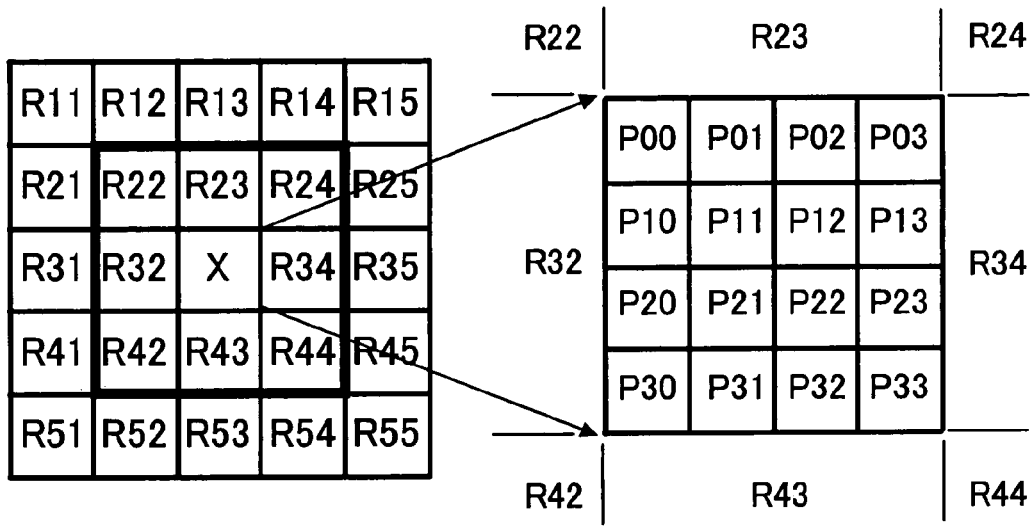
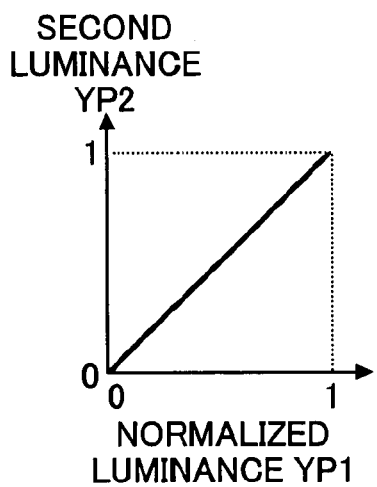
FIG.15A
SECOND LUMINANCE YP2
NORMALIZED LUMINANCE YP1
LUMINANCE RANGE YR IS SMALL
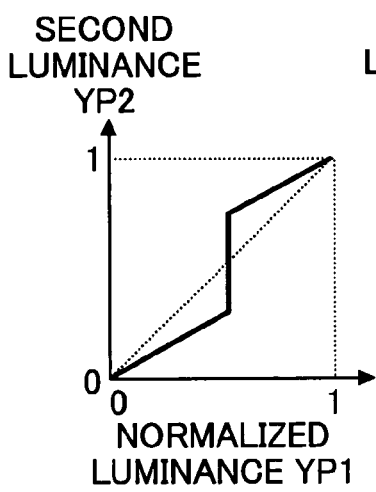
FIG.15B
SECOND LUMINANCE YP2
NORMALIZED LUMINANCE YP1
LUMINANCE RANGE YR IS MEDIUM
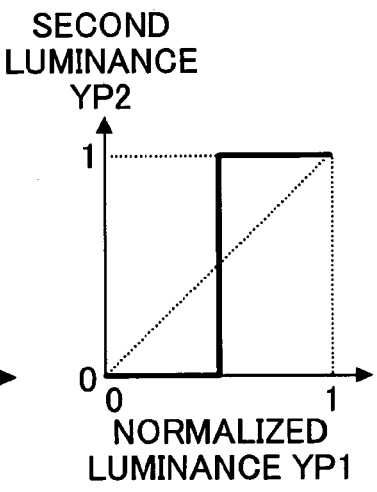
FIG.15C
SECOND LUMINANCE YP2
NORMALIZED LUMINANCE YP1
LUMINANCE RANGE YR IS LARGE

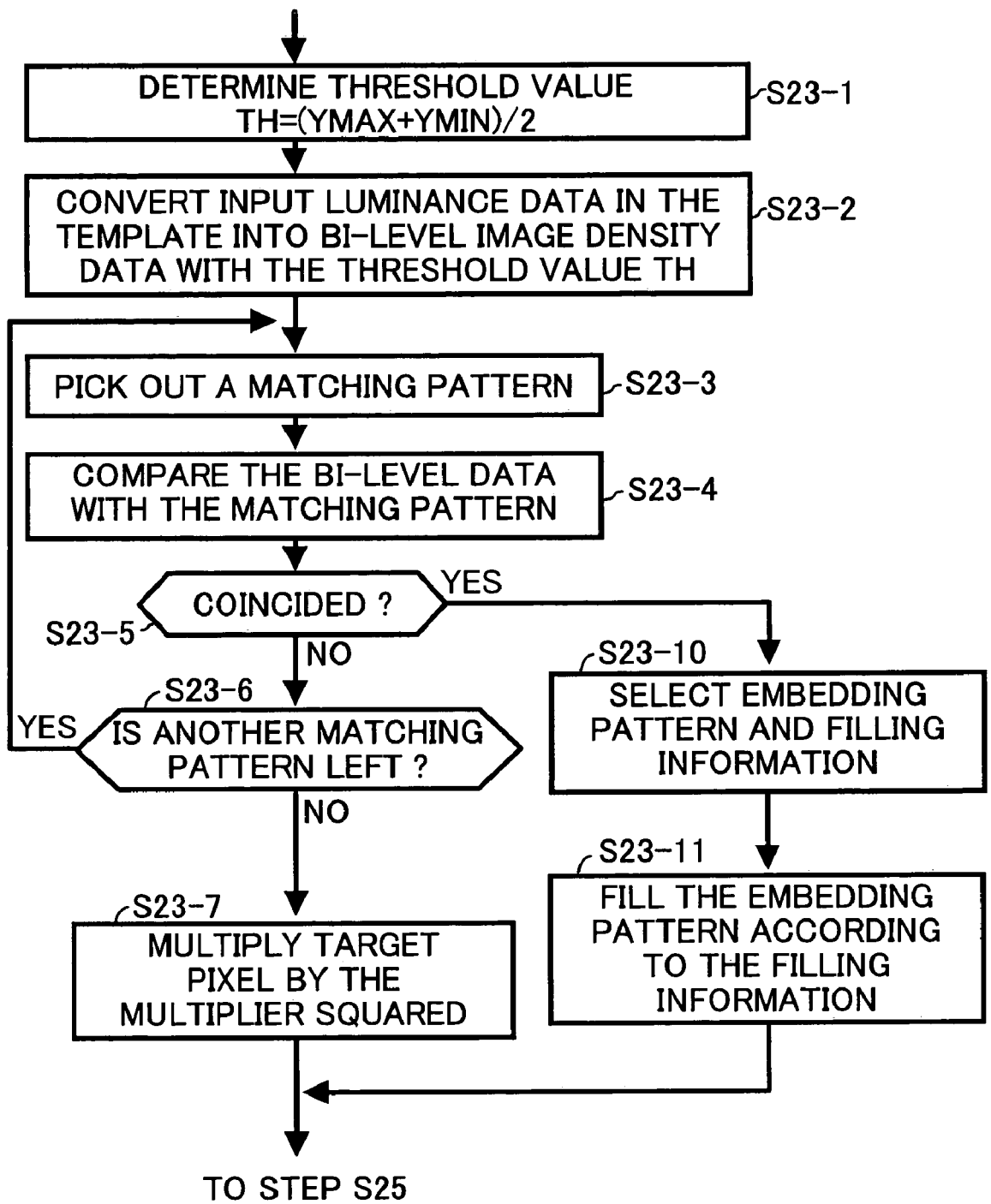

FIG.18A

| 240 | 240 | 240 | 240 | 20 |
|-----|-----|-----|-----|-----|
| 240 | 240 | 240 | 20  | 20 |
| 200 | 200 | 200 | 20  | 20 |
| 20  | 20  | 20  | 20  | 20 |
| 10  | 10  | 10  | 10  | 10 |

FIG.18B

| 0 | 0 | 0 | 0 | 1 |
|---|---|---|---|---|
| 0 | 0 | 0 | 1 | 1 |
| 0 | 0 | 0 | 1 | 1 |
| 1 | 1 | 1 | 1 | 1 |
| 1 | 1 | 1 | 1 | 1 |

FIG.19

| PATTERN INDEX | MATCHING PATTERN | EMBEDDING PATTERN | FILLING INFORMATION | |
|---|---|---|---|---|
| | | | LIGHT PIXEL | DARK PIXEL |
| PATTERN 0 ⋮ | | | | R33 (=X) |
| PATTERN 5 ⋮ | | | R32 | R33 (=X) |
| PATTERN 9 ⋮ | | | R33 (=X) | R34 |

FIG.22
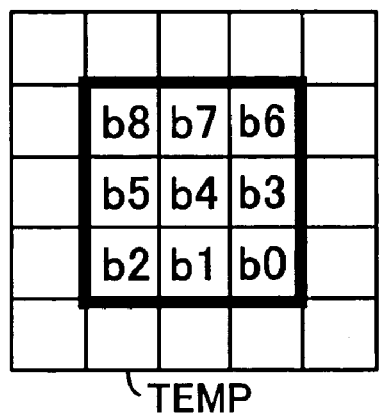
TEMP
FIG.23
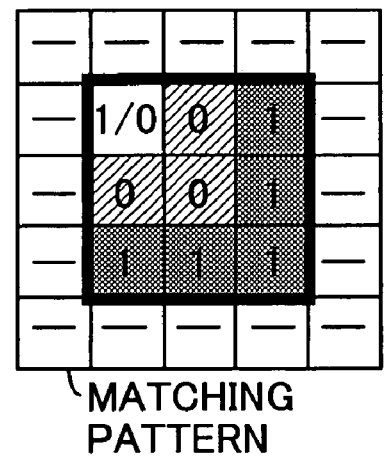
MATCHING PATTERN
FIG.24
| DIVIDED AREA VALUE | PATTERN INDEX |
|---|---|
| ⋮ | ⋮ |
| 79 | PATTERN 9, PATTERN 24 |
| ⋮ | ⋮ |
| 100 | PATTERN 56 |
| ⋮ | ⋮ |

FIG.29A

| 240 | 240 | 240 | 220 | 160 |
|---|---|---|---|---|
| 240 | 200 | 200 | 160 | 160 |
| 200 | 200 | 60 | 60 | 60 |
| 200 | 60 | 60 | 60 | 60 |
| 60 | 60 | 60 | 60 | 60 |

FIG.29B

| 0 | 0 | 0 | 0 | 1 |
|---|---|---|---|---|
| 0 | 0 | 0 | 1 | 1 |
| 0 | 0 | 1 | 1 | 1 |
| 0 | 1 | 1 | 1 | 1 |
| 1 | 1 | 1 | 1 | 1 |

| 0 | 0 | 0 | 0 | 0 |
|---|---|---|---|---|
| 0 | 0 | 0 | 0 | 0 |
| 0 | 0 | 1 | 1 | 1 |
| 0 | 1 | 1 | 1 | 1 |
| 0 | 1 | 1 | 1 | 1 |

TH2=120

METHOD, COMPUTER READABLE MEDIUM AND APPARATUS FOR CONVERTING COLOR IMAGE RESOLUTION

BACKGROUND OF THE INVENTION

1. Field of the Invention

The present invention relates to a method, computer readable medium and apparatus for converting color image resolution, and more particularly relates to a method, computer readable medium and apparatus for converting a relatively low resolution color image having bi-level and multi-level pixel values into a relatively high resolution color image.

2. Discussion of the Background

In general, a digital image displayed on a monitor screen, such as an image of an Internet web page, has relatively low image resolution, for example, 72 dots per inch (dpi). On the other hand, recent color image printers can print images with a relatively high image resolution, such as 400 dpi, 600 dpi, 1200 dpi, etc., as compared to the above-noted digital image displayed on the monitor screen. In other words, a printed image can have more picture elements (pixels) per unit area than an image displayed on a monitor screen. Therefore, when image data displayed on a monitor screen is directly printed on a sheet of paper as a hardcopy by a color image printer, the size of the printed image becomes smaller than that on the monitor screen. To print a hardcopy with a preferable size by capitalizing on a high image resolution capability of color image printers, relatively low resolution image data is converted into relatively high resolution image data.

As another example, an image taken by a digital still camera, or scenes taken by a video camcorder, etc., may also have a low image resolution. Therefore, such images may also need to be converted into relatively high resolution images. In this way, an image printer can print the image substantially in a full paper size. A whole image on a monitor screen generally includes various categories of images, such as text and character strings, text and character strings having shadows, text and character strings processed by a so-called anti-aliasing processing, photographs, illustrations, drawings, etc. Images are also categorized into bi-level data images, such as ordinary text strings and multi-level data images, such as continuous toned photographs.

As described in several Japanese Laid-Open Publications, various methods and devices convert a relatively low resolution image into a relatively high resolution image according to a respective image category. However, the discloses methods and devices do not adequately address converting an image resolution of an image comprising various types of image categories, while reducing jagged images, improper coloring, blurring and doing so with a relatively short execution time for the image conversion.

SUMMARY OF THE INVENTION

The present invention has been made in view of the above-discussed and other problems with previously described methods and devices and to overcome the above-discussed problems related thereto.

Accordingly, an object of the present invention is to provide a novel method, computer readable medium and apparatus for converting a relatively low resolution image into a relatively high resolution image, while reducing jaggedness at an image boundary including a continuous toned color image.

Another object of the present invention is to provide a novel method, computer readable medium and apparatus for converting a relatively low resolution image into a relatively high resolution image with a relatively short image conversion time.

Another object of the present invention is to provide a novel method, computer readable medium and apparatus for converting a relatively low resolution image into a relatively high resolution image, while reducing improper coloring and blurring at an image boundary.

To achieve the above and other objects, the present invention provides a novel method, computer readable medium and apparatus for converting color image resolution including inputting an image enlarging ratio, inputting target pixel data of an image in a first color space to be enlarged in a sequence, sampling reference pixels including the target pixel and pixels at least one of which links to the target pixel, and converting the reference pixel data into a second color space data. Other aspects of the present invention provide a novel method, computer readable medium and apparatus for converting color image resolution including extracting image feature quantities from the reference pixel data, selecting one of a plurality of pixel multiplying methods according to the extracted image feature quantities, multiplying the target pixel by the selected image multiplying method with an integer value based on the input image enlarging ratio, and outputting pixel data that have been generated by the target pixel multiplying step in a sequence.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is an illustration of an exemplary distribution of input image pixels and a sampling template;

FIG. 14 is an illustration of input pixels and output pixels generated by the second pixel multiplying method of FIG. 13;

FIG. 15A, FIG. 15B and FIG. 15C are illustrations of examples of luminance converting characteristics used in a second pixel multiplying method of FIG. 1;

FIG. 17 is a flowchart illustrating operational steps for practicing a third pixel multiplying method of FIG. 1 according to the present invention;

FIG. 18A is an illustration of exemplary input reference pixel data;

FIG. 18B is an illustration of bi-level pixel data converted from the input pixel data of FIG. 18A according to the present invention;

FIG. 19 is an illustration of a table of pattern indexes, matching patterns, embedding patterns and filling information according to the present invention;

FIG. 22 is an illustration of a divided area of a template according to the present invention;

FIG. 23 is an illustration of a divided area of a matching pattern according to the present invention;

FIG. 24 is an illustration of a table of divided area values and pattern indexes according to the present invention;

FIG. 29A is an illustration of exemplary input pixel data;

FIG. 29B is an illustration of bi-level data converted from the input pixel data of FIG. 29A with a first threshold value TH1 according to the present invention;

FIG. 29C is an illustration of bi-level data converted from the input pixel data of FIG. 29A with a second threshold value TH2 according to the present invention;

DESCRIPTION OF THE PREFERRED EMBODIMENTS

Figure 1:
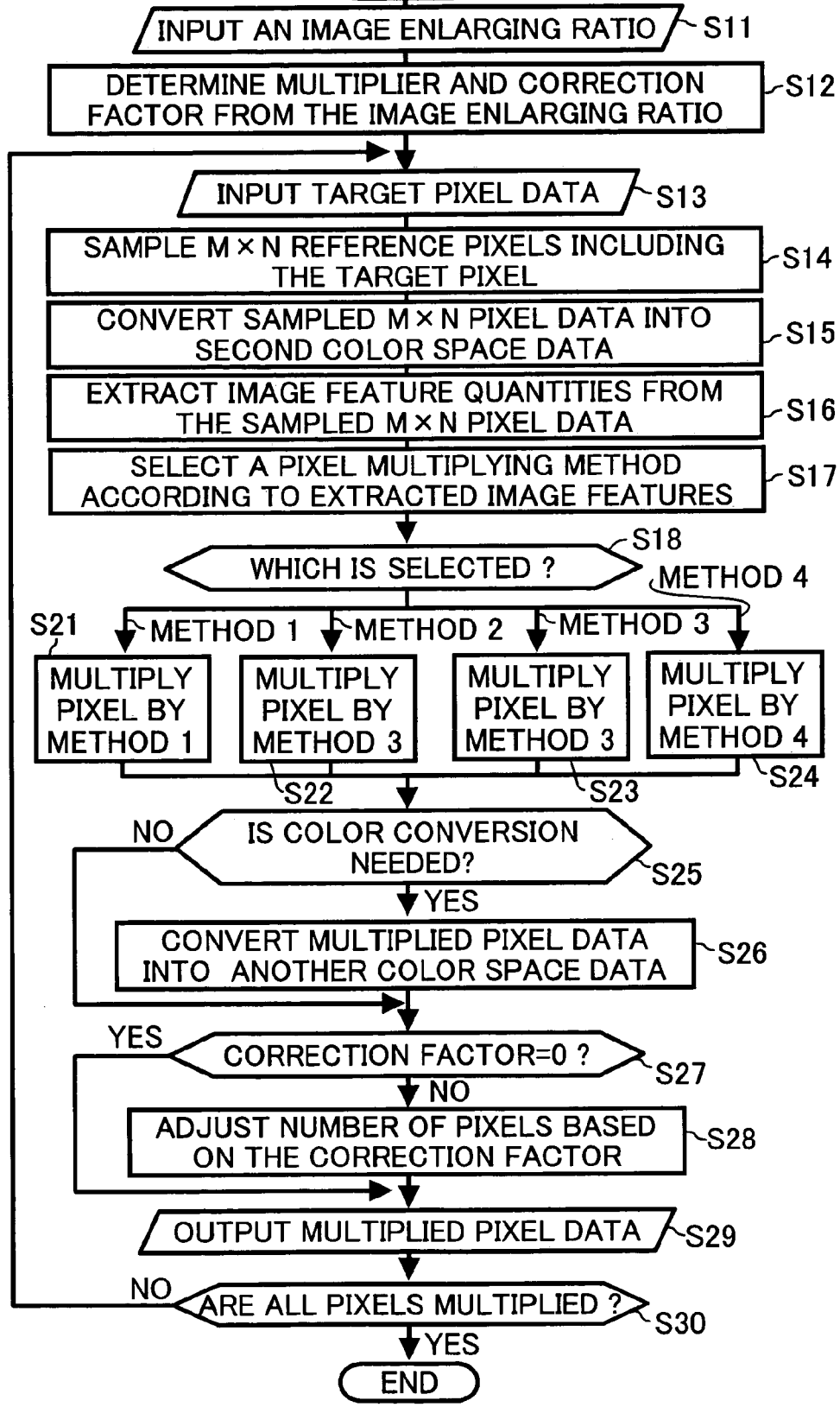
FIG. 1 is a flowchart illustrating operational steps for practicing an exemplary color image resolution converting method according to the present invention.

Referring now to the drawings, wherein like reference numerals designate identical or corresponding parts throughout the several views, and more particularly to FIG. 1 thereof, is shown as an exemplary color image resolution converting method according to the present invention. The present exemplary method converts image resolution for various types of images, such as plain single color images (e.g., a background of text strings), full color images (e.g., photographs), binary text strings and drawings, anti-alias processed text strings and drawings, text strings and drawings having shadows, continuous toned text strings, continuous toned graphic images, half toned graphic images, etc.

In the present invention, the term image enlargement refers to multiplying or increasing the number of pixels in an input image, and thereby generating an image having a larger number of pixels. A term enlarging ratio (ER) or image enlarging ratio refers to a ratio of the number of pixels of a generated image to the number of pixels of an input image in a horizontal direction, or a ratio of the number of pixels of the generated image to the number of pixels of the input image in a vertical direction.

For example, an image on a 17-inch monitor screen having horizontally 1024 pixels and vertically 768 pixels may be printed on a letter sized (i.e., 11 inches by 8.5 inches) paper as a hardcopy using a 600 dpi color laser printer. In this case, the letter size hardcopy can have horizontally 6600 pixels at most and vertically 5100 pixels at most. Therefore, a horizontal enlarging ratio ER can be 6.4453 (i.e., 6600/1024) at most and a vertical enlarging ratio ER can be 6.6406 (i.e., 5100/768) at most. In general, it is desirable that the horizontal enlarging ratio ER and the vertical enlarging ratio ER be identical to each other to avoid, in many cases, a distortion of the hardcopy image. Further, a white margin is often preferable at the circumference of the paper surrounding the hardcopy image. Therefore, as an example, horizontal and vertical enlarging ratios of 6.4 are preferred for outputting the hardcopy image.

The present image resolution converting method is also applicable for converting an image resolution of a conventional monitor screen to an image resolution suitable for a high definition monitor screen. In this case, a smaller horizontal and vertical image enlarging ratio ER, such as a ratio 2.4, may be used as compared to the above-described value for printing. The present exemplary image resolution converting method includes four different types of pixel multiplying methods and an optional pixel adjustment method. The four pixel multiplying methods multiply the number of pixels in an original image by an integer multiple number to generate the enlarged image. The pixel adjustment method adjusts the pixels of multiplied image based on a fraction part of an input enlarging ratio ER. When an input enlargement ratio is defined by only an integer value (i.e., the fraction part of the input enlargement ratio is zero), the optional pixel adjustment operation typically is not needed.

Pixels constructing a page image data, such as a monitor screen data, a shot of a digital still camera, etc., are sequentially input pixel-by-pixel. Every input pixel is categorized as belonging to one of four types of images. Then, the input pixel is adaptively multiplied using one of the four pixel multiplying methods according to the determined category. When all of the pixels of the page image data are processed by the above image categorizing step and adaptive pixel multiplying step, the image enlarging process (i.e., image resolution converting process) for the page is completed.

Each of the four pixel multiplying methods is described as follows. Method 1 applies a uniform pixel multiplying method and is customized for plain single color images, such as a background image, graphic images except image boundaries and vicinities thereof, etc. Method 2 applies a bi-directional linear interpolation method as is known in the art for luminance data Y and is customized for full color images, such as photographs, continuous toned text strings, continuous toned graphic images, etc. Method 3 applies a patterned pixel embedding method and is customized for images, such as binary text strings and drawings, etc. Method 4 applies a multiple patterned pixel embedding method and is customized for images, such as anti-alias processed text strings and drawings, text strings and drawings having shadows, etc. The processing performed according to the method, computer readable medium and apparatus according to the present invention will now be described with reference to FIG. 1.

In FIG. 1, initially, per step S11, an image enlarging ratio ER determined as previously described is input. In step S12, a multiplier MR and a correction factor CF are determined based on the input image enlarging ratio ER. The multiplier MR is an integer number, and the correction factor CF is a real number. In step S13, target pixel data of an original image, which is defined in a first color space, is input. As the first color space, for example, a red, green and blue color space may be used. The term target pixel refers to a pixel to be processed by the following image enlarging operation. In step S14, M×N reference pixels including the target pixel X are sampled. In step S15, the sampled M×N reference pixel data are converted into second color space data. As the second color space, for example, luminance data Y, color difference data I and Q may be used.

In step S16, image feature quantities or an amount of image characteristics is extracted from the sampled M×N pixel data. In step S17, one of the four pixel multiplying methods, which is described above, is selected according to the extracted image feature quantities. In step S18, the process branches to the selected pixel multiplying method, i.e., one of methods 1 to 4.

In one of steps S21 to S24, the input target pixel X is multiplied by a square of the multiplier MR (i.e., $MR^2$) by a respective pixel multiplying method. In step S25, the multiplied pixel data is tested as to whether or not color conversion is needed. If it is determined in step S18 that color conversion is needed, in step S26, the multiplied pixel data are optionally converted into another color space data. The color space used for the conversion may be identical with the color space of the image data input in step S13. In step S27, the correction factor CF, which is determined in step S12, is tested as to whether of which value is zero. If it is determined in step S18 that no color conversion is needed, in step S28, an adjustment of the number of pixels based on the correction factor CF is executed. In step S29, the multiplied pixel data are output. In step S30, it is determined whether or not all pixels of the original image have been multiplied. If in step S30 it is determined that all of the pixels have not been multiplied, the process returns to step S13 for further pixel processing as previously described. Accordingly, this processing loop is repeated until all of the pixels contained in the original image data have been processed.

Figure 2:
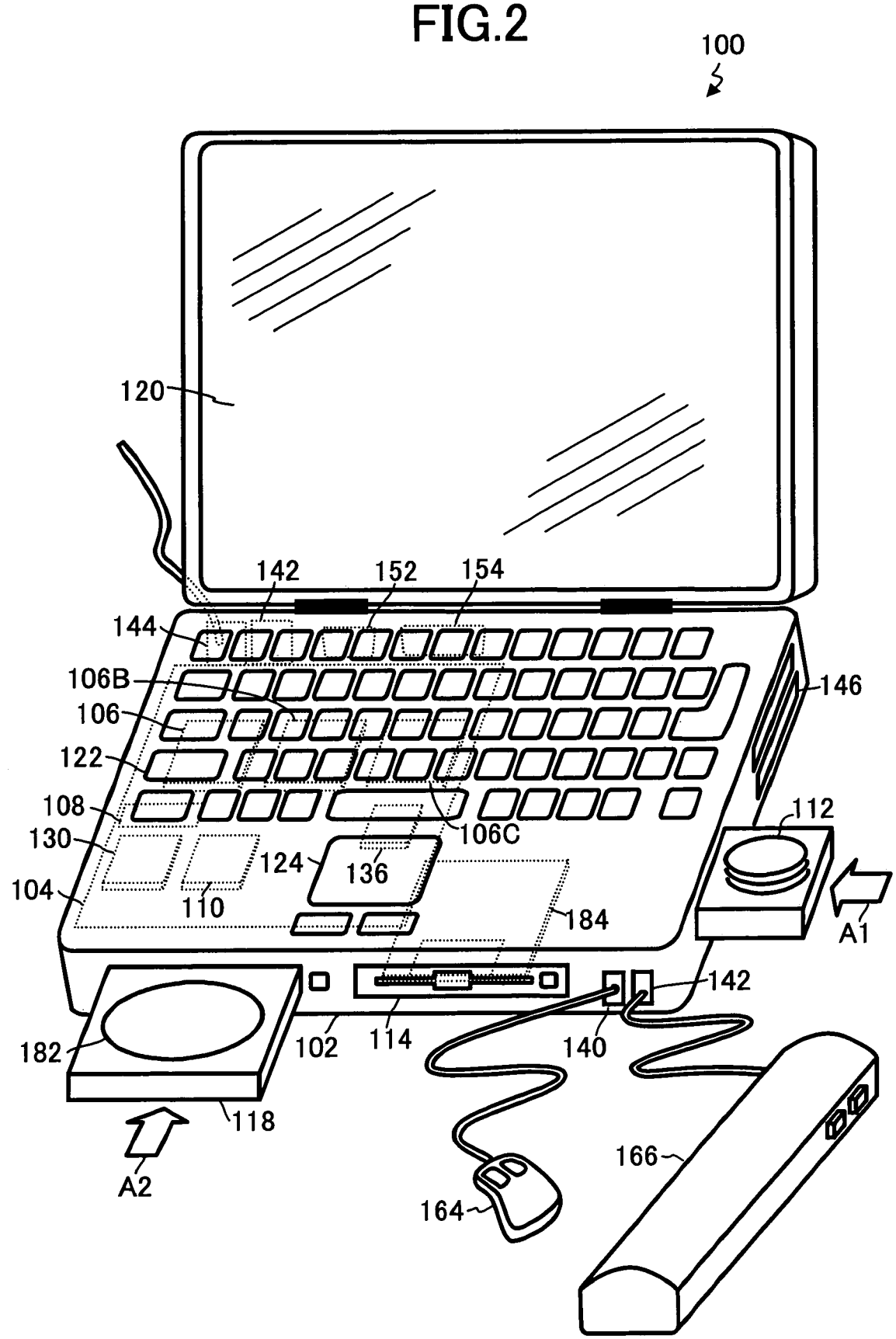
FIG. 2 is a schematic illustration of an exemplary computer system for executing the color image resolution converting method of FIG. 1.

FIG. 2 illustrates an exemplary computer system 100, which may be used to practice the method according to the present invention. Although the exemplary computer system 100 is directed to a lap top computer system, the present invention is applicable to all types of computers systems, such as desk top computers, work stations, etc., as will be appreciated by those skilled in the computer art(s).

Figure 3:
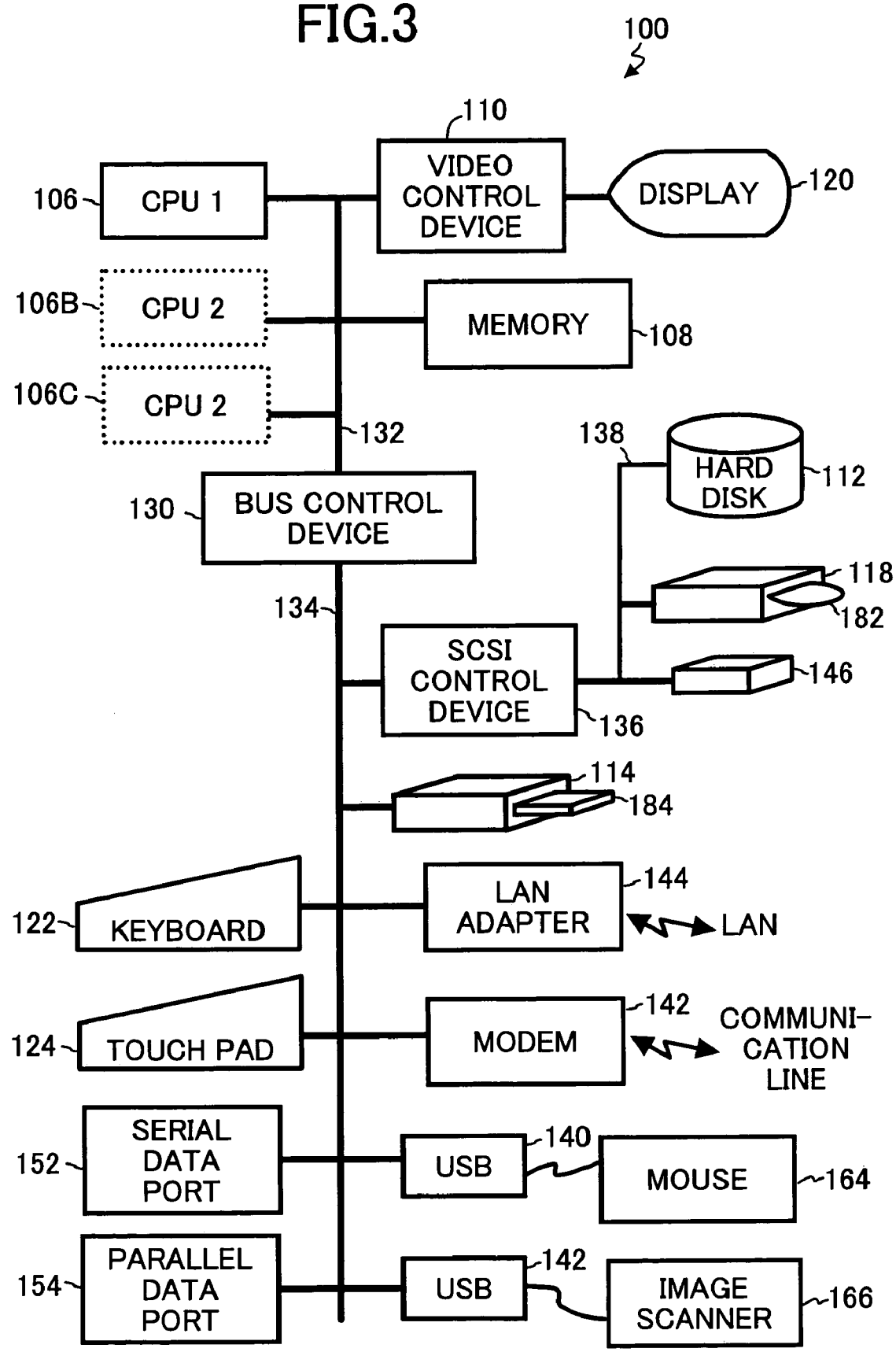
FIG. 3 is a schematic block diagram of the computer system of FIG. 2.

FIG. 3 is a schematic block diagram of the exemplary computer system 100 of FIG. 2 for executing a color image resolution converting method according to exemplary embodiments of the present invention. The computer system 100 implements the method of the present invention, wherein a computer housing 102 (FIG. 2) houses a motherboard 104 (FIG. 2) that contains a CPU 106, a second and a third optional CPUs 106B and 106C, a memory 108 (e.g., DRAM, ROM, EPROM, EEPROM, SRAM, SDRAM, and Flash RAM), and a local bus 132 (FIG. 3). The motherboard 104 also contains a video control device 110 for controlling a monitor 120, a bus control device 130, a PCI bus 134 (FIG. 3), a SCSI control device 136, and a SCSI bus 138 (FIG. 3). The motherboard 104 further contains a serial data port 152, a parallel data port 154 and other optional special purpose logic devices (e.g., ASICs) or configurable logic devices (e.g., GAL and reprogrammable FPGA).

A hard disk drive 112, which is for example removable, a DVD drive 118, and a card adapter 146 are connected to the SCSI bus 138 (FIG. 3). The hard disk drive 112 and the DVD drive 118 are inserted inside the computer housing 102 for use, as shown by arrows A1 and A2 (FIG. 2). A mouse 164 is connected to a USB port 140, and an image scanner 166 is connected to a USB port 142. A keyboard 122, a touch pad 124, a floppy disk drive 114, a LAN adapter 144, and a modem 146 are connected to the PCI bus 134. Also connected to the SCSI bus 138, the USB ports 142 and 143, or other ports, the computer system 100 may additionally include a magneto-optical-disk drive, a tape drive, a compact disc reader/writer drive, a printer, etc. In addition, the computer system 100 may be connected to a network system via the LAN adapter 144 or the modem 146.

As stated above, the system 100 includes at least one computer readable medium. Examples of computer readable medium are hard disks 112, DVD-ROM disks 180, DVD-RAM disks, compact disks, magneto-optical-disks, floppy disks 182, tape, PROMs (EPROM, EEPROM, Flash ROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes a computer program product of the present invention for practicing the color image resolution conversion according to the present invention. The computer code devices of present invention can be any interpreted or executable code mechanism, including but not limited to scripts, interpreters, dynamic link libraries, Java classes, complete executable programs, etc.

Attention is now turned to each of the processing steps of FIG. 1, which will now be described in more detail below. Referring back to FIG. 1, in step S11, the CPU 106 receives an enlarging ratio ER from, for example, the keyboard 122 of FIG. 2. In step S12, the CPU 106 determines a multiplier MR and a correction factor CF from the input enlarging ratio ER for enlarging the input original image in two steps. The CPU 106 first enlarges the input image using the multiplier MR in one of steps S21 to S24, and adjusts the firstly enlarged image according to the correction factor CF in step S28. The adjustment of an image in step S28 is performed by an addition of a pixel to the firstly enlarged image pixels and a deletion of a pixel from the firstly enlarged image pixels.

Figure 4:
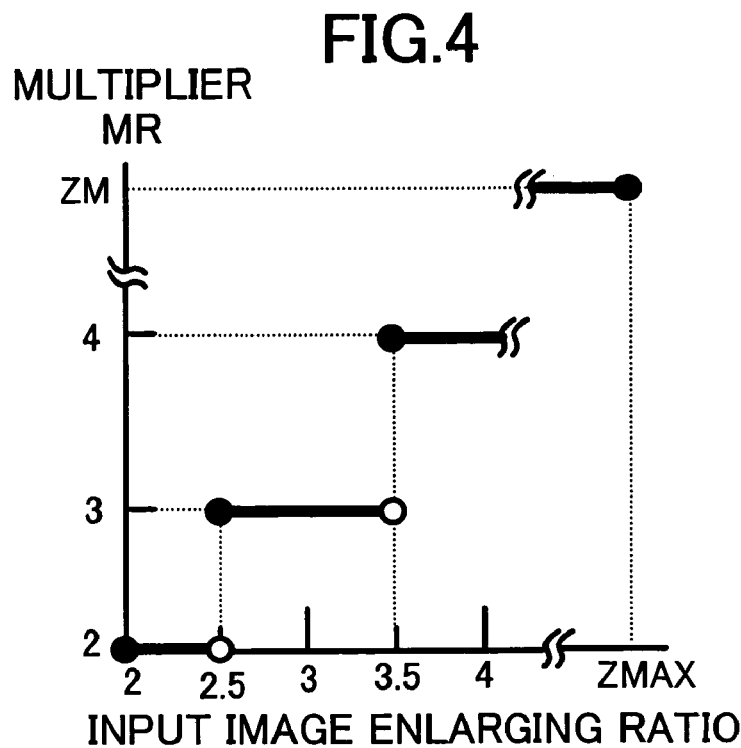
FIG. 4 is a graph illustrating a relationship between an input enlarging ratio (ER) and a multiplier (MR)

FIG. 4 is a graph illustrating a relationship between the input enlarging ratio ER and the multiplier MR. The horizontal axis represents the input enlarging ratio ER and the vertical axis represents the multiplier MR. As seen from FIG. 4, the enlarging ratio ER, for example, varies from a minimum ratio of two to a maximum ratio Z MAX. The multiplier MR varies from two to ZM in an integer stepwise manner. For example, when the input enlarging ratio ER is from two to less than 2.5, the multiplier MR is determined as two. When the input enlarging ratio ER is from 2.5 to less than 3.5, the multiplier MR is determined as three, and so on as shown in FIG. 4.

Figure 5:
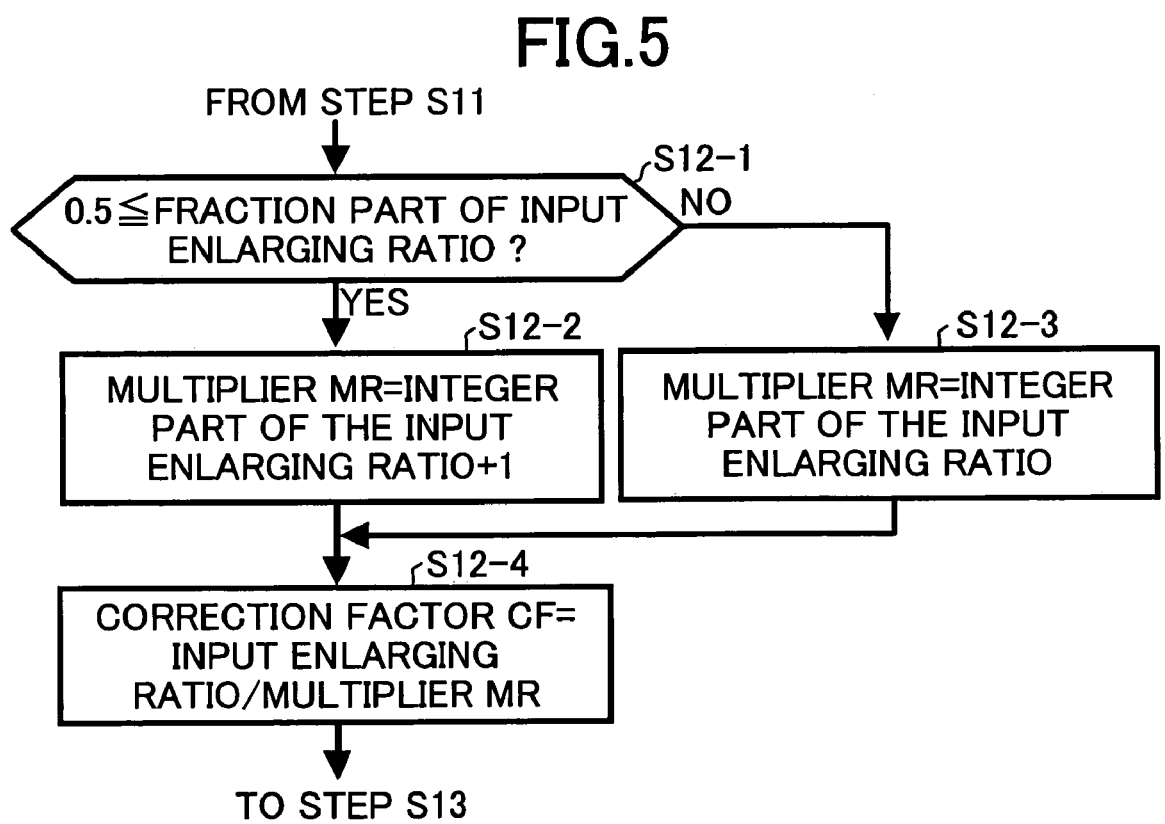
FIG. 5 is a flowchart illustrating operational steps for determining the multiplier (MR) and a correction factor (CF) from the input image enlarging ratio (ER)

FIG. 5 is a flowchart illustrating operational steps for determining the multiplier MR and the correction factor CF from the input image enlarging ratio ER. In step S12-1, the CPU 106 determines whether or not that the fractional part of the input enlarging ratio ER is greater than or equal to 0.5. If in step S12-1 it is determined that the input enlarging ratio ER is greater than or equal to 0.5, the process proceeds to step S12-2. If, however, in step S12-1 it is determined that the input enlarging ratio ER is not greater than or equal to 0.5, the process branches to step S12-3. In step S12-2, the CPU 106 calculates the integer part of the input enlarging ratio ER plus one as the multiplier MR (i.e., MR=Integer part of ER+1). In step S12-3, the CPU 106 extracts the integer part from the input enlarging ratio ER as the multiplier MR (i.e., MR=Integer part of ER). In step S12-4, the CPU 106 calculates a quotient of the input enlarging ratio ER divided by the multiplier MR obtained in step S12-2 or step S12-3 as the correction factor CF (i.e., CF=ER/MR).

Referring back to FIG. 1, in step S13, the CPU 106 receives target pixel data, which is defined in a first color space. In this example, a red, green and blue color space is used as the first color space. The CPU 106 sequentially receives the target pixel data from an original image data file in an internal storage device, such as the hard disk drive 112, the DVD device 118, etc., one after the other. The CPU 106 may also receive the target pixel data from an external device, such as an Internet web server via an external communication device, such as the LAN adapter 144, the modem 146, etc.

In step S14, the CPU 106 samples M×N reference pixels (i.e., M horizontal pixels and N vertical pixels) including the target pixel X. The sampled reference pixels may be temporarily stored, for example, in the memory 108, the hard disk drive 112, etc.

FIG. 6 is an illustration of an exemplary distribution of input image pixels and a sampling template. Referring to FIG. 6, the input image denoted as IMG is structured by K horizontal pixels and J vertical pixels (i.e., a total of K×J pixels). Each of the pixels is denoted as P11, P12, P13, P14, to PJK, respectively. The target pixel X is denoted as X, and the sampling template is illustrated with thick lines and is denoted as TEMP. In this example, the sampling template TEMP can sample 25 reference pixels, which are denoted as R11, R12, R13, to R55 and including the target pixel X. The sampling template TEMP may be replaced with other types of templates, such as a template having 3 horizontal pixels and 3 vertical pixels (i.e., a total of 9 reference pixels), a template having 8 horizontal pixels and 6 vertical pixels (i.e., a total of 48 reference pixels), etc.

As described above, for example, the input pixel data may be defined in the first color space (i.e., the red, green and blue color space) and each of the red data, green data and blue data has 8 bits color density information. In other words, each of the red data, green data and blue data has 256 different color density values (i.e., $2^8$).

Referring back to FIG. 1, in step S15, the CPU 106 converts the sampled M×N reference pixel data in the first color space into a second color space data having a luminance component and color components, such as the National Television System Committee (NTSC) format data. The NTSC format includes luminance data Y and color difference data I and Q. The CPU 106 may achieve the color space conversion from the first color space into the second color space based on the following equations:

$$Y = a00 \times R + a01 \times G + a02 \times B$$

$$I = a10 \times R + a11 \times G + a12 \times B$$

$$Q = a20 \times R + a21 \times G + a22 \times B$$

Where, coefficients a00, a01, a02, a10, a11, a12, a20, a21, and a22 are referred to as color space conversion coefficients. As a numeric example, the following coefficients may be used:

$$Y = 0.30R + 0.59G + 0.11B$$

$$I = 0.60R + 0.28G + 0.32B$$

$$Q = 0.21R + 0.52G + 0.31B$$

The CPU 106 may also convert the sampled M×N reference pixel data into another type of color space, for example, Y, U and V data of the Phase Alternation by Line (PAL) television system; L*, a* and b* of the CIELAB color space system; L*, u* and v* of the CIELUV color space system;

X, Y and Z of the XYZ color space system; HSV color model; HLS color model, etc. As an example, A. Imamiya describes a method of color conversion from the red, green and blue color space into the HSV color model, HLS color model, PAL system, YIQ system, etc., in Computer Graphics issued in Japan on Jul. 15, 1984 on pages 622–629.

In step S16, the CPU 106 extracts image feature quantities or an amount of image characteristics from the sampled M×N reference pixel data. In this example, as the image feature quantities, the CPU 106 extracts image feature quantities, such as the number of colors in the reference pixels, the number of hues of the reference pixels, similarity of hues among the reference pixels, linking information among the reference pixels, etc.

Figure 7:
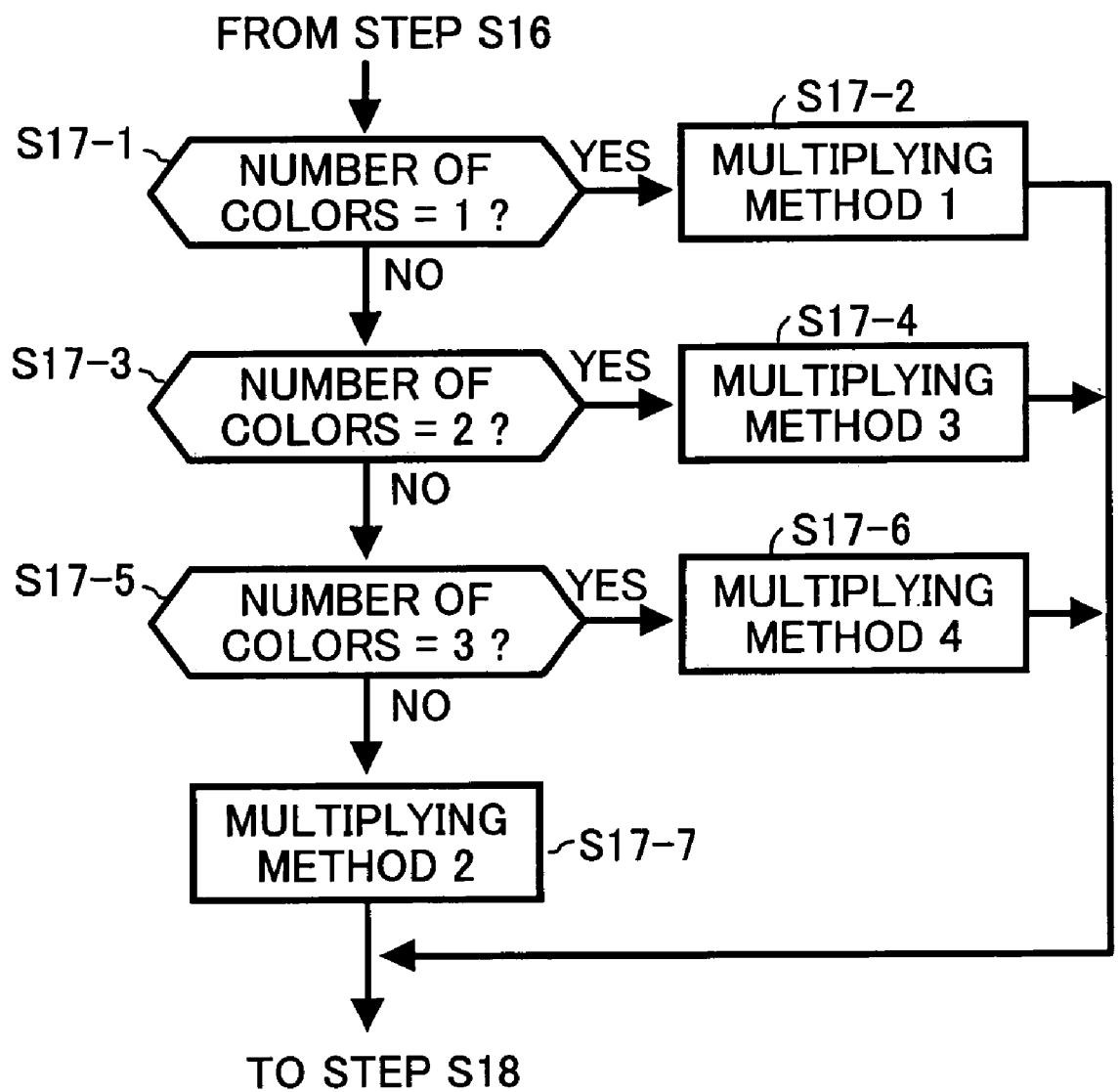
FIG. 7 is a flowchart illustrating first exemplary operational steps for selecting a pixel multiplying method according to the present invention.

In step S117, the CPU 106 selects one of the plural pixel multiplying methods (i.e., the pixel multiplying methods 1 through 4), according to the extracted image feature quantities, for applying the selected multiplying method the target pixel X. FIG. 7 is a flowchart illustrating operational steps for selecting one of the pixel multiplying methods.

With reference to FIG. 7, in step S17-1, the CPU 106 checks whether or not the number of colors of the reference pixels is one. If in step S17-1 it is determined that the number of colors of the reference pixels is one, the process branches to step S17-2 to select the multiplying method 1. If, however, in step S17-1 it is determined that the number of colors of the reference pixels is not one, the process proceeds to step S17-3. In step S17-3, the CPU 106 checks whether or not the number of colors of the reference pixels is two. If in step S17-3 it is determined that the number of colors of the reference pixels is two, the process branches to step S17-4 to select multiplying method 3. If, however, in step S17-3 it is determined that the number of colors of the reference pixels is not two, the process proceeds to step S17-5. In step S17-5, the CPU 106 checks whether or not the number of the colors of the reference pixels is three. If in step S17-5 it is determined that the number of colors of the reference pixels is three, the process branches to step S17-6 to select multiplying method 4. If, however, in step S17-5 it is determined that the number of colors of the reference pixels is not three, the process proceeds to step S17-7. In step S17-7, the CPU 106 selects multiplying method 2.

Figure 8:
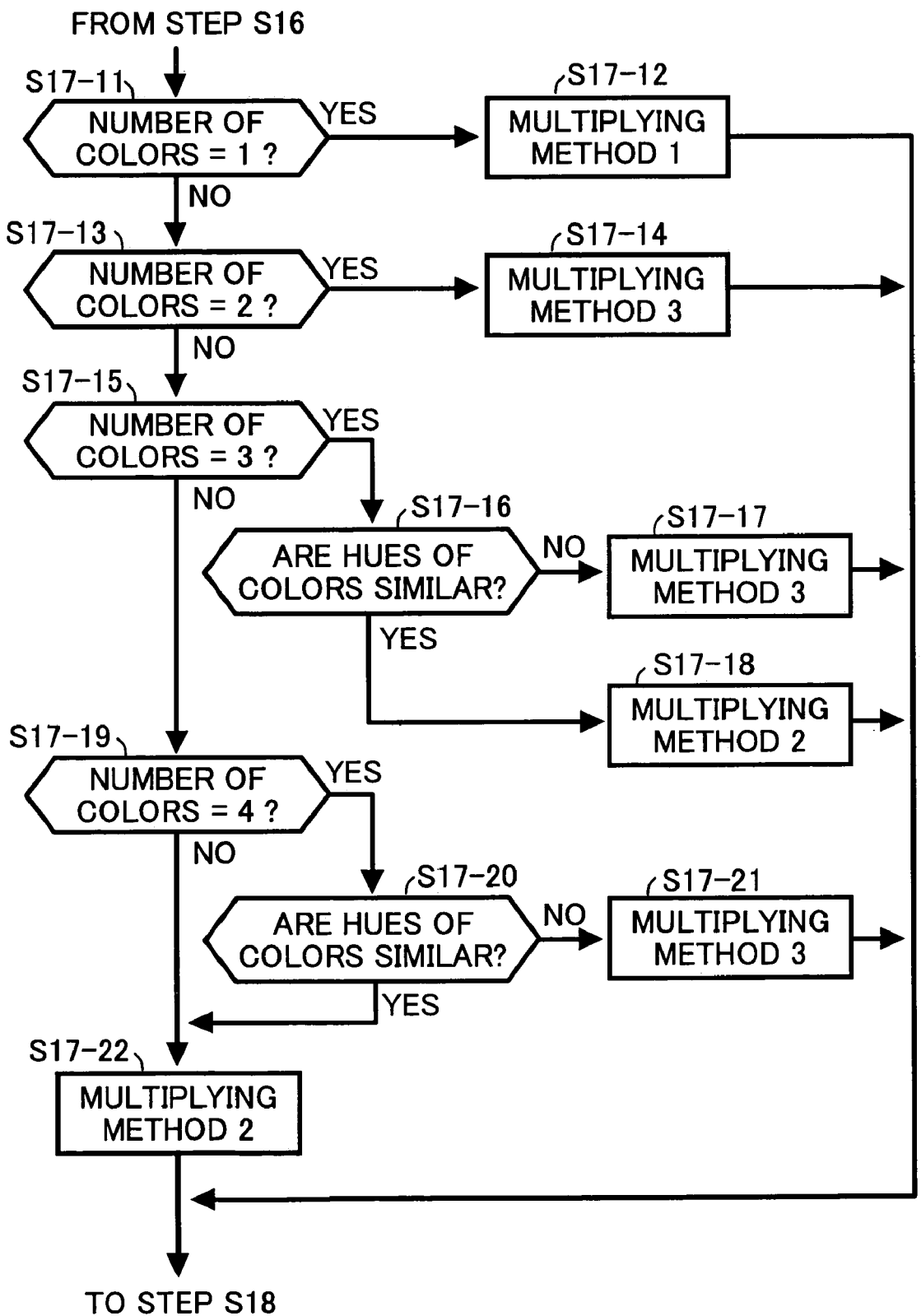
FIG. 8 is a flowchart illustrating second exemplary operational steps for selecting a pixel multiplying method according to the present invention.

FIG. 8 is a flowchart illustrating operational steps for selecting a pixel multiplying method, as another example, according to the present invention. With reference to FIG. 8, in step S17-11, the CPU 106 checks whether or not the number of colors of the reference pixels is one. If in step S17-11 it is determined that the number of colors of the reference pixels is one, the process branches to step S17-12 to select multiplying method 1. If in step S17-11 it is determined that the number of colors of the reference pixels is not one, the process proceeds to step S17-13. In step S17-13, the CPU 106 checks whether or not the number of colors of the reference pixels is two. If in step S17-13 it is determined that the number of colors of the reference pixels is two, the process branches to step S17-14 to select multiplying method 3. If in step S17-13 it is determined that the number of colors of the reference pixels is not two, the process proceeds to step S17-15. In step S17-15, the CPU 106 checks whether or not the number of colors of the reference pixels is three. If in step S17-15 it is determined that the number of colors of the reference pixels is three, the process branches to step S17-16. If in step S17-15 it is determined that the number of colors of the reference pixels is not three, the process proceeds to step S17-19. In step S17-16, the CPU 106 checks whether or not the hues of the reference pixels are similar. If in step S17-16 it is determined that the hues of the reference pixels are not similar, the process branches to step S17-17. If in step S17-16 it is determined that the hues of the reference pixels are similar, the process proceeds to step S17-18. In step S17-17, the CPU 106 selects multiplying method 3, and in step S17-18, the CPU 106 selects multiplying method 2.

In step S17-19, the CPU 106 checks whether or not the number of colors of the reference pixels is four. If in step S17-19 it is determined that the number of colors of the reference pixels is four, the process branches to step S17-20. If in step S17-19 it is determined that the number of colors of the reference pixels is not four, the process proceeds to step S17-22. In step S17-20, the CPU 106 checks whether or not the hues of the reference pixels are similar. If in step S17-20 it is determined that the hues of the reference pixels are not similar, the process branches to step S17-21. If in step S17-20 it is determined that the hues of the reference pixels are similar, the process proceeds to step S17-22. In step S17-21, the CPU 106 selects multiplying method 3, and in step S17-22, the CPU 106 selects multiplying method 2.

Figure 9:
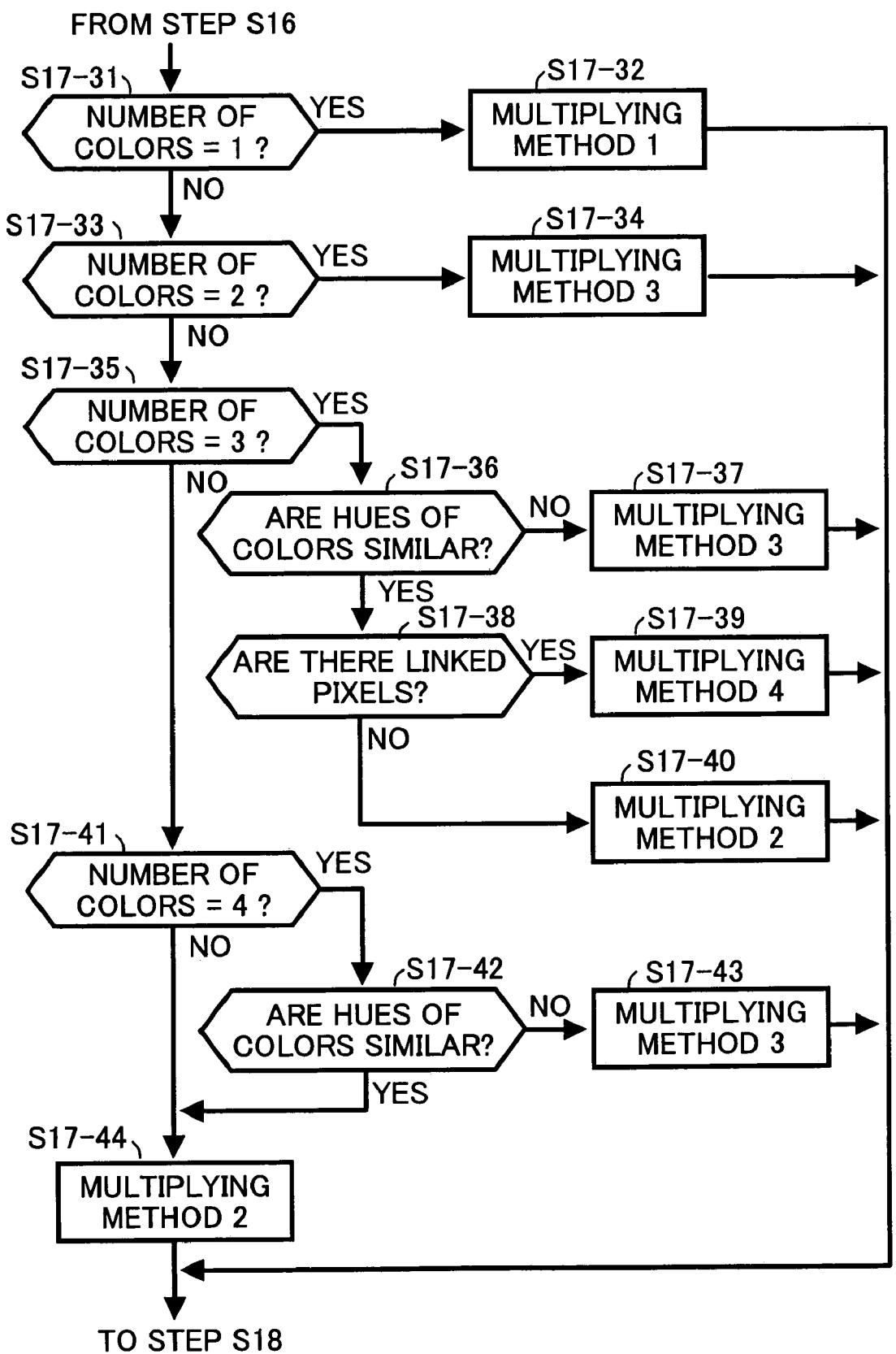
FIG. 9 is a flowchart illustrating third exemplary operational steps for selecting a pixel multiplying method according to the present invention.

FIG. 9 is a flowchart illustrating operational steps for selecting a pixel multiplying method, as a further example, according to the present invention. With reference to FIG. 9, in step S17-31, the CPU 106 checks whether or not the number of colors of the reference pixels is one. If in step S17-31 it is determined that the number of colors of the reference pixels is one, the process branches to step S17-32 to select multiplying method 1. If in step S17-31 it is determined that the number of colors of the reference pixels is not one, the process proceeds to step S17-33. In step S17-33, the CPU 106 checks whether or not the number of colors of the reference pixels is two. If in step S17-33 it is determined that the number of colors of the reference pixels is two, the process branches to step S17-34 to select multiplying method 3. If in step S17-33 it is determined that the number of colors of the reference pixels is not two, the process proceeds to step S17-35. In step S17-35, the CPU 106 checks whether or not the number of colors of the reference pixels is three. If in step S17-35 it is determined that the number of colors of the reference pixels is three, the process branches to step S17-36. If in step S17-35 it is determined that the number of colors of the reference pixels is not three, the process proceeds to step S17-41.

In step S17-36, the CPU 106 checks whether or not the hues of the reference pixels are similar. If in step S17-36 it is determined that the hues of the reference pixels are not similar, the process branches to step S17-37 to select multiplying method 3. If in step S17-36 it is determined that the hues of the reference pixels are similar, the process proceeds to step S17-38. In step S17-38, the CPU 106 checks whether or not there are linked pixels. If in step S17-38 it is determined that there are linked pixels, the process branches to step S17-39. If in step S17-38 it is determined that there are not linked pixels, the process proceeds to step S17-40.

Figures 10A, 10B, 11, 12:
FIG. 10A and FIG. 10B are illustrations of an exemplary method of linking pixels according to the present invention.
FIG. 11 is a flowchart illustrating operational steps for practicing a first pixel multiplying method of FIG. 1 according to the present invention.
FIG. 12 is an illustration of input pixels and output pixels generated by the first pixel multiplying method of FIG. 11.

FIG. 10A and FIG. 10B are illustrations of examples of linking pixels. In FIG. 10A, reference pixels R15, R25, R35, R45 and R55, which are shaded, are linking pixels. In FIG. 10B, the target pixel X and reference pixels R43 and R44, which are also shaded, are linking pixels.

Referring back to FIG. 9, in step S17-39, the CPU 106 selects multiplying method 4, and in step S17-40, the CPU 106 selects multiplying method 2. In step S17-41, the CPU 106 checks whether or not the number of colors of the reference pixels is four. If in step S17-41 it is determined that the number of colors of the reference pixels is four, the process branches to step S17-42. If in step S17-41 it is determined that the number of colors of the reference pixels is not four, the process proceeds to step S17-44. In step S17-42, the CPU 106 checks whether or not the hues of the reference pixels are similar. If in step S17-42 it is determined that the hues of the reference pixels are not similar, the process branches to step S17-43. If in step S17-42 it is determined that the hues of the reference pixels are similar, the process proceeds to step S17-44. In step S17-43, the CPU 106 selects multiplying method 3, and in step S17-44, the CPU 106 selects multiplying method 2.

Referring back to FIG. 1, in step S18, the CPU 106 transfer the control to the selected multiplying method (i.e., one of the multiplying methods 1 to 4).

FIG. 11 is a flowchart illustrating operational steps for practicing the pixel multiplying method 1 in step S21 of FIG. 1. Referring to FIG. 11, in step S21-1, the CPU 106 multiplies the target pixel's red component by the square of the multiplier MR (i.e., $MR^2$). Similarly, the CPU 106 multiplies the target pixel's green component by the square of the multiplier MR in step S21-2 and multiplies the target pixel's blue component by the square of the multiplier MR in step S21-3.

FIG. 12 is an illustration of input pixels and output pixels generated by the pixel multiplying method 1 of FIG. 11, when the multiplier MR is, for example, three. In FIG. 12, a target pixel X has red, green and blue components, each of which are denoted as XR, XG and XB. The target pixel X is multiplied by the multiplier MR in horizontal and vertical directions. Thus, nine output pixels are obtained for each pixel component XR, XG and XB as shown in FIG. 12. In this pixel multiplying method, each of the output pixels is identical to the target pixel X (i.e., each of the output pixels has substantially the same red, green and blue components as those of the target pixel X).

Figure 13:
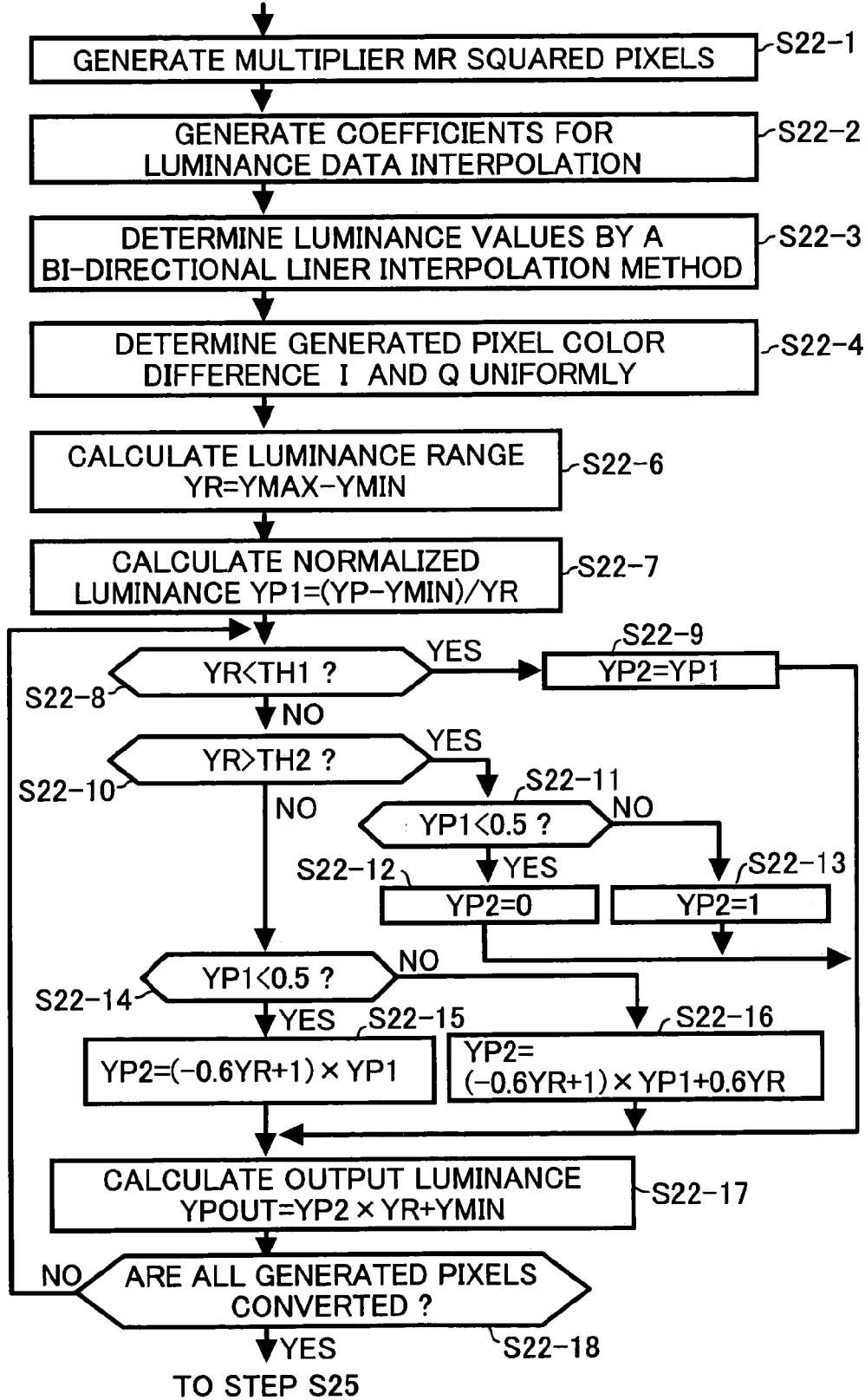
FIG. 13 is a flowchart illustrating operational steps for practicing a second pixel multiplying method of FIG. 1 according to the present invention.

FIG. 13 is a flowchart illustrating operational steps for practicing the pixel multiplying method 2 in step S22 of FIG. 1. Referring to FIG. 13, in step S22-1, the CPU 106 generates pixels using the square of the multiplier MR (i.e., $MR^2$) as previously described with respect to FIG. 12. As an example, when the multiplier MR is 4, then the CPU 106 generates 16 pixels (i.e., 42). In step S22-2, the CPU 106 generates coefficients for a bi-directional linear interpolating operation for luminance values of the generated pixels. In step S22-3, the CPU 106 determines the luminance values of the generated pixels using the bi-directional linear interpolation method as is known in the art.

FIG. 14 is an illustration of the input target pixel X surrounded by the reference pixels and output pixels corresponding to the target pixel generated by the pixel multiplying method 2 of FIG. 13 (e.g., with MR=4). In FIG. 13, the target pixel X is donated as X, the reference pixels are denoted as R11 to R55. The pixels R22, R23, R24, R32, R34, R42, R43 and R44, which are enclosed by a thick rectangle line, are used for determining luminance values of the generated pixels. As an example, when the multiplier MR is four, the CPU generates 16 pixels based on the target pixel, which are referred as P00, P01, P02, P03, P10, P11, P12, P13, P20, P21, P22, P23, P30, P31, P32 and P33. Each of the luminance values Y of the generated pixels is determined as a sum of (i) a plurality of products of one of the coefficients generated in step S22-2 of FIG. 13 and (ii) the luminance value Y of a neighboring reference pixel. The value of a coefficient is proportional to the proximity of a neighboring reference pixel to the output pixel, or counter proportional to the distance between the neighboring reference pixel and the output pixel.

As an example, for determining the luminance values of the output pixels P00, P01, P10 and P11, the CPU 106 uses the luminance values Y of reference pixels R22, R23 and R32, and the target pixel X. Similarly, for determining the luminance values of the output pixels P02, P03, P12 and P13, the CPU 106 uses the luminance values Y of the reference pixels R23, R24 and R34, and the target pixel X. For determining the luminance values of the output pixels P20, P21, P30 and P31, the CPU 106 uses the luminance values Y of the reference pixels R32, R42 and R43, and the target pixel X. For determining the luminance values of the output pixels P22, P23, P32 and P33, the CPU 106 uses to the luminance values Y of the reference pixels R34, R43 and R44, and the target pixel X.

The CPU 106 determines the luminance Y of the output pixel P01 in step S22-3 of FIG. 13, for example, as follows:

$Y(P01)=(C1 \times Y(R22))+(C2 \times Y(R23))+(C3 \times Y(R32))+(C4 \times Y(X))$ Where Y(*) is the luminance value of *, and C1, C2, C3 and C4 are the coefficients calculated in step S22-2. As previously discussed, each value of the coefficients C1, C2, C3 and C4 is counter proportional to a distance from the output pixel to the reference pixel or the target pixel X to be multiplied. As stated, these coefficients and other coefficients are calculated in step S22-2 of FIG. 13. These coefficients may be pre-calculated and stored in, for example, the memory 108, the hard disk 112, etc. In such a case, all coefficients for all values of multipliers MR may be pre-calculated and stored in a storage device, such as the hard disk 112 and the coefficient calculating step S22-2 then can be omitted.

According to the above-described operations, the luminance value Y of each of the generated pixels is determined. As a method for determining the luminance Y of the generated pixels, a so-called bi-cubic interpolation method as is known in the art may also be used. Generally, the bi-cubic method achieves quality imaging comparable to using the bi-directional linear interpolation method. However, the bi-cubic method typically results in the CPU 106 having to perform relatively heavier computing operations.

Referring back to FIG. 13, in step S22-4, the CPU 106 determines color differences I and Q of the generated pixels by duplicating the color differences I and Q of the target pixel X. As previously described, luminance values of the generated pixels are determined using the bi-directional linear interpolation method and color differences I and Q of the generated pixels are simply duplicated. In this case, the enlarged image may be satisfactory because the human eye has a high sensitivity for luminance Y and low sensitivity for color and computation time advantageously is saved.

Referring back to FIG. 13, in steps S22-6 through S22-18, the CPU 106 performs an adaptive luminance conversion for the luminance Y obtained in the above described bi-directional linear interpolation process according to image feature quantities. As the image feature quantities, the CPU 106 uses, for example, a luminance range YR, which is defined as a difference between the maximum luminance value Y MAX and the minimum luminance value Y MIN among the generated pixels.

In step S22-6, the CPU 106 calculates the luminance range YR as the maximum luminance value Y MAX minus the minimum luminance value Y MIN among the generated pixels (i.e., YR=Y MAX−Y MIN). In step S22-7, the CPU 106 calculates a normalized luminance value YP1 for all the generated pixels P00 to P33 as follows:

$YP1=(YP-Y \text{ MIN})/YR$

Where, YP1 is a normalized luminance value of a pixel to be calculated, YP is the luminance value of the pixel, Y MIN is the minimum luminance value among the generated pixels, and YR is the luminance range obtained by the above step. Therefore, the normalized luminance value ranges from a value of zero to a value one.

In step S22-8, the CPU 106 tests whether or not the luminance range YR is smaller than a first predetermined threshold value TH1. The first threshold value TH1 may be empirically predetermined. If in step S22-8 it is determined that the luminance range YR is smaller than the first predetermined threshold value TH1, the process branches to step S22-9. If in step S22-8 it is determined that the luminance range YR is not smaller than the first predetermined threshold value TH1, the process proceeds to step S22-10. In step S22-9, the CPU 106 determines a second luminance value YP2, where YP2 has the same value as the normalized luminance YP1 (i.e., YP2=YP1).

In step S22-10, the CPU 106 tests whether or not the luminance range YR is larger than a second predetermined threshold value TH2. The second predetermined threshold value TH2 may also be empirically predetermined. If in step S22-10 it is determined that the luminance range YR is larger than the second predetermined threshold value TH2, the process branches to step S22-11. If in step S22-10 it is determined that the luminance range YR is not larger than the second predetermined threshold value TH2, the process proceeds to step S22-14. In step S22-11, the CPU 106 tests whether or not the normalized luminance value YP1 is smaller than 0.5. If in step S22-11 it is determined that the normalized luminance value YP1 is smaller than 0.5, the process branches to step S22-12. If in step S22-11 it is determined that the normalized luminance value YP1 is not smaller than 0.5, the process branches to step S22-13. In step S22-12, the CPU 106 assigns a value of zero to the second luminance value YP2 and in step S22-13, the CPU 106 assigns a value of one to the second luminance value YP2.

In step S22-14, the CPU 106 tests whether or not the normalized luminance value YP1 is smaller than 0.5. If in step S22-14 it is determined that the normalized luminance value YP1 is smaller than 0.5, the process proceeds to step S22-15. If in step S22-14 it is determined that the normalized luminance value YP1 is not smaller than 0.5, the process branches to step S22-16. In step S22-15, the CPU 106 assigns a value of $(-0.6YR+1) \times YP1$ to the second luminance value YP2 and in step S22-16, the CPU 106 assigns a value of $(-0.6YR+1) \times YP1+0.6YR$ to the second luminance value YP2 such that:

$$YP2=(-0.6YR+1) \times YP1 \text{ or}$$

$$YP2=(-0.6YR+1) \times YP1+0.6YR$$

In step S22-17, the CPU 106 calculates an output luminance value YPOUT by an inverse normalizing operation such that:

$$YPOUT=YP2 \times YR + Y \text{ MIN}$$

In step S22-18, the CPU 106 tests whether or not all the luminance data Y of the generated pixels are converted into the output luminance value YPOUT. If in step S22-18 it is determined that not all the luminance data Y of the generated pixels are converted into the output luminance value YPOUT, the process returns to step S22-8. If in step S22-18 it is determined that all the luminance data Y of the generated pixels are converted into the output luminance value YPOUT, the adaptive luminance converting process is completed.

FIG. 15A, FIG. 15B and FIG. 15C are illustrations of examples of image luminance converting characteristics used in the pixel multiplying method 2 of FIG. 1. Referring to FIG. 15A, when the luminance range YR is relatively small (i.e., YR is smaller than the first threshold value TH1 as tested in step S22-8), the second luminance value YP2 is made equal to the normalized pixel luminance YP1. Referring to FIG. 15B, when the luminance range YR is of a relatively medium size (i.e., YR is larger than the first threshold value TH1 and smaller than the second threshold value YH2), the second luminance value YP2 is converted from a normalized luminance value YP1 such that contrast thereof is intensified in comparison with the input normalized luminance value YP1. Referring to FIG. 15C, when the luminance range YR is relatively large (i.e., YR is greater than or equal to the second threshold value TH2), the second luminance YP2 is converted from the normalized luminance YP1 such that contrast thereof is further intensified and even may be converted into a bi-level value as shown in FIG. 15C.

The above described pixel multiplying and adaptive luminance converting method can generate a smooth tone in a final enlarged image. The method decreases jagged outlines and false outlines in the resolution converted or enlarged images as well. In addition, the above-described adaptive luminance converting method can decrease blurring of the generated image and thereby increase the sharpness of the resolution thereof. In addition, all of the generated pixels typically have an identical color difference I and Q, therefore a coloring phenomena is also decreased.

Figure 16:
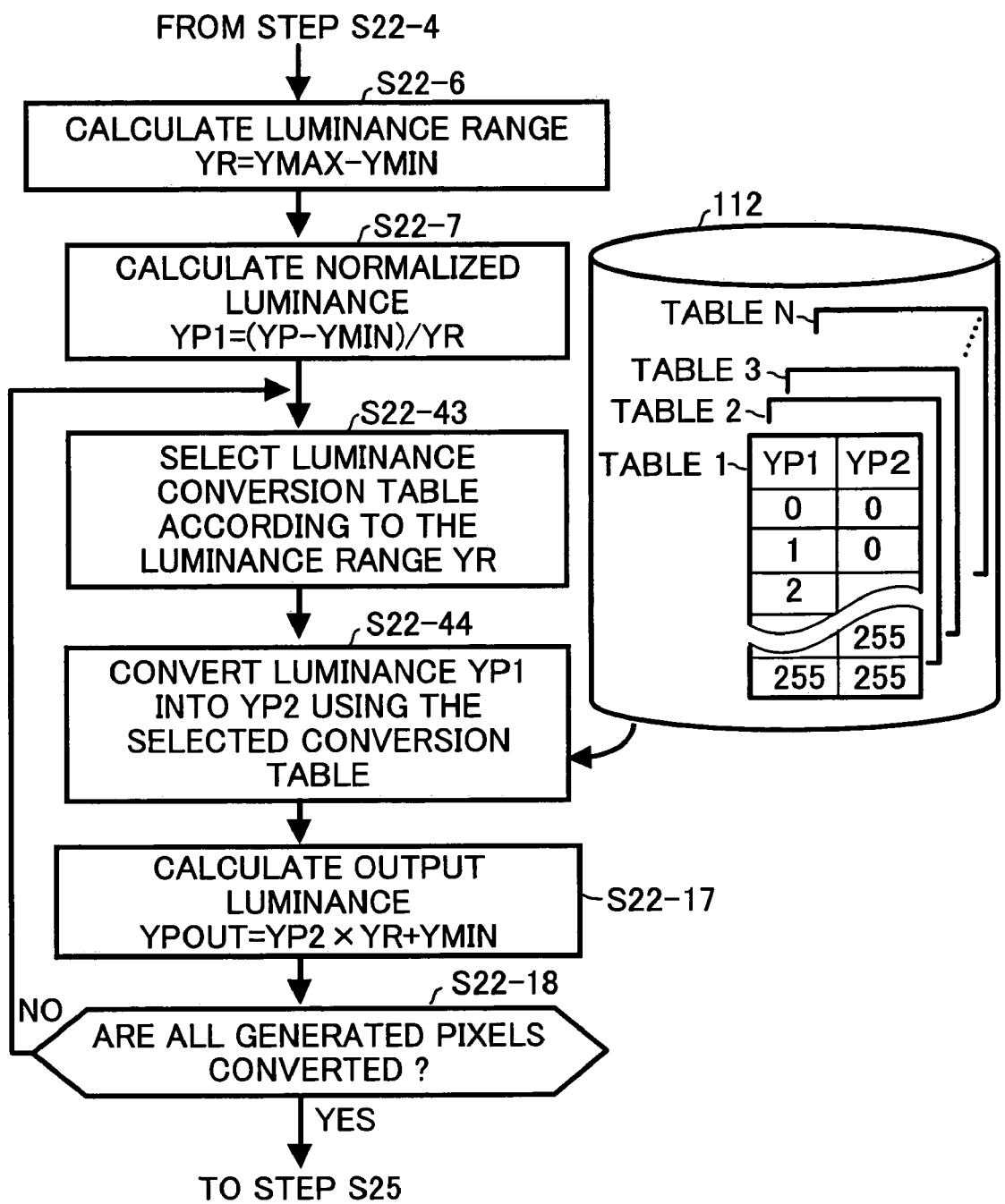
FIG. 16 is a flowchart illustrating exemplary operational steps for converting an image luminance Y in a second pixel multiplying method of FIG. 1.

The above stated luminance converting method uses three types of luminance converting characteristics. However, other types of luminance converting characteristics may be increased according to the luminance range YR. FIG. 16 is a flowchart illustrating operational steps for converting an image luminance, as another example, practiced in the pixel multiplying method 2 of FIG. 1. Referring to FIG. 16, steps S22-6, S22-7, S22-17 and S22-18 are the same as steps denoted with the same reference numerals in FIG. 13 and will not be further discussed for brevity. In this method, a plurality of luminance conversion tables, denoted as TABLE 1 to TABLE N, are stored in a storage device, such as the hard disk 112 in the computer system of FIG. 2. Each of the plurality of luminance conversion tables includes plural sets of a normalized luminance values YP1 and YP2. These types of tables are also referred to as lookup tables.

In step S22-43, the CPU 106 selects a luminance conversion table from the plurality of luminance conversion tables TABLE 1 to TABLE N according to the obtained luminance range YR. In step S22-44, the CPU 106 converts a normalized luminance YP1 into a second luminance YP2 using the selected conversion table. The steps S22-17 and S22-18 function in a same manner as steps denoted with the same reference numerals in FIG. 13.

In addition, the CPU 106 may calculate the output luminance YPOUT using a mathematical function, such as a polynomial, of the normalized luminance YP1 instead of the conversion tables. In this case, such a mathematical function may be defined as a program code and stored in the hard disk drive 112, the memory 108, etc., of the computer system 100 of FIG. 2 and FIG. 3.

FIG. 17 is a flowchart illustrating operational steps for practicing the pixel multiplying method 3 in step S23 of FIG. 1. In step S23-1, the CPU 106 determines a threshold value TH as follows:

$$TH=(Y \text{ MAX}+Y \text{ MIN})/2$$

Where YMAX is the maximum luminance value and YMIN is the minimum luminance value of the reference pixels in the sampling template TEMP illustrated in FIG. 6. FIG. 18A is an illustration of exemplary input reference pixel data. In FIG. 18A, numeral values in the cells represent luminance data Y of the pixels in the sampling template TEMP. In this case, the maximum luminance value is 240 and the minimum luminance value is 10. Therefore, the threshold value TH is determined as 115 (i.e., (240−10)/2).

Referring back to FIG. 17, in step S23-2, the CPU 106 converts the luminance data Y of the reference pixels in the template TEMP into bi-level data with the threshold value TH. When the luminance data Y is larger than the threshold value TH, the CPU 106 converts the luminance data Y into a bi-level image density value of zero, otherwise the CPU 106 converts the luminance data Y of the reference pixels in the template TEMP into a bi-level image density value of one. FIG. 18B is an illustration of bi-level data converted from the input reference pixel data of FIG. 18A. In FIG. 18B, dark pixels having bi-level image density value of one are shaded for ease of understanding.

FIG. 19 is an illustration of a table having pattern indexes, matching patterns, embedding patterns and filling information. A pattern index, a matching pattern, an embedding pattern and filling information in a row of the table form a group. The table contains a plurality of such groups (e.g., 60 groups, 128 groups, etc.). In the matching pattern column, the symbol "1" denotes a dark pixel, the symbol "0" denotes a light pixel and the symbol "-" denotes a don't care pixel (i.e., a pixel that may be either one or zero). The dark pixel is darker or less illuminant in comparison with the light pixel.

In the embedding pattern column, each of the embedding patterns has pixels generated by the square of the multiplier MR (i.e., $MR^2$) and each of the pixels is illustrated by a white cell or a shaded cell. The shaded cells represent dark pixels, which are darker or less illuminant in comparison with light pixels illustrated with white cells. Each of the embedding patterns is optimized to suppress a jagged image in the enlarged image corresponding to the matching pattern in the same row. The optimized embedding patterns may be empirically obtained or may be obtained based on computer simulation.

Symbol in the light pixel column of the filling information field, such as R32, R33, R34, etc., addresses a reference pixel in the template for filling light pixels in an embedding pattern with the addressed reference pixel data. Symbols in the dark pixel column of the filling information field, such as R33 (=X), addresses a reference pixel in the template for filling dark pixels in an embedding pattern with the addressed reference pixel data.

In this example, in the embedding pattern column and in a row, only a single embedding pattern for the multiplier MR value of eight is included, as an example. However, a plurality of embedding patterns may be included corresponding to a plurality of required multipliers MR. For example, when the multipliers MR varies from a minimum multiplier ZMIN to a maximum multiplier ZMAX, the embedding pattern column in a row may includes (ZMAX−ZMIN−1) number of embedding patterns.

Referring back to FIG. 17, in step S23-3, the CPU 106 picks out a matching pattern in the plurality of matching patterns in the table of FIG. 19. The matching patterns are allocated in a descending order of a priority for the following comparing operation from the top row downward. Therefore, the CPU 106 first picks out the matching pattern in the row being indexed as pattern 0 in the table of FIG. 19. In step S23-4, the CPU 106 compares the bi-level data distribution obtained in step S23-2 with the matching pattern. In step S23-5, if the bi-level data distribution coincides with the matching pattern, the process branches to step S23-10. However, if the bi-level data distribution is not coincident with the matching pattern, the process proceeds to step S23-6.

In step S23-6, the CPU 106 checks whether or not another matching pattern is left in the table. If in step S23-6 it is determined that another matching pattern is left in the table, the process returns to step S23-3. If in step S23-6 it is determined that no other matching pattern is left in the table, the process proceeds to step S23-7. In step S23-7, the CPU 106 multiplies the target pixel X by the square of the multiplier (i.e., $MR^2$). Thereby, the generated pixels have the same red, green and blue data as those of the target pixel X.

In step S23-10, the CPU 106 selects an embedding pattern and filling information, which are in the same row of the table of FIG. 19 in which the coincided matching pattern is included. For example, when the bi-level reference pixels coincides with the matching pattern being indexed as pattern 5, the process branches to step S23-10, where the CPU 106 selects the embedding pattern and the filling information in the same row of the table. The filling information includes light pixel information and dark pixel information. In step S23-11, the CPU 106 fills the light pixels of the embedding pattern with red, green and blue data of a pixel addressed by the light pixel information. Similarly, the CPU 106 fills dark pixels of the embedding pattern with red, green and blue data of a pixel addressed by the dark pixel information.

Figure 20A:
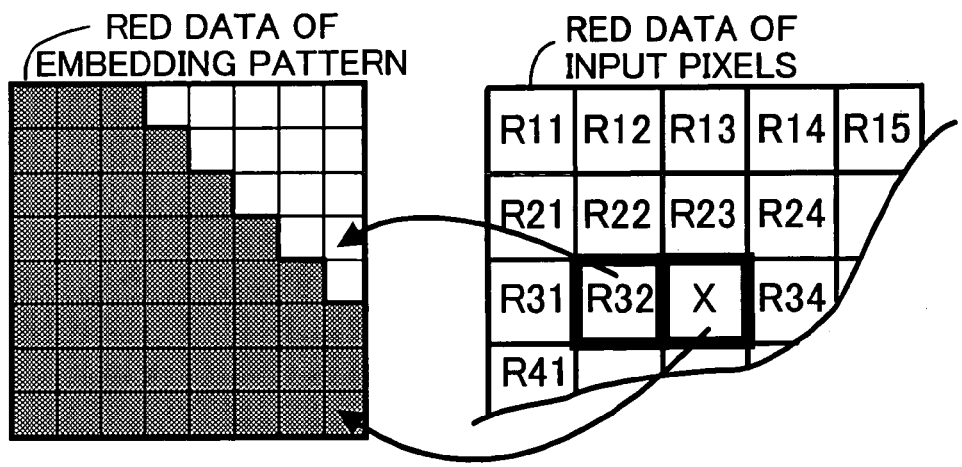
FIG. 20A, FIG. 20B and FIG. 20C are illustrations for explaining embedding patterns filled with addressed pixel data according to the present invention.
Figure 20B:
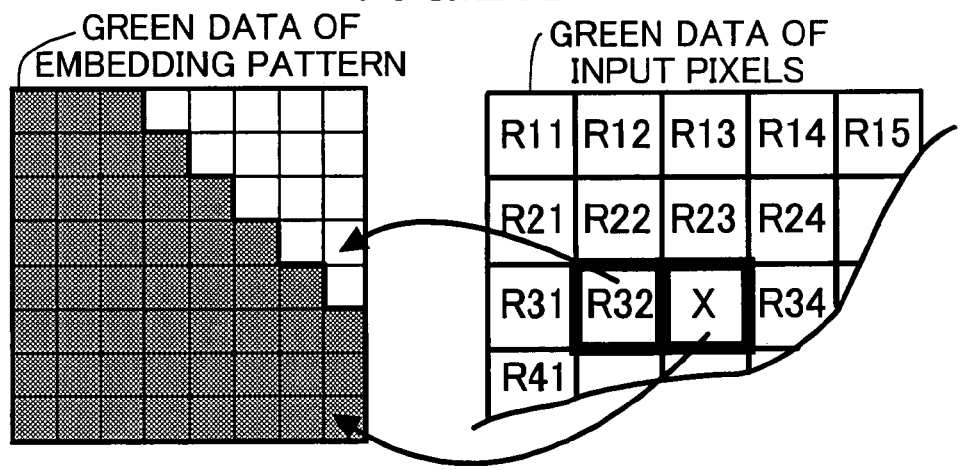
Figure 20C:
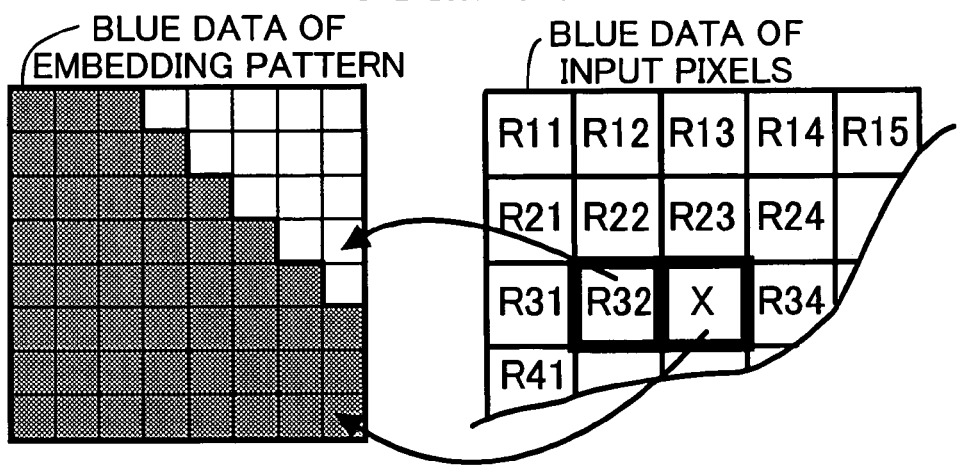

FIG. 20A, FIG. 20B and FIG. 20C are illustrations for explaining embedding patterns filled with addressed pixel data. For example, when the reference pixels including the target pixel X coincides with the matching pattern being indexed as pattern 5, the CPU 106 selects the embedding pattern and filling information in the same row. The filling light pixel is denoted as R32, and filling dark pixel is denoted as R33 (=X), which is identical to the target pixel X. Therefore, as illustrated in FIG. 20A, the red data of light pixels (illustrated as white cells) in the embedding pattern are filled with the red data of the reference pixel R32, and red data of the dark pixels (illustrated as shaded cells) in the embedding pattern are filled with the red data of the reference pixel R33. Similarly, referring to FIG. 20B, green data of the light pixels in the embedding pattern are filled with the green data of the reference pixel R32, and green data of the dark pixels in the embedding pattern are filled with the green data of the reference pixel R33. Further, referring to FIG. 20C, blue data of the light pixels in the embedding pattern are filled with the blue data of the reference pixel R32, and blue data of the dark pixels in the embedding pattern are filled with the blue data of the reference pixel R33.

As another example, when the reference pixels illustrated in FIG. 18B are input, the input pattern coincides with the matching pattern being indexed as pattern 9, the CPU 106 outputs the embedding pattern in the same row after filling light pixels with red, green and blue data of the pixel R33 (i.e., the target pixel X), dark pixels filling with red, green and blue data of the pixel R34.

Figure 21A:
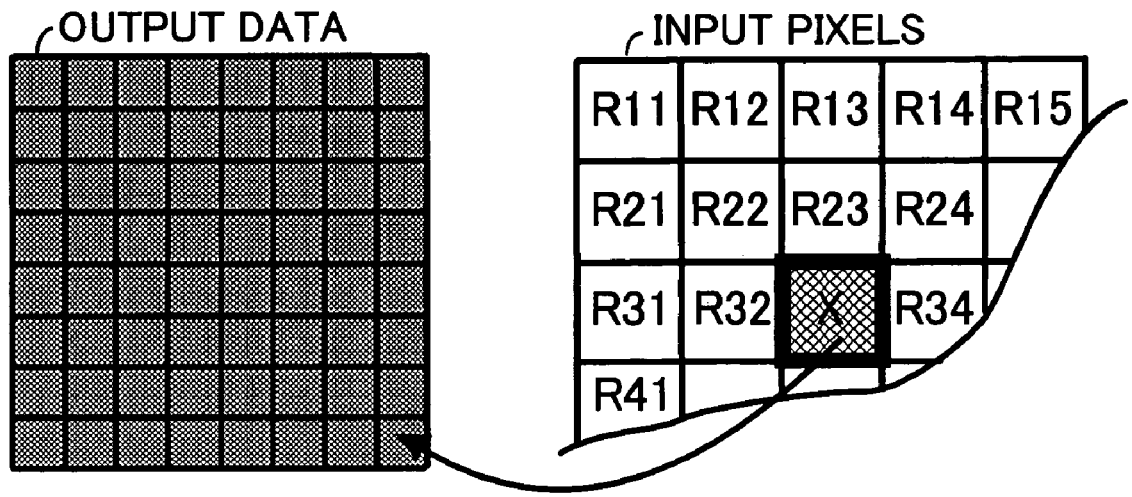
FIG. 21A and FIG. 21B are illustrations for explaining output pixel patterns filled with data of a target pixel X according to the present invention.
Figure 21B:
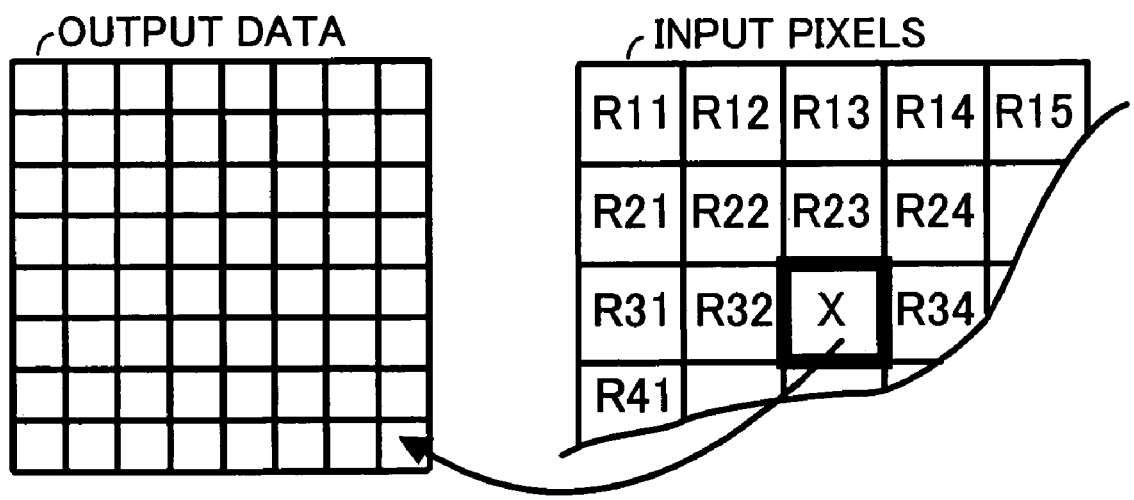

FIG. 21A and FIG. 21B are illustrations for explaining output pixel patterns filled with data of the target pixel X, which is performed in step S23-7. As described above, when the input reference pixel pattern does not coincide any of the matching patterns in the table of FIG. 19, the CPU 106 outputs the multiplied pixels having the same red, green and blue data of those of the target pixel X. In other words, when the target pixel X is relatively dark as illustrated in FIG. 21A, all of the output pixels also are made relatively dark.

When the target pixel X is relatively light as illustrated in FIG. 21B, all of the output pixels also are made relatively light.

As described above, the output pixels are determined according to the reference pixels including the target pixel X. In this way, an outline of the enlarged image becomes smooth. In addition, each of the contour lines of the red, green and blue image (i.e., a boundary between a relatively light zone and a relatively dark zone in each of the red, green and blue data) changes at identical pixel locations. Thus, improper coloring or blurring at a vicinity of an outline of a generated image is avoided. In addition, the resolution converting operation is executed with minimal processing time.

FIG. 22 is an illustration of a divided area of a template TEMP. Nine pixels denoted as b0 to b8 inside an area circumscribed by the thick line are divided from the template TEMP. When each of the location of the reference pixels is assigned a binary bit location (e.g., from bit 0 denoted as b0 to bit 8 denoted as b8) as illustrated, a given pixel data distribution provides a numeric value thereof. In other words, a specific pixel distribution inside the divided area corresponds to a unique binary value. Likewise, when a matching pattern is divided into areas and each of pixels inside the area is assigned for the same binary location, a specific pixel pattern inside the divided area corresponds to the same unique binary value.

FIG. 23 is an example of a divided area of a matching pattern. The bit eight (b8) is a don't care reference pixel, (i.e., b8 may be either one or zero), so that the divided area has a numeric value 001001111 in binary (79 in decimal) or a value 101001111 in binary (335 in decimal).

FIG. 24 is an illustration of a table of divided area values and pattern indexes. The table contains plural pairs of a divided area values in decimal form and pattern indexes. For a divided area having nine pixels, the table may contain at most 512 pairs of divided area values and pattern index. However, the number of the matching patterns is fewer than 512 in this example, and therefore the table contains smaller quantity of pairs. Plural matching patterns may have an identical divided area value. For example, both the divided area of the matching pattern 9 and the divided area of the matching pattern 24 have a common decimal value of 79. Thus, in the row of divided area value 79, the pattern index column contains both pattern 9 and pattern 24.

Figure 25:
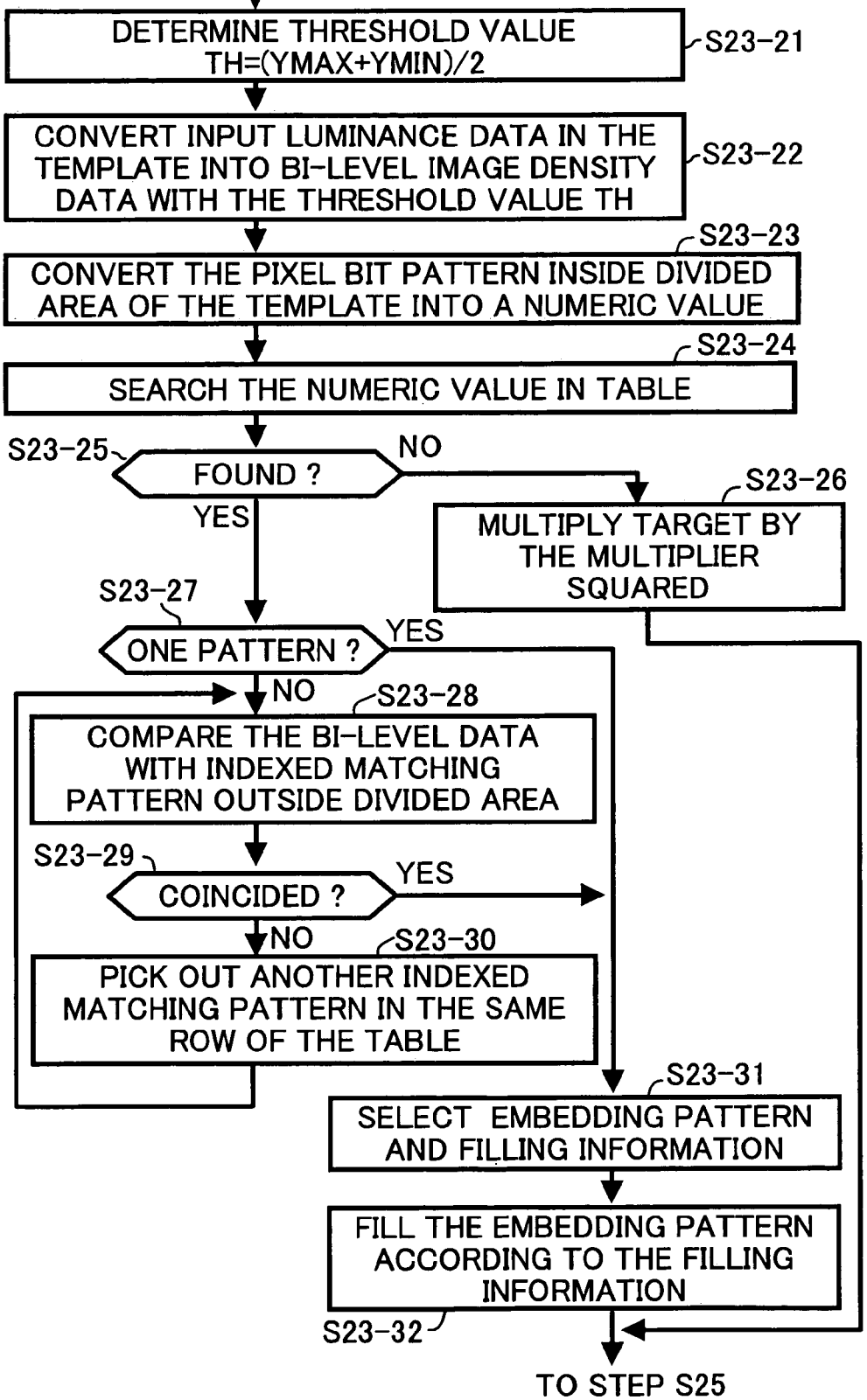
FIG. 25 is a flowchart illustrating first exemplary operational steps for practicing a third pixel multiplying method of FIG. 1 according to the present invention.

FIG. 25 is a flowchart illustrating operational steps for practicing another example of the pixel multiplying method 3 of FIG. 1 according to the present invention. Referring to FIG. 25, in step S23-21, the CPU 106 determines a threshold value TH as:

$$TH = (Y\text{ MAX} + Y\text{ MIN})/2.$$

In step S23-22, the CPU 106 converts the luminance data Y of the pixels in the template TEMP into bi-level data with the threshold value TH. In step S22-23, the CPU 106 converts a pixel bit data inside the divided area of the template, as illustrated in FIG. 22, into a numeric value. In step S22-24, the CPU 106 searches the numeric value in the table of FIG. 24. In step S23-25, the CPU 106 checks whether or not the numeric value was found in the table. If in step S23-25 it is determined that the numeric value was found in the table, the process proceeds to step S23-27. If in step S23-25 it is determined that the numeric value was not found in the table, the process branches to step S23-26. In step S23-26, the CPU 106 multiplies the target pixel X by the square of the multiplier MR (i.e., $MR^2$).

In step S23-27, the CPU 106 checks whether or not the table contains only one matching pattern index in the same row of the coinciding divided area value. If in step S23-27 it is determined that the table does contain only one matching pattern index in the same row of the coinciding divided area value, the process branches to step S23-31. If in step S23-27 it is determined that the table does not contain only one matching pattern index in the same row of the coinciding divided area value, the process proceeds to step S23-28. In step S23-28, the CPU 106 compares the pixel bi-level luminance data distribution outside the divided area with the outside divided area of the indexed matching pattern. In step S23-29, the CPU 106 examines the result of the comparison, and when a coincided is found, the process branches to step S23-31. Otherwise, the process proceeds to step S23-30. In step S23-30, the CPU 106 picks out another indexed matching pattern in the same row of the table of FIG. 24, and returns to step S23-28.

In step S23-31, the CPU 106 selects an embedding pattern and filling information in the same row of the table of FIG. 19 where the coinciding matching pattern exists. In step S23-32, the CPU 106 fills light pixels and dark pixels of the embedding pattern with red, green and blue data of pixels being addressed by the light pixel and the dark pixel information.

With the above method, the pattern matching process may be executed faster than with the method of FIG. 17. Therefore the image resolution converting time may be further shortened.

Figure 26:
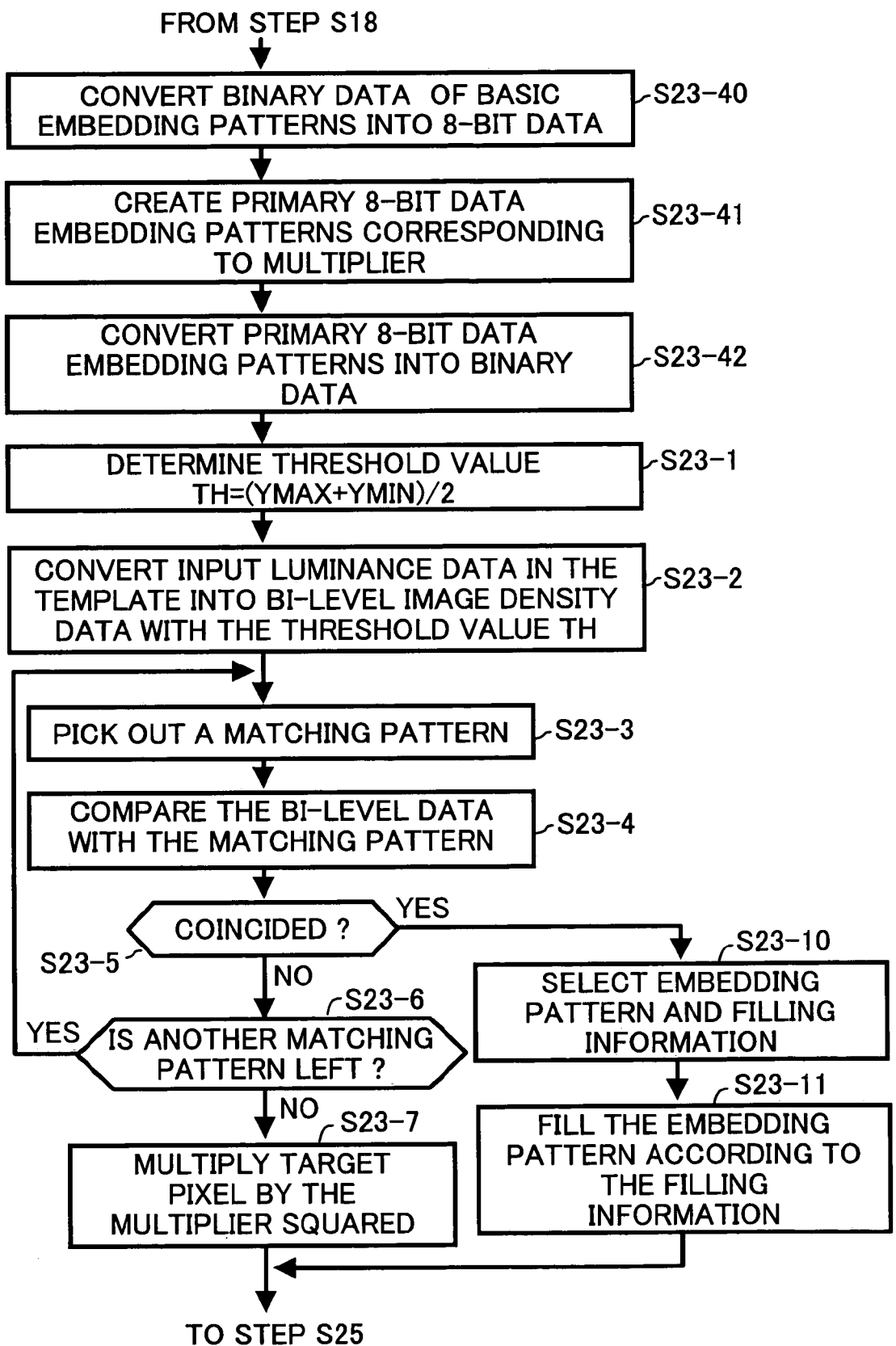
FIG. 26 is a flowchart illustrating second exemplary operational steps for practicing a third pixel multiplying method of FIG. 1 according to the present invention.

FIG. 26 is a flowchart illustrating operational steps for practicing still another pixel multiplying method 3 of FIG. 1 according to the present invention. In steps S23-40 to S23-42, the CPU 106 creates embedding patterns corresponding to an input multiplier MR based on basic embedding patterns. The basic embedding patterns are patterns for a specific multiplier MR. For example, basic embedding patterns for a multiplier MR of eight are preliminarily installed in the computer system 100 as a part of the programming code. When a multiplier MR other than the one corresponding to the installed basic embedding patterns input, the CPU creates embedding patterns corresponding to the input multiplier MR.

In step S23-40, the CPU 106 converts binary data of the basic embedding patterns into 8-bit data. In step S23-41, the CPU 106 creates primary 8-bit embedding patterns corresponding to the multiplier MR. The number of the created embedding patterns are the same to that of the basic embedding patterns, which is also same to that of the matching patterns. For creating the primary 8-bit embedding patterns, the CPU 106 may use known methods, such as a bi-directional linear interpolation method. In step S23-41, the CPU 106 converts 8-bit data of the primary embedding patterns into binary data as final embedding pattern. The created embedding patterns may be stored in the memory 108, the hard disk drive 112, or other storage devices provided to the computer system 100.

In the following operational steps S23-1 and S23-11, the CPU 106 operates in substantially the same manner as steps denoted with the same reference numerals in FIG. 17. Therefore, a description of the same steps is omitted for brevity. In step S23-1, the CPU 106 determines a threshold value TH. In step S23-2, the CPU 106 converts the luminance data Y of the pixels in the template TEMP into bi-level data with the threshold value TH. In step S23-3, the CPU 106 picks out a matching pattern in the plurality of matching patterns in the table of FIG. 19. In step S23-4, the CPU 106 compares the bi-level data distribution with the matching pattern. In step S23-5, if the bi-level data coincides with the matching pattern, the process branches to step S23-10, otherwise, the process proceeds to step S23-6.

In step S23-6, the CPU 106 checks whether or not another matching pattern is left in the table. If it is determined in step S23-6 that another matching pattern is left in the table, the process returns to step S23-3. If it is determined in step S23-6 that no other matching pattern is left in the table, the process proceeds to step S23-7, where the CPU 106 multiplies the target pixel X by the square of the multiplier (i.e., $MR^2$). In step S23-10, the CPU 106 selects an embedding pattern and filling information, which are in the same row of the table of FIG. 19 in which the coincided matching pattern is included. In step S23-11, the CPU 106 fills light and dark pixels of the embedding pattern with red, green and blue data of pixels addressed by the light and dark pixel information, respectively.

As described above, in this example, embedding patterns for all multipliers are not permanently stored in the computer system 100. Therefore a capacity of a computer readable storage device is reduced. In addition, the installation time of the corresponding computer program is also reduced.

Figure 27:
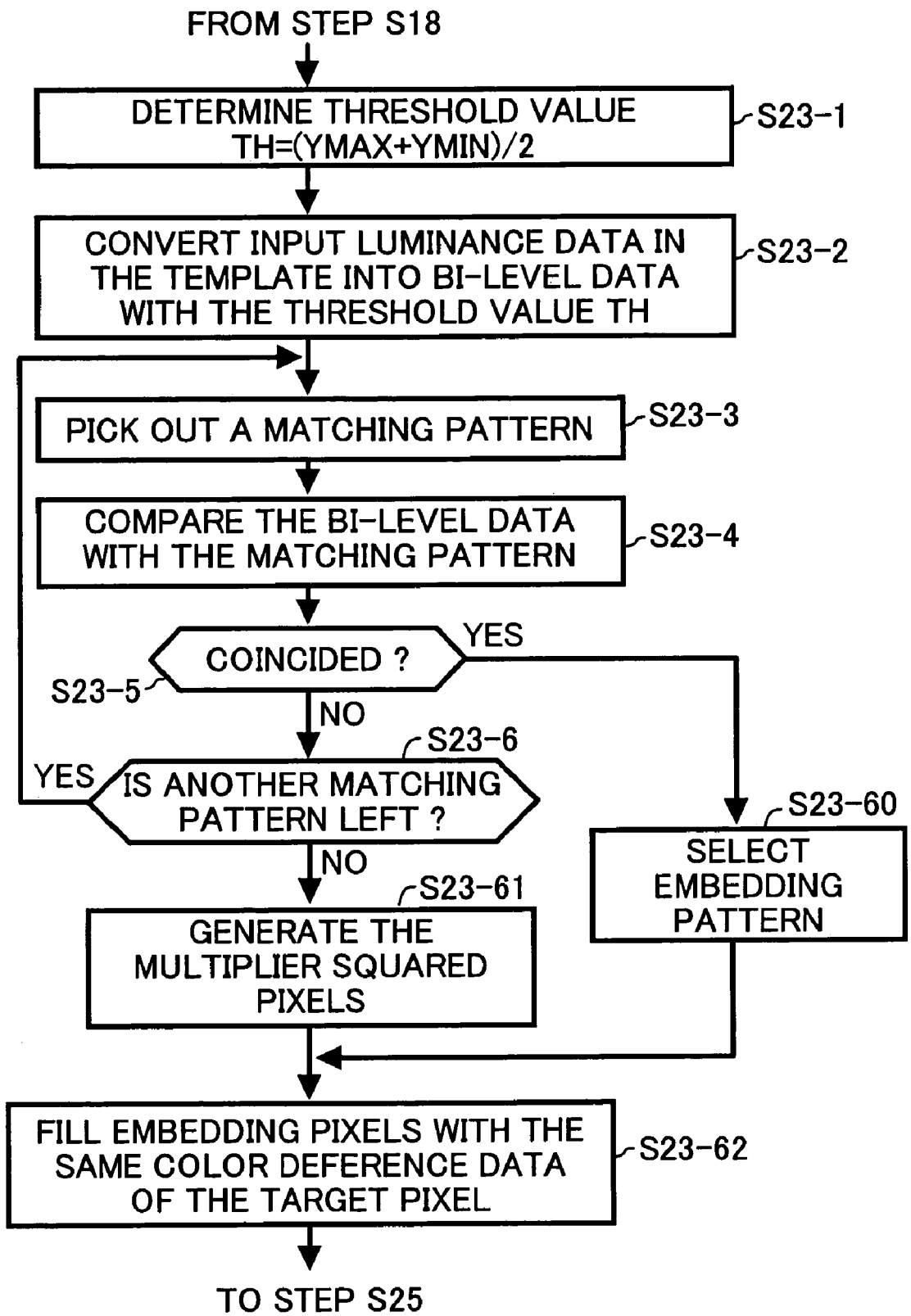
FIG. 27 is a flowchart illustrating third exemplary operational steps for practicing a a third pixel multiplying method of FIG. 1 according to the present invention.

FIG. 27 is a flowchart illustrating operational steps for practicing a further pixel multiplying method 3 of FIG. 1 according to the present invention. In the previously described examples, multiplied pixels as components of an enlarged image have red, green and blue data. However, in this example, multiplied pixels have luminance information and color difference information. Referring to FIG. 27, in the following operational steps S23-1 to S23-6, the CPU 106 operates substantially the same manner as with respect to steps denoted with the same reference numerals in FIG. 17. In step S23-1, the CPU 106 determines a threshold value TH. In step S23-2, the CPU 106 converts the luminance data Y of the pixels in the template TEMP into bi-level data with the threshold value TH. In step S23-3, the CPU 106 picks out a matching pattern in the plurality of matching patterns in the table of FIG. 19. In step S23-4, the CPU 106 compares the bi-level data distribution obtained in step S23-2 with the matching pattern.

In step S23-5, when the bi-level data distribution coincides with the matching pattern, the process branches to step S23-60. However, when the bi-level data distribution is not coincident with the matching pattern, the process proceeds to step S23-6. In step S23-6, the CPU 106 checks whether or not another matching pattern is left in the table. If it is determined in step S23-6 that another matching pattern is left in the table, the process returns to step S23-3. If it is determined in step S23-6 that no other matching pattern is left in the table, the process proceeds to step S23-61. In step S23-61, the CPU 106 generates pixels based on the square of the multiplier MR (i.e., $MR^2$). The generated pixels have the same luminance value Y as that of the target pixel X. In step S23-60, the CPU 106 selects an embedding pattern, which is in the same row of the table of FIG. 19 in which the coinciding matching pattern exits. In step S23-62, the CPU 106 fills the embedding pixels with the same color difference values I and Q as those of the target pixel X.

Figure 28:
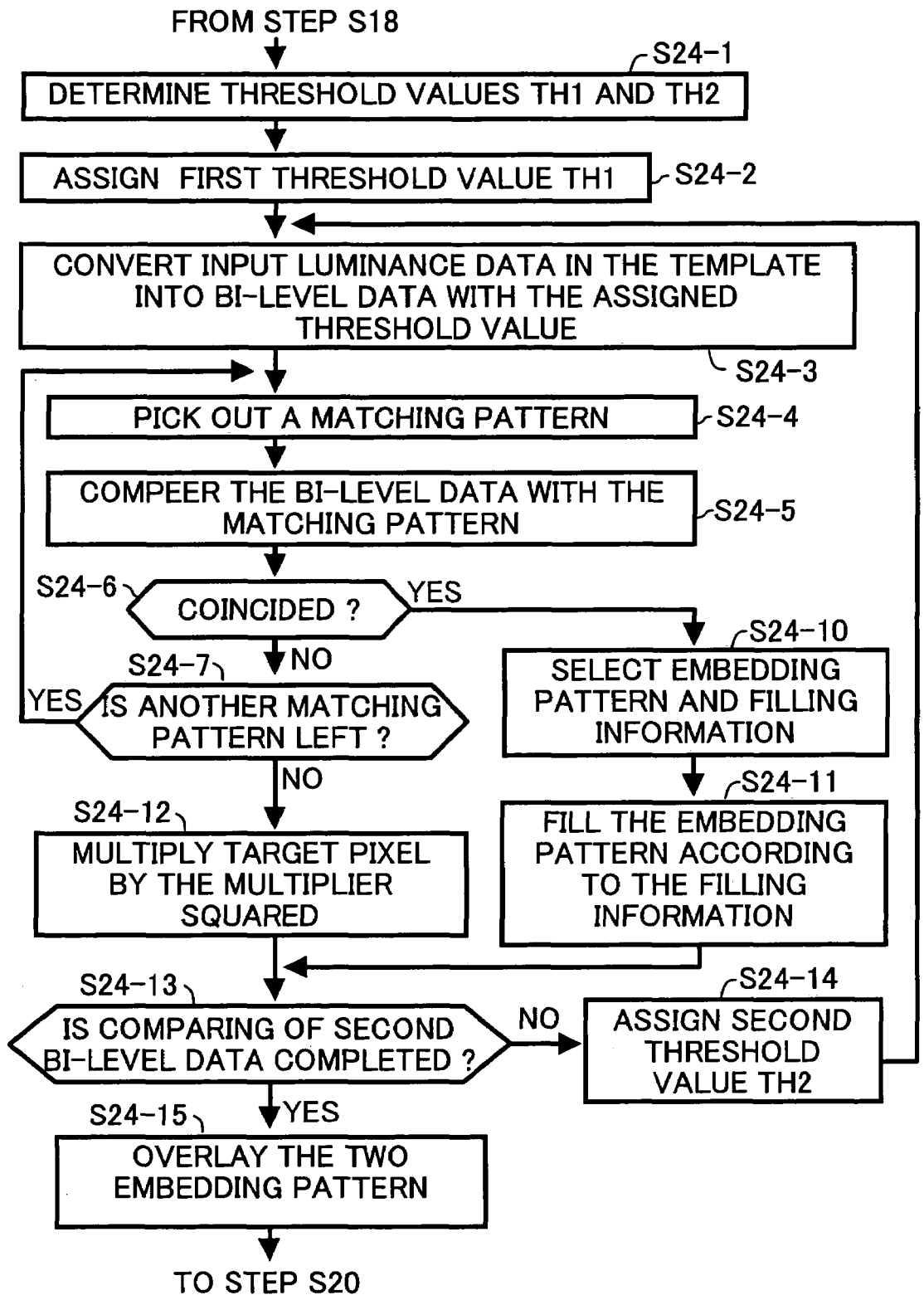
FIG. 28 is a flowchart illustrating operational steps for practicing a fourth pixel multiplying method of FIG. 1 according to the present invention.

FIG. 28 is a flowchart illustrating operational steps for practicing the pixel multiplying method 4 of FIG. 1 (step S24 of FIG. 1) according to the present invention. The pixel multiplying method 4 is selected for enlarging typically, for example, text strings having shadows. Referring to FIG. 28, in step S24-1, the CPU 106 determines a first threshold value TH1 and a second threshold value TH2 as follows:

$$TH1=((2\times Y\text{ MAX})+Y\text{ MIN})/3$$

$$TH2=(Y\text{ MAX}+(2\times Y\text{ MIN}))/3$$

Where YMAX is the maximum luminance value, and YMIN is the minimum luminance value among the reference pixels in the template TEMP illustrated in FIG. 6.

FIG. 29A is an illustration of exemplary input reference pixel luminance values in the template TEMP. In the reference pixels, the maximum luminance value is 240 and the minimum luminance value is 60. Therefore, after the operation of step S24-1, the first and second threshold values TH1 and TH2 are determined as 180 and 120, respectively.

Referring back to FIG. 28, in step S24-2, the CPU 106 assigns the first threshold value TH1 for the pixel multiplying operation to follow. In step S24-3, the CPU 106 converts the luminance data Y of the reference pixels into bi-level data with the assigned threshold value. When luminance data Y is larger than the assigned threshold value, the CPU 106 converts the luminance data Y into a bi-level image density value of zero, and otherwise converts the luminance data Y into a bi-level image density value of one.

FIG. 29B is an illustration of bi-level data converted from the input reference pixel data of FIG. 29A with the first threshold value TH1 (i.e., with TH1=180). In FIG. 29B, dark pixels having bi-level image density values of one are represented as shaded cells. FIG. 29C is an illustration of bi-level data converted from the input reference pixel data of FIG. 29A with the second threshold value TH2 (i.e., with TH2=120). Dark pixels having bi-level image density values of one are also represented by shaded cells.

Referring back to FIG. 28, in step S24-4, the CPU 106 picks out a matching pattern from the plurality of matching patterns in the table of FIG. 19. When the CPU 106 executes step S24-4 for the first time, the CPU 106 picks out the matching pattern in the row being indexed as pattern 0 in the table of FIG. 19. Every time the CPU 106 passes through step S24-4, the CPU 106 picks out the next matching pattern down in the table of FIG. 19. In step S24-5, the CPU 106 compares the bi-level data distribution obtained in step S24-3 with the matching pattern. In step S24-6, when the bi-level data distribution coincides with the matching pattern, the process branches to step S24-10. However, if the bi-level data distribution is not coincident with the matching pattern, the process proceeds to step S24-7.

Figure 30A:
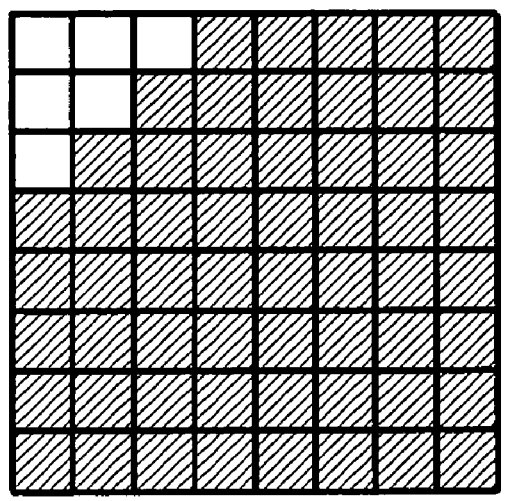
FIG. 30A is an illustration of an embedding pattern determined in the fourth pixel multiplying method of FIG. 28 using the first threshold value TH1 according to the present invention.
Figure 30B:
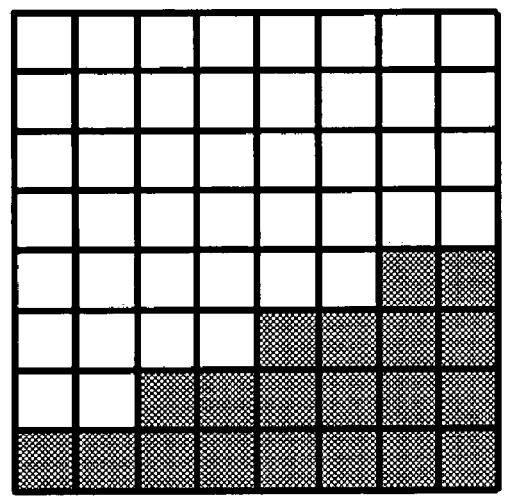
FIG. 30B is an illustration of an embedding pattern determined in the fourth pixel multiplying method of FIG. 28 using the second threshold value TH2 according to the present invention.

In step S24-7, the CPU 106 checks whether or not another matching pattern is left in the table. If it is determined in step S27-7 that anther matching pattern is left in the table, the process returns to step S24-4. If it is determined in step S23-6 that no other matching pattern is left in the table, the process proceeds to step S24-12. In step S24-10, the CPU 106 selects an embedding pattern and filling information, which are both in the same row of the table of FIG. 19 in which the coincided matching pattern exists. FIG. 30A is an illustration of an exemplary embedding pattern for the multiplier MR of a value of eight determined using the first threshold value TH1. FIG. 30B is an illustration of an exemplary embedding pattern determined using the second threshold value TH2.

In step S24-11, the CPU 106 fills light pixels of the embedding pattern based on the red, green and blue data of a pixel addressed by the light pixel information. Similarly, the CPU 106 fills dark pixels of the embedding pattern based on the red, green and blue data of a pixel addressed by the dark pixel information. When the embedding pattern is obtained by using the first threshold value TH1, the CPU 106 fills light pixels of the embedding pattern with ⅓ density of the red, green and blue data of a pixel addressed by the light pixel information. Similarly, the CPU 106 fills dark pixels with ⅓ density of the red, green and blue data of a pixel addressed by the dark pixel information.

When the embedding pattern is obtained by using the second threshold value TH2, the CPU 106 fills light pixels of the embedding pattern with ⅔ density of the red, green and blue data of a pixel addressed by the light pixel information. Similarly, the CPU 106 fills dark pixels with ⅔ density of the red, green and blue data of a pixel addressed by the dark pixel information.

In step S24-12, the CPU 106 multiplies the target pixel X by the square of the multiplier (i.e., $MR^2$). When the process is executed for the first threshold value TH1, the CPU 106 fills all the multiplied pixels with ⅓ density of the red, green and blue data of the target pixel X. When the process is executed for the second threshold value TH2, the CPU 106 fills all the multiplied pixels with ⅔ density of the red, green and blue data of the target pixel X.

In step S24-13, the CPU 106 checks whether or not the operation of comparing the second bi-level data distribution with the matching patterns is completed. If it is determined in step S24-13 that the operation of comparing the second bi-level data distribution with the matching patterns is not completed, the process branches to step S24-14. If it is determined in step S24-13 that the operation of comparing the second bi-level data distribution with the matching patterns is completed, the process proceeds to step S24-15. In step S24-14, the CPU 106 assigns the second threshold value TH2 for the step S24-3 operation to follow. In step S24-15, the CPU 106 overlays the two embedding patterns.

Figure 30C:
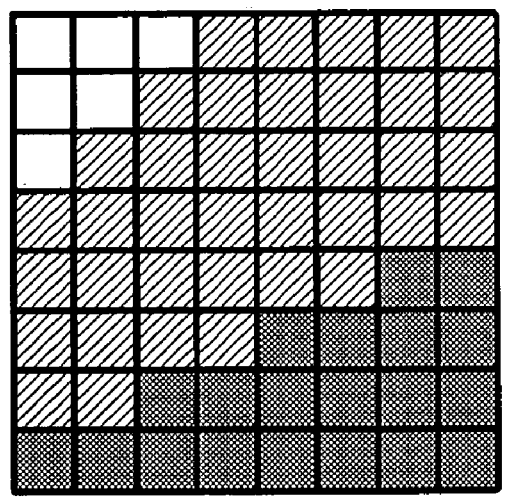
FIG. 30C is an illustration of an output pixel pattern generated by merging the embedding patterns of FIG. 30A and FIG. 30B according to the present invention.

FIG. 30C is an illustration of an output pixel pattern generated by merging operation of step S24-15 using with the embedding patterns of FIG. 30A and FIG. 30B. As illustrated in FIG. 30C, the densities of red, green and blue change at the same location. Thus, the enlarged image is obtained with reduced jaggedness and improved coloring at boundaries where the image density changes.

In the above-described example, two sorts of threshold values are used. However, other numbers of threshold values may also be used, for example, three, four, five threshold values, etc.

Figure 31:
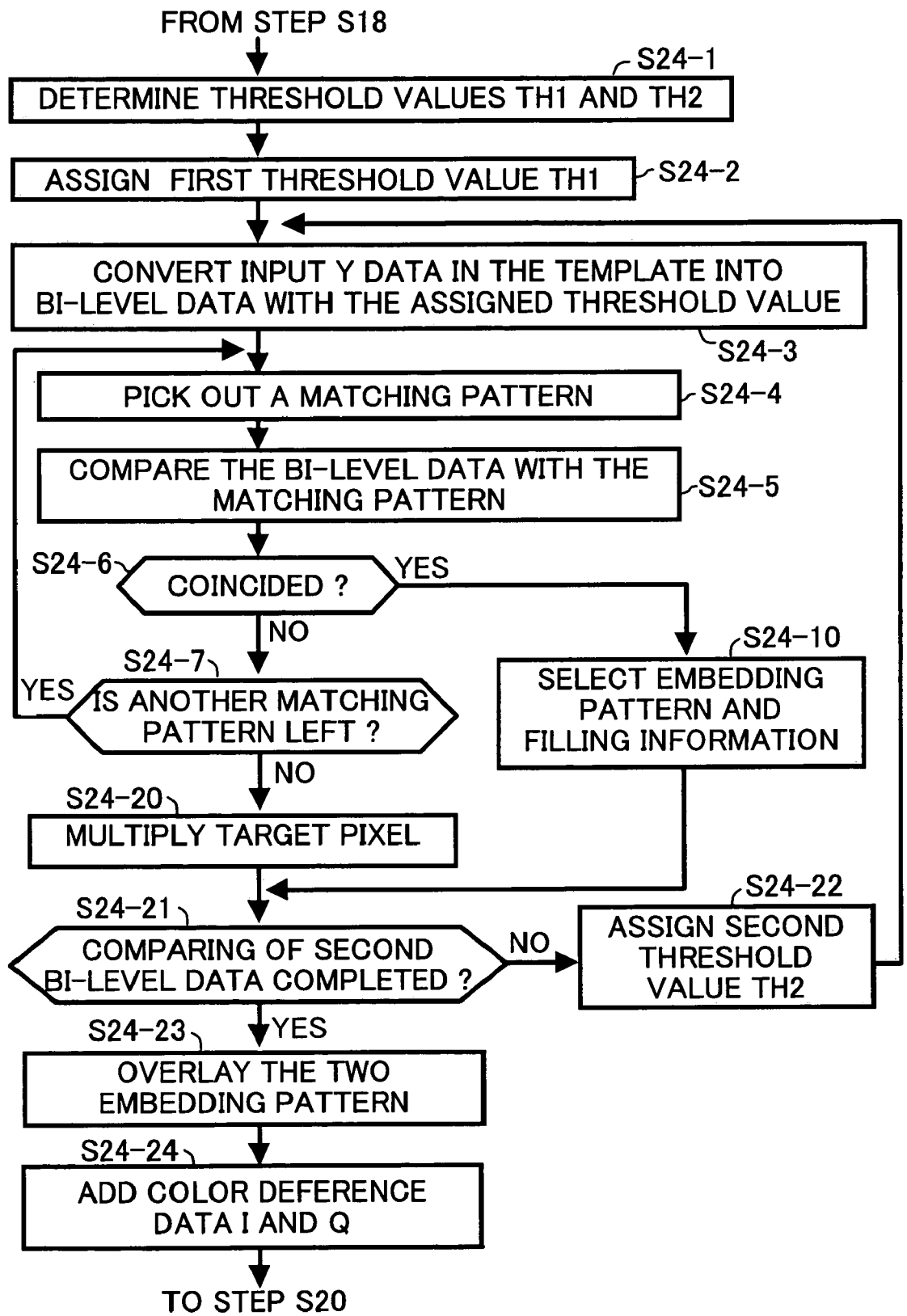
FIG. 31 is a flowchart illustrating exemplary operational steps of a fourth pixel multiplying method of FIG. 1 according to the present invention.

FIG. 31 is a flowchart illustrating operational steps for practicing another pixel multiplying method 4 of FIG. 1. Referring to FIG. 31, in step S24-1, the CPU 106 determines a first threshold value TH1 and a second threshold value TH2. In step S24-2, the CPU 106 assigns the first threshold value TH1 for use in the operation to follow. In step S24-3, the CPU 106 converts the luminance data Y of the pixels in the template TEMP into bi-level data using the assigned threshold value. In step S24-4, the CPU 106 picks out a matching pattern from the plurality of matching patterns in the table of FIG. 19. In step S24-5, the CPU 106 compares the bi-level data distribution with the matching pattern determined in step S24-4. In step S24-6, when the bi-level data distribution coincides with the matching pattern, the process branches to step S24-10. Otherwise, processing proceeds to step S24-7. In step S24-7, the CPU 106 checks whether or not another matching pattern is left in the table. If it is determined in step S24-7 that another matching pattern is left in the table, the process returns to step S24-4. If it is determined in step S24-7 that no other matching pattern is left in the table, the process proceeds to step S24-20.

In step S24-10, the CPU 106 selects an embedding pattern and filling information in the same row of the table of FIG. 19 in which the coincided matching pattern exists. In step S24-20, the CPU 106 multiplies the target pixel X by the square of the multiplier (i.e., $MR^2$). In step S24-21, the CPU 106 checks whether or not a second matching operation with the second threshold value TH2 is completed. If it is determined in step S24-21 that the second matching operation with the second threshold value TH2 is not completed, the process branches to step S24-22. If it is determined in step S24-21 that the second matching operation with the second threshold value TH2 is completed, the process proceeds to step S24-23. In step S24-22, the CPU 106 assigns the second threshold value TH2 for the step S24-3 operation to follow.

In step S24-23, the CPU 106 overlays ⅔ of the image density of the second embedding pattern obtained with the second threshold value TH2 over ⅓ of the image density of the first embedding pattern obtained with the first threshold value TH1. Thus, the overlaid embedding pattern, such as the embedding pattern of FIG. 30C is obtained.

In step S24-24, the CPU 106 adds color difference data I and Q to each of the overlaid pixels. The adding color difference data I and Q are generated by duplicating the color difference data of the target pixel X.

Referring back to FIG. 1, in step S25, the CPU 106 determines whether or not a color conversion is needed. For example, when the enlarged image is sent to an image printer provided with the same color signal interface as the color generated by either the image enlarging method 1 to method 4, color conversion typically is not needed. However, when the enlarged image data is sent to an image printer provided with a different color system, such as red, green and blue signal interface, for example, the enlarged image data is converted to the red, green and blue data. In such the case, in step S26, the CPU 106 converts the enlarged image data in the present color space into another color space data. The color conversion may be achieved in a similar manner as described with respect to step S15.

In step S27, the CPU 106 examines whether or not the correction factor CF is zero. When the correction factor CF is zero, the process skips step S28 and proceeds to step S29. If the correction factor CF is not zero, the process proceeds to step S26. In step S26, the CPU 106 adjust the number of pixels of the enlarged image according to the correction factor CF. When the correction factor CF is smaller than one, some of the multiplied pixels are deleted. When the correction factor CF is larger than one, some pixels are added to the multiplied pixels.

Figure 32A:
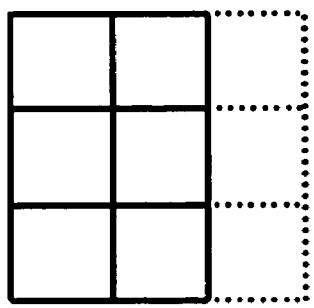
FIG. 32A to FIG. 32F are illustrations for explaining an image enlarging ratio adjustment operation of FIG. 1 according to the present invention.
Figure 32B:
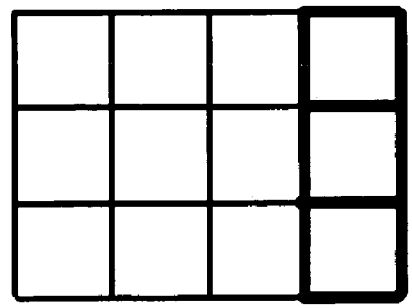
Figure 32C:
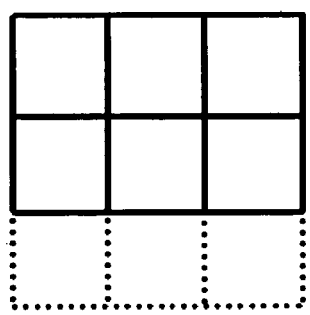
Figure 32D:
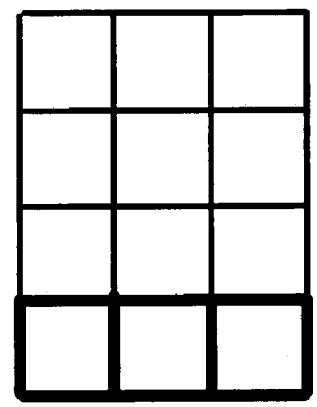
Figure 32E:
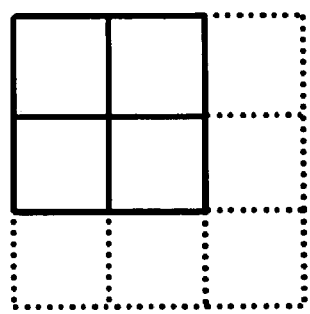
Figure 32F:
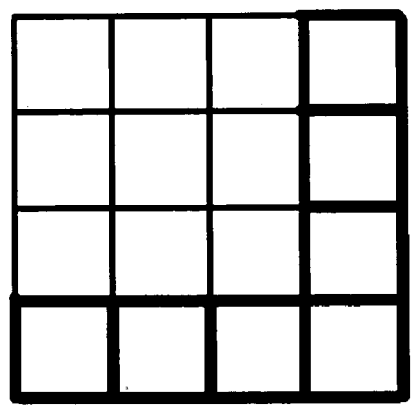

FIG. 32A to FIG. 32F are illustrations for explaining an image enlarging ratio adjustment operation. In the FIG. 32A to FIG. 32F, dotted lines illustrate deleted pixels and thick lines illustrate added pixels. FIG. 32A illustrates a pixel deleting operation in a horizontal direction for every three pixels. FIG. 32B illustrates a pixel adding operation in the horizontal direction for every three pixels. FIG. 32C illustrates a pixel deleting operation in a vertical direction for every three pixels. FIG. 32D illustrates a pixel adding operation in the vertical direction for every three pixels. FIG. 32E illustrates a pixel deleting operation in the horizontal and vertical directions for every three pixels. FIG. 32F illustrates a pixel adding operation in the horizontal and vertical directions for every three pixels.

As an example, when the correction factor CF is 0.666, a pixel in every 3 pixels, as illustrated in FIG. 32E, is deleted. When the correction factor CF is 1.333, a pixel is added for every 3 pixels, as illustrated in FIG. 32F. As another example, when the correction factor CF is 1.025, the CPU 106 inserts a pixel for every 50 pixels and a pixel for every 200 pixels. As a result, an output image is enlarged at a ratio 1025 pixels/1000 pixels, i.e., 1.025. The inserting pixel may be identical with the previous adjacent pixel to the inserted pixel. The above-described image enlarging method is referred as a nearest neighbor interpolation method. Thus, an enlarged image substantially corresponding to the input enlarging ratio ER is obtained.

In step S29, the CPU 106 outputs enlarged pixel data to, for example, a data storage device, such as the hard disk drive 112, and/or to an external image printer through a port, such as the parallel data port 154, etc. In step S30, the CPU 106 checks whether or not all pixels of the original color image have been multiplied. If in step S30 it is determined that not all pixels of the original color image have been multiplied, the process returns to step S13 to process the subsequent pixel in the original image. When all pixels are multiplied, the processing is completed.

The figures that follow include block diagrams illustrating exemplary color image resolution converting apparatuses according to the present invention, which can be used to implement the processing operations previously described.

Figure 33:
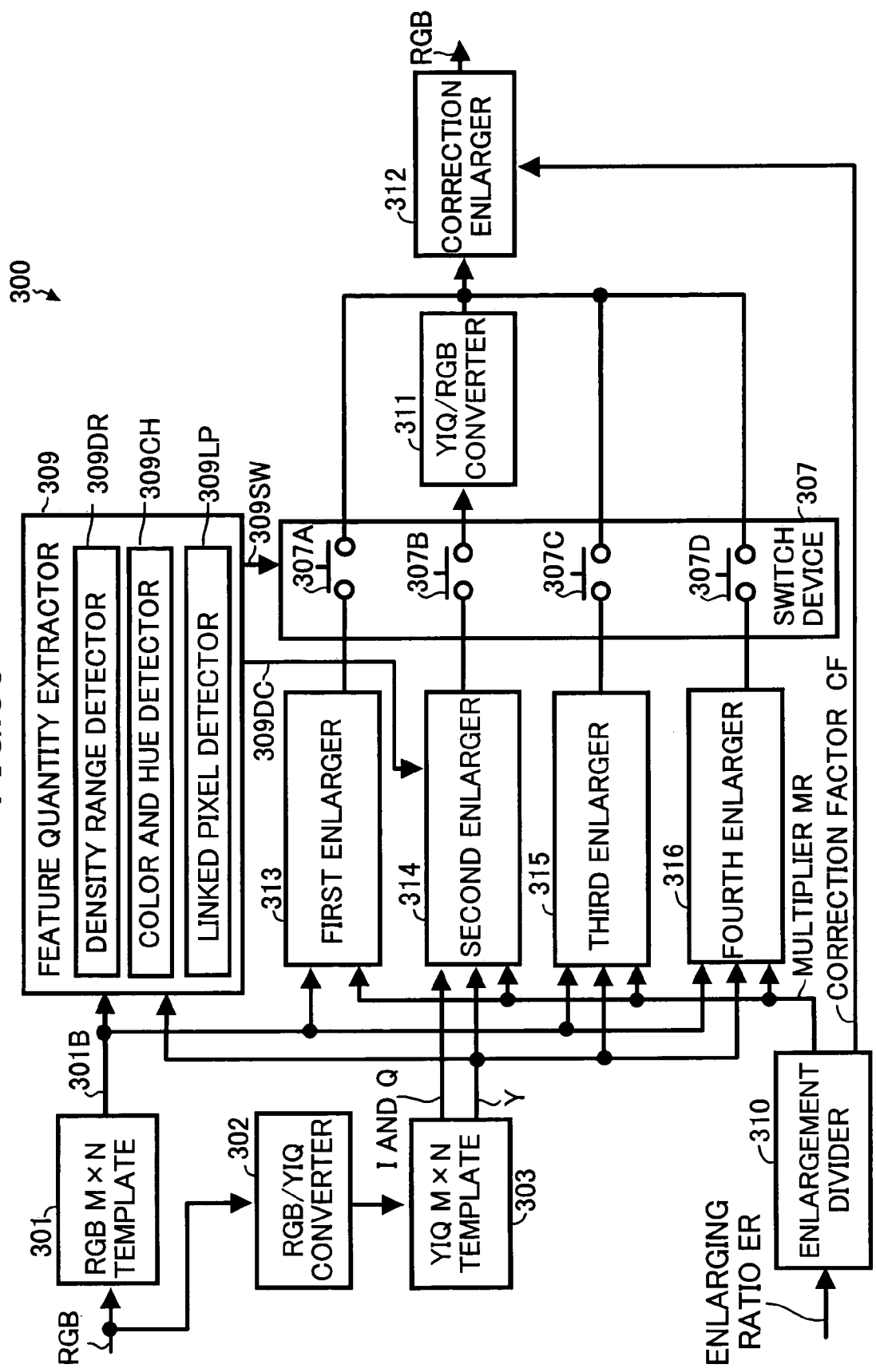
FIG. 33 is a block diagram illustrating a first exemplary color image resolution converting apparatus according to the present invention.

FIG. 33 is a block diagram illustrating an exemplary color image resolution converting apparatus 300 according to the present invention. The color image resolution converting apparatus 300 includes a RGB M×N template 301, a RGB/YIQ converter 302, a YIQ M×N template 303, a feature quantity extractor 309, a switch device 307, an enlargement divider 310, a YIQ/RGB converter 311, a correction enlarger 312, a first enlarger 313, a second enlarger 314, a third enlarger 315, and a fourth enlarger 316. In FIG. 33, the term RGB stands for red, green and blue, and the term YIQ stands for luminance Y, and color differences I and Q.

In this example, the first enlarger 313 applies a uniform pixel multiplying method and is customized for plain single color images, such as background image, etc. The second enlarger 314 applies a bi-directional linear interpolation method for luminance data Y and is customized for full color images, such as photographs, continuous toned text strings, continuous toned graphic images, etc. The third enlarger 315 applies a patterned pixel embedding method and is customized for images, such as binary text strings and drawings, etc. The fourth enlarger 316 applies a multiple patterned pixel embedding method and is customized for images, such as anti-alias processed text strings and drawings, text strings and drawings having shadows, etc.

The RGB M×N template 301 and the RGB/YIQ converter 302 function as color image data input devices for inputting image data of a target pixel X in a first color space. The RGB M×N template 301 receives pixel data (denoted as RGB) of a color image, one by one. The RGB M×N template 301 may be structured, for example, with an N-line first-in first-out (FIFO) memory. The RGB data includes red, green and blue data of a pixel. Each of the red, green and blue data are structured by, for example, 8 bit data. The RGB M×N template 301 samples horizontally M and vertically N reference pixels including the target pixel X, and sends the sampled M×N pixel red, green and blue data, which are denoted as 301B, to the feature quantity extractor 309, the first enlarger 313, the third enlarger 315 and the fourth enlarger 316. As an example, when both numerals M and N are five, the RGB M×N template 301 stores red, green and blue of data 5×5 pixels, i.e., 25 pixels such as shown in the template TEMP of FIG. 6.

The RGB/YIQ converter 302 also receives the RGB pixel data as a first color space data. The RGB/YIQ converter 302 converts the received RGB pixel data into luminance data Y, color difference data I and Q, as a second color space data, and sends the converted data to the YIQ M×N template 303.

Each of the luminance data Y, color difference data I and Q is structured by, for example, 8 bit data.

The YIQ M×N template 303 also samples horizontally M and vertically N reference pixels including the target pixel X. Therefore, the YIQ M×N template 303 may also be structured as an N-line first-in first-out (FIFO) memory. After the sampling, the YIQ M×N template 303 sends the sampled M×N pixel luminance data Y to the feature quantity extractor 309, the second enlarger 314, the third enlarger 315 and the fourth enlarger 316. In addition, the YIQ M×N template 303 sends the sampled M×N pixel color difference data I and Q to the second enlarger 314. As an example, when both numerals M and N are five, the YIQ M×N template 303 also samples 25 pixels as well as the RGB pixel template 301, as shown in the template TEMP illustrated in FIG. 6.

The enlargement divider 310 receives an image enlarging ratio ER and determines a multiplier MR and a correction factor CF based on the input enlarging ratio ER. When the fraction part of the input enlarging ratio ER is smaller than 0.5, the enlargement divider 310 determines the multiplier MR as identical with the integer part of the enlarging ratio ER. When the fraction part of the input enlarging ratio ER has larger value than 0.5, the enlargement divider 310 determines the multiplier MR as the integer part of the input enlarging ratio ER plus one. The enlargement divider 310 determines the correction factor CF as the quotient of the input enlarging ratio ER divided by the determined multiplier MR.

The enlargement divider 310 sends the calculated multiplier MR to the first enlarger 313, the second enlarger 314, the third enlarger 315, and the fourth enlarger 316. The enlargement divider 310 sends the correction factor CF to the correction enlarger 312. The product of the multiplier MR and the correction factor CF is substantially equal to the input enlarging ratio ER. As an example, when the enlargement divider 310 receives a value of 8.2 as the enlarging ratio ER, the enlargement divider 310 generates a value 8 as the multiplier MR and a value 1.025 as the correction factor CF. When the enlargement divider 310 receives a value of 8.5 as the enlarging ratio ER, the enlargement divider 310 generates a value 9 as the multiplier MR and a value 0.944 as the correction factor CF.

Each of the first enlarger 313, the second enlarger 314, the third enlarger 315, and the fourth enlarger 316 generates MR×MR pixels from the single target pixel X. For example, when the multiplier MR is 8, each of the enlargers generates 64 pixels from the input target pixel X. When the multiplier MR is 9, each of the enlargers generates 81 pixels from the input target pixel X.

On the other hand, the correction enlarger 312 increases or decreases a single pixel or multiple pixels for every multiple pixels that have been generated by either one the first, second, third and fourth enlarger 313, 314, 315 and 316. As an example, when the correction enlarger 312 receives the correction factor CF 1.025, the correction enlarger 312 may insert 25 pixels for every 1000 pixels. However, for obtaining a better image quality, the correction enlarger 312 may insert a pixel for every 50 pixels and a pixel for every 200 pixels, and as a result, an output image is enlarged at a ratio 1025 pixels/1000 pixels (i.e., 1.025). The inserted pixel may be identical with the previous next pixel to the inserted pixel. The above-described image enlarging method is referred as a nearest neighbor interpolation method.

In a sense of proportion of increased pixels, an image enlarging operation is mainly performed by either one the first, second, third and fourth enlarger 313, 314, 315 and 316 in comparison with the correction enlarger 312. In other words, an inserting frequency of a pixel by the nearest neighboring method is low in comparison with pixels inserted by the first, second, third and fourth enlarger 313, 314, 315 and 316. Therefore enlarged image quality as a whole is improved.

The switch device 307 includes switches 307A, 307B, 307C and 307D. Each of the switches 307A, 307B, 307C and 307D transmits each signal output from the first, second, third and fourth enlarger 313, 314, 315 and 316 to the correction enlarger 313 or to the YIQ/RGB converter 311, respectively.

The feature quantity extractor 309 includes a density range detector 309DR, a color and hue detector 309CH and a linked pixel detector 309LP. The feature quantity extractor 309 generates a switching signal 309SW to close one of the switches 307A, 307B, 307C and 307D. The feature quantity extractor 309 also generates an adaptive density control signal 309DC to control an image density of each of the pixels generated in the second enlarger 314. Switching operation for the switches 307A, 307B, 307C and 307D is performed per every single target pixel X in synchronization with the target pixel X inputs.

The YIQ/RGB converter 311 converts a luminance signal Y and color deference data I and Q that have been output from the second enlarger 314 into red, green and blue data. The first enlarger 313 multiplies the input target pixel X by the square of the multiplier (i.e., $MR^2$). FIG. 12 illustrates an image enlarging operation executed by the first enlarger 313 when the multiplier MR is, for example, three. With reference to FIG. 12, when the first enlarger 313 receives a target pixel X having red, green and blue components (each denoted as XR, XG and XB) from the RGB M×N template 301 and the multiplier MR of a value 3 from the enlargement divider 310, the first enlarger 313 multiplies the target pixel X by 3 in the horizontal and vertical directions.

Figure 34:
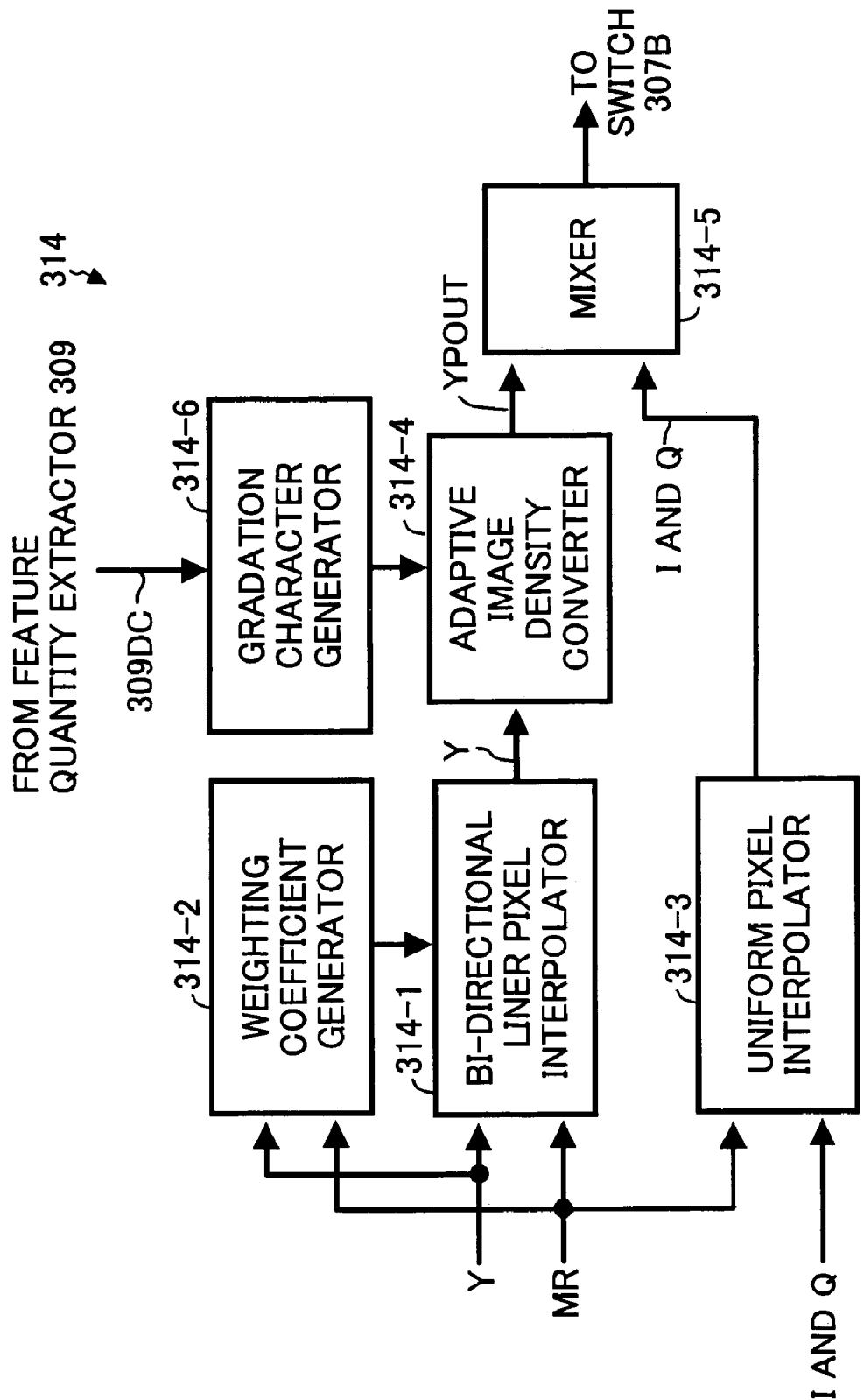
FIG. 34 is a block diagram illustrating a second enlarger of the color image resolution converting apparatus of FIG. 33.

FIG. 34 is a block diagram illustrating the second enlarger 314 of the color image resolution converting apparatus 300 of FIG. 33. With reference to FIG. 34, the second enlarger 314 includes a bi-directional linear pixel interpolator 314-1, a weighting coefficient generator 314-2, a uniform pixel interpolator 314-3, an adaptive image density converter 314-4, a mixer 314-5, and a gradation character generator 314-6.

The weighting coefficient generator 314-2 receives the luminance data Y and the multiplier MR, and generates weighting coefficients for supplying the coefficients to the bi-directional linear pixel interpolator 314-1 according to the input data. The bi-directional linear pixel interpolator 314-1 receives the luminance data Y, the multiplier MR and the weighting coefficients, and generates pixels based on the square of the multiplier MR (i.e., $MR^2$). The bi-directional linear pixel interpolator 314-1 calculates luminance values for the generated pixels using a bi-directional linear interpolation method using the weighting coefficients and the luminance data Y of neighboring pixels in the sampled pixels.

The gradation character generator 314-6 receives feature quantity 309DC from the feature quantity extractor 309 of FIG. 33. The gradation character generator 314-6 generates a gradation converting characteristic, such as corresponding to the graphs illustrated in FIGS. 15A, FIG. 15B and FIG. 15C or an appropriate conversion table. The adaptive image density converter 314-4 receives the luminance data Y of the generated multiple pixels and the gradation converting characteristic. The adaptive image density converter 314-4 first converts each of the luminance data Y into normalized luminance data Y1. Then the adaptive image density converter 314-4 converts normalized luminance data Y1 into second luminance data Y2 according to the image feature quantity 309DC, such as corresponding to the graphs illustrated in FIG. 15A, FIG. 15B and FIG. 15C. Lastly, the adaptive image density converter 314-4 converts second luminance data Y2 into output luminance data YPOUT.

The uniform pixel interpolator 314-3 generates MR by MR sets color difference data I and Q, by duplicating the color difference data of the target pixel X. The mixer 314-5 adaptively mixes the density converted luminance data YPOUT and the duplicated color difference data I and Q for each of the generated pixels. The mixed data is output to the switch 307B of FIG. 33.

Figure 35:
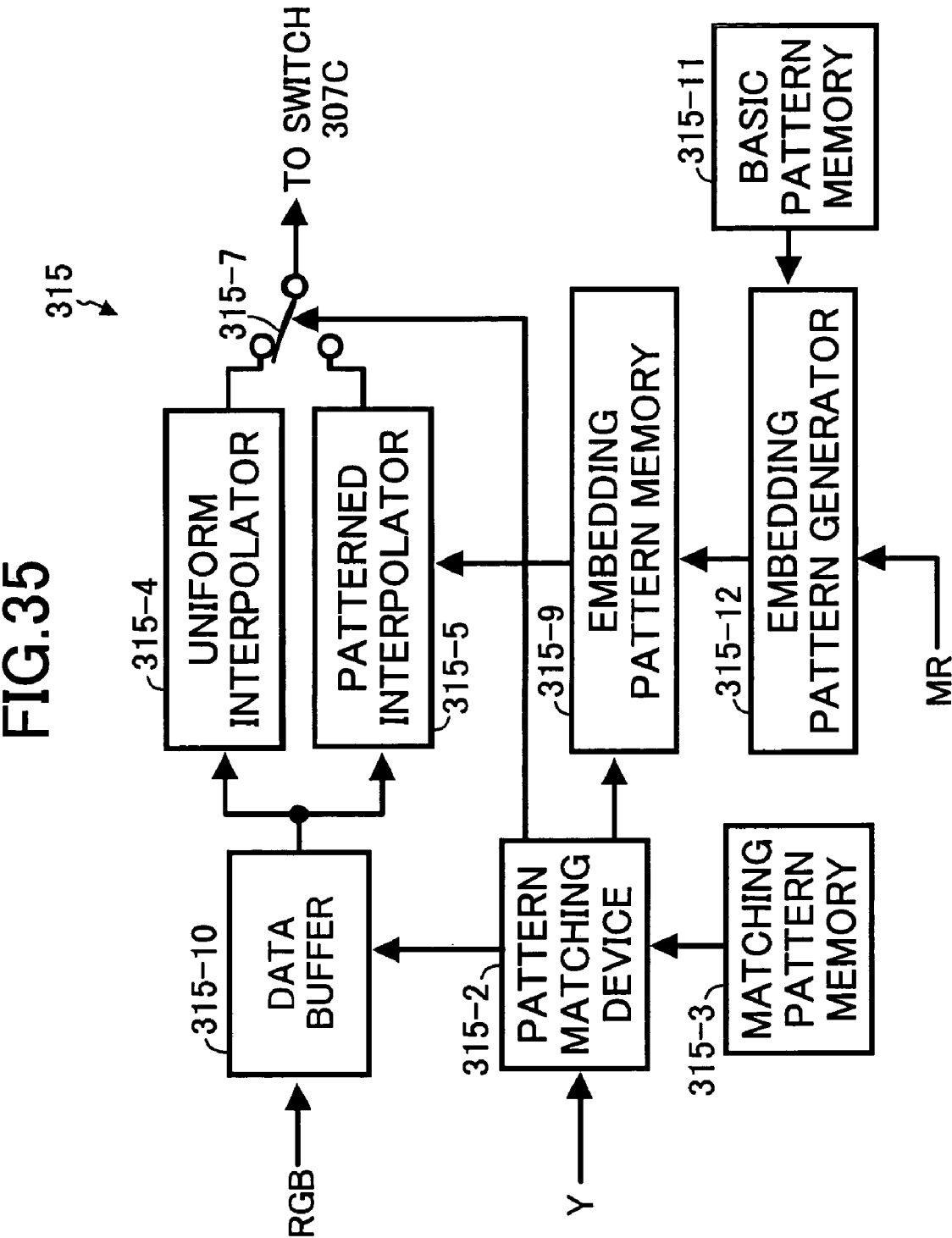
FIG. 35 is a block diagram illustrating a third enlarger of the color image resolution converting apparatus of FIG. 33.

FIG. 35 is a block diagram illustrating the third enlarger 315 of the color image resolution converting apparatus 300 of FIG. 33. The third enlarger 315 includes a data buffer 315-10, a pattern matching device 315-2, a matching pattern memory 315-3, a uniform interpolator 315-4, a patterned interpolator 315-5, a switch 315-7, an embedding pattern memory 315-9, and a basic pattern memory 315-11, an embedding pattern generator 315-12.

The data buffer 316-10 receives and temporally stores the red, green and blue data of the sampled reference pixels. The basic pattern memory 315-11 stores a set of basic embedding patterns for a specific single multiplier MR, such as the embedding patterns for the multiplier MR of a value 8 as illustrated in the table of FIG. 19.

The embedding pattern generator 315-12 receives a value of the multiplier MR. When the received multiplier MR is identical with the multiplier MR specified for the above-described basic patterns, the embedding pattern generator 315-12 duplicates the basic embedding patterns and transfers the duplicated embedding patterns to the embedding pattern memory 315-9. When the received multiplier MR is different from the multiplier MR specified for the basic embedding patterns, the embedding pattern generator 315-12 generates a set of embedding patterns corresponding to the received multiplier MR based on the set of basic pixel patterns stored in the basic pattern memory 315-11.

When the enlarging ratio ER for the horizontal direction and the enlarging ratio ER for the vertical direction have an identical value, each of the generated embedding patterns has MR pixels in both horizontal and vertical directions. When the enlarging ratios for both directions are different, the multipliers may also be different each other. However, in both cases, the embedding pattern generator 315-12 can generate the set of embedding patterns, for example, utilizing a linear interpolation method.

The pattern matching memory 315-3 stores a plurality of matching patterns, such as the matching patterns illustrated in the table illustrated in FIG. 19, and supplies the matching patterns to the pattern matching device 315-2. The pattern matching device 315-2 compares the bi-level reference pixel luminance data distribution received from the YIQ M×N template 303 of FIG. 33 with the supplied matching patterns in a sequence. When the bi-level reference pixel luminance data distribution coincides with one of the matching patterns, the pattern matching device 315-2 outputs a coincidence signal to the embedding pattern memory 315-9 so to the switch 315-7 to close the path connecting the patterned interpolator 315-5 and the output terminal toward the switch 307C of FIG. 33. In addition, the pattern matching device 315-2 sends a dark filling address and a light filling address to the data buffer 315-10.

When the embedding pattern memory 315-9 receives the coincidence signal, the embedding pattern memory 315-9 sends an embedding pattern that corresponds to the coincided matching pattern to the patterned interpolator 315-5. When the data buffer 315-10 received the dark and light filling address, the data buffer 315-10 sends red, green and blue data of the addressed pixels to the patterned interpolator 315-5. Then, the patterned interpolator 315-5 fills dark pixels in the embedding pattern with the received red, green and blue data. Similarly, the patterned interpolator 315-5 fills light pixels in the embedding pattern with the received red, green and blue data. Thus, the filled embedding pattern is output to the next stage through the switch 315-7.

The uniform interpolator 315-4 unconditionally generates MR×MR pixels having the same red, green and blue data to those of the target pixel X. When the input pattern does not coincide with any of the matching patterns, the pattern matching device 315-2 outputs a mismatch signal to the switch 315-7 so as to close the path connecting the uniform interpolator 315-4 to the output terminal. Thus, the uniformly filled embedding pattern is output to the next stage through the switch 315-7.

Figure 36:
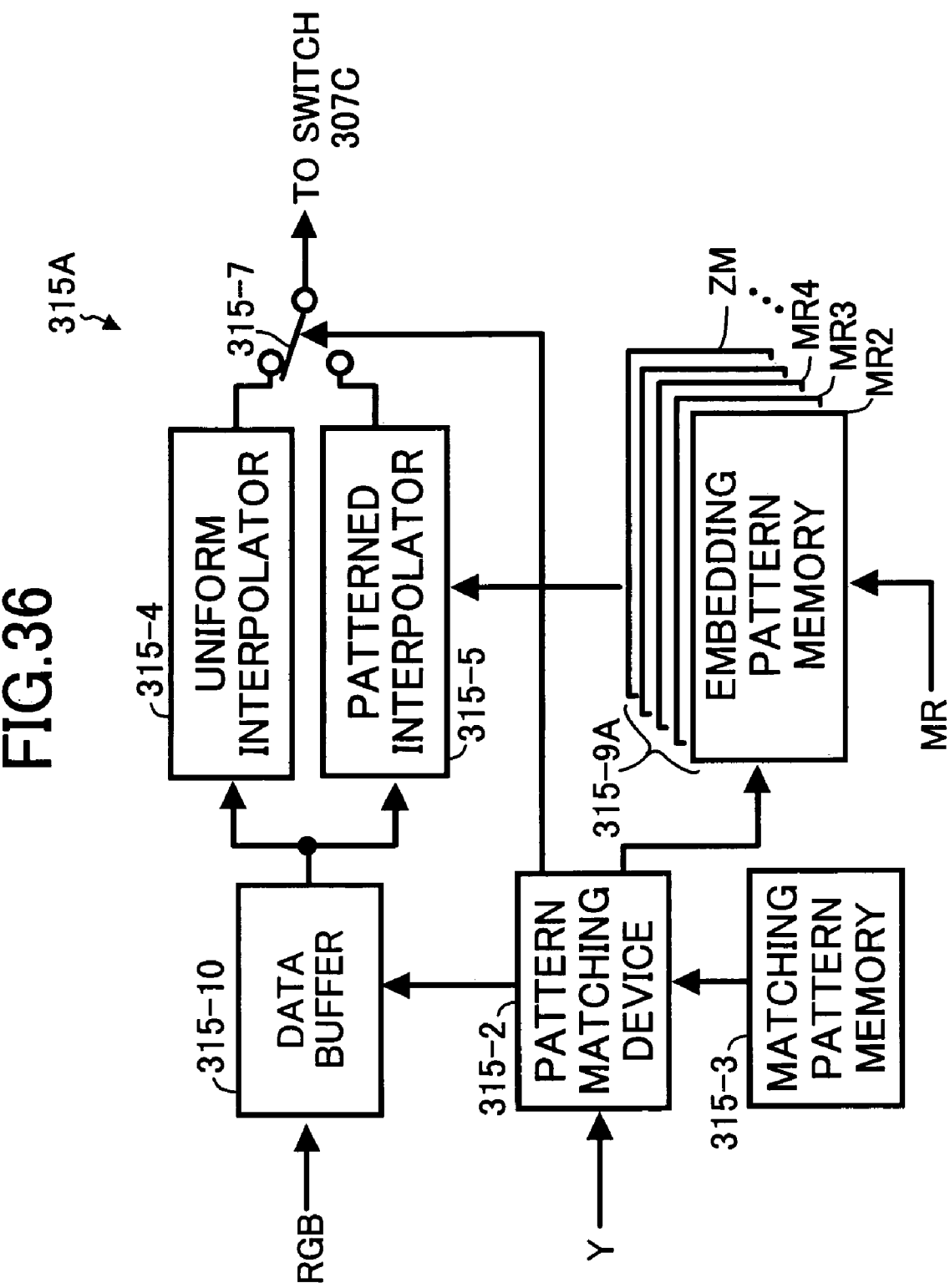
FIG. 36 is a block diagram illustrating an exemplary third enlarger of the color image resolution converting apparatus of FIG. 33.

FIG. 36 is a block diagram illustrating another example of the third enlarger 315A of the color image resolution converting apparatus 300 of FIG. 33. In FIG. 36, the elements that are substantially the same as those in FIG. 35 are denoted by the same reference numerals. A description of the same elements in FIG. 36 as in FIG. 35 is not provided here to avoid redundancy. The third enlarger 315 includes a data buffer 315-10, a pattern matching device 315-2, a matching pattern memory 315-3, a uniform interpolator 315-4, a patterned interpolator 315-5, a switch 315-7, and an embedding pattern memory 315-9A.

The embedding pattern memory 315-9A stores plural sets of embedding patterns. Each of the plural sets is denoted as MR2, MR3, MR4, and MZ each corresponding to a minimum multiplier MR of value 2 to a maximum value MZ. The number of sets of embedding patterns is equal to the number of input multipliers MR. For instance, when the input multiplier MR varies from 2 to 30, the embedding pattern memory 315-9 stores 29 sets of embedding patterns. In a set of embedding patterns, every embedding pattern has the same number of pixels, and the number is equal to the square of the multiplier (i.e., $MR^2$).

When the embedding pattern memory 315-9A receives the coincidence signal from the pattern matching device 315-2, the embedding pattern memory 315-9A sends an embedding pattern that corresponds to the coincided matching pattern and the multiplier MR to the patterned interpolator 315-5. Thus, the third enlarger 315A performs the pixel multiplying operation without the embedding pattern generating process of the third enlarger 315 of FIG. 35.

Figure 37:
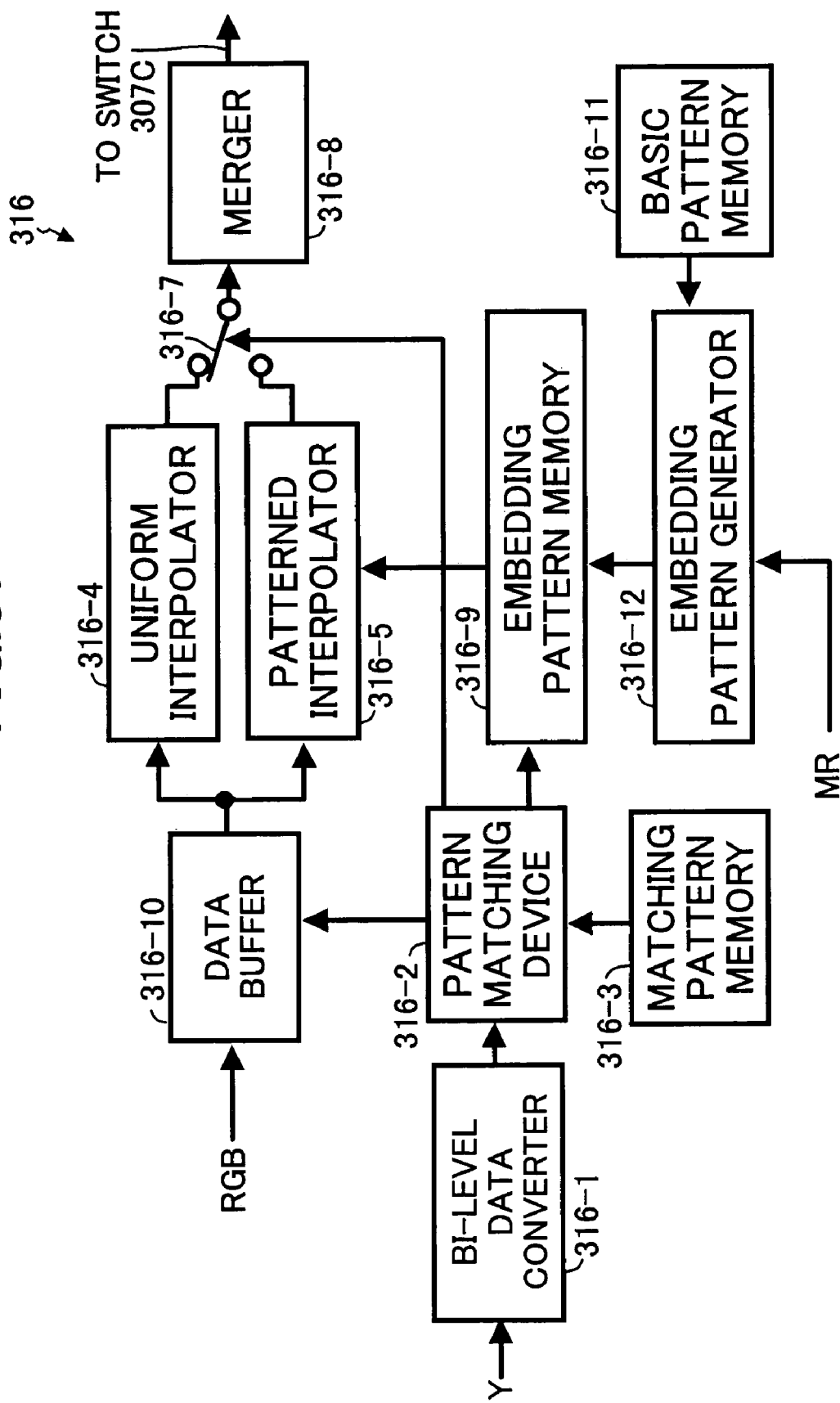
FIG. 37 is a block diagram illustrating a fourth enlarger of the color image resolution converting apparatus of FIG. 33.

FIG. 37 is a block diagram illustrating the fourth enlarger 316 of the color image resolution converting apparatus 300 of FIG. 33. The fourth enlarger includes a bi-level data converter 316-1, a data buffer 316-10, a pattern matching device 316-2, a matching pattern memory 316-3, a uniform interpolator 316-4, a patterned interpolator 316-5, a merger 316-6, a switch 316-7, an embedding pattern memory 316-9, a basic pattern memory 316-11, and an embedding pattern generator 316-12.

In this example, for a single target pixel X, two embedding patterns are sequentially generated, and then the merger 316-6 merges the two embedding patterns and outputs the merged embedding pattern to the next stage. As a first step, the bi-level data converter 316-1 receives the luminance data Y of the reference pixels inside the YIQ M×N template 303 of FIG. 33. Then, the bi-level data converter 316-1 generates plural threshold value. In this example, the bi-level data converter 316-1 generates two threshold values TH1 and TH2. In addition, the bi-level data converter 316-1 converts the luminance data Y of the reference pixels into bi-level data using the first threshold value TH1. The bi-level data converter 316-1 then sends the converted data to the pattern matching device 316-2.

Meanwhile, the data buffer 316-10 receives the red, green and blue data of the sampled pixels and temporally stores the red, green and blue data therein. The basic pattern memory 316-11 stores a set of embedding patterns for a specific multiplier MR, such as the embedding patterns for the multiplier MR of value 8, as illustrated in the table of FIG. 19.

The embedding pattern generator 316-12 receives the multiplier MR. When the received multiplier MR is identical with the multiplier MR specifying for the above-described basic patterns, the embedding pattern generator 316-12 duplicates the basic patterns in the basic pattern memory 316-11 and sends the duplicated embedding patterns to the embedding pattern memory 316-9. When the received multiplier MR is different from the multiplier MR specified for the basic patterns, the embedding pattern generator 316-12 generates a set of embedding patterns corresponding to the received multiplier MR based on the set of basic patterns in the basic pattern memory 316-11.

The pattern matching memory 316-3 stores a plurality of matching patterns, such as the matching patterns illustrated in the table of FIG. 19. The pattern matching device 316-2 compares the bi-level reference pixel luminance data distribution with the matching patterns, which are received from the pattern matching memory 316-3, in sequence. When the bi-level reference pixel luminance data distribution coincides with one of the matching patterns, the pattern matching device 316-2 outputs a coincidence signal to the embedding pattern memory 316-9 and to the switch 316-7 so as to close the path connecting the patterned interpolator 316-5 and the merger 316-8. In addition, the pattern matching device 316-2 sends a dark filling address and a light filling address to the data buffer 316-10.

The data buffer 316-10 outputs red, green and blue data, of pixels in the data buffer 316-1 addressed by the dark filling address and the light filling address, to the patterned interpolator 316-5. When the embedding pattern memory 316-9 receives the coincidence signal, the embedding pattern memory 316-9 sends an embedding pattern, which corresponds to the coinciding matching pattern, to the patterned interpolator 316-5. When the patterned interpolator 316-5 receives the embedding pattern, the patterned interpolator 316-5 fills dark pixels of the embedding pattern with, for example, ⅓ density of the received red, green and blue data of the pixel addressed by the dark filling address. The patterned interpolator 316-5 also fills light pixels of the embedding pattern with, for example, ⅓ density of the received red, green and blue data of the pixel addressed by the light filling address.

The uniform interpolator 316-4 first generates MR×MR pixels having, for example, ⅓ density of the red, green and blue data of the target pixel X. When the input pattern does not coincide with any of the matching patterns, the pattern matching device 316-2 outputs a mismatch signal to the switch 316-7 so as to close the path connecting the uniform interpolator 316-4. Thus, the uniformly filled embedding pattern is sent to the merger 316-8. The merger 316-8 temporally stores the received first embedding pattern output from either the patterned interpolator 316-5 or the uniform interpolator 316-4.

As a second step, the bi-level data converter 316-1 converts the luminance data Y of the reference pixels into bi-level data using the second threshold value TH2. The bi-level data converter 316-1 then sends the converted data to the pattern matching device 316-2. The pattern matching device 316-2 compares the bi-level reference pixel luminance data distribution with the matching patterns as well as in the first step. When the two inputs coincide, an embedding pattern is output to the merger 316-8 in a similar manner as in the first step. However, the patterned interpolator 316-5 fills dark pixels of the embedding pattern with, for example, ⅔ density of red, green and blue data of a pixel addressed by the dark filling address, and fills light pixels with, also for example, ⅔ density of red, green and blue data of a pixel addressed by the light filling address. Both the dark pixels and light pixels have darker density in comparison with those of the first output embedding pattern, such as twice as much as in the above-described example. When the two inputs do not coincide, the uniform interpolator 316-4 outputs MR×MR pixels having ⅔ density of red, green and blue data of the target pixel X.

The merger 316-8 merges the firstly received embedding pattern and the secondly received embedding pattern such that the secondly received embedding pattern is overlaid on the firstly received embedding pattern. Accordingly, a lighter pixel covered by a darker pixel becomes non-visible.

Figure 38:
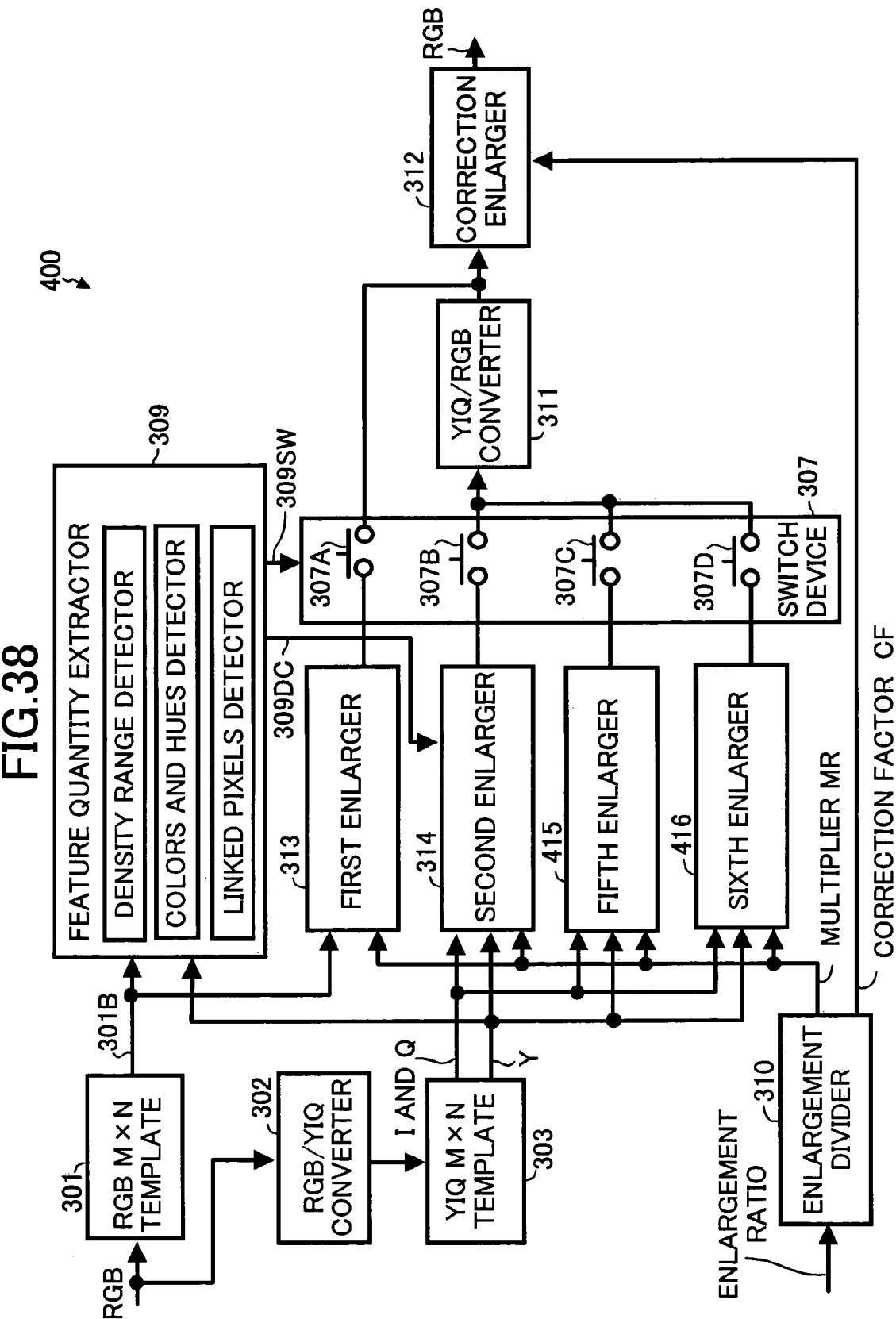
FIG. 38 is a block diagram illustrating a second exemplary color image resolution converting apparatus according to the present invention.

FIG. 38 is a block diagram illustrating another exemplary color image resolution converting apparatus 400 according to the present invention. In FIG. 38, the components that are substantially the same as those in FIG. 33 are denoted by the same reference numerals. With reference to FIG. 38, the color image resolution converting apparatus 400 includes a fifth enlarger 415 and a sixth enlarger 416 instead of the third enlarger 315 and the fourth enlarger 316 in FIG. 33. The fifth enlarger 415 and the sixth enlarger 416 receive the color difference data I and Q from the YIQ M×N template 303. However, they do not receive the red, green and blue data. The fifth enlarger 415 and the sixth enlarger 416 output multiplied pixel data to the YIQ/RGB converter 311 via the switch device 307.

In this example, the fifth enlarger 415 applies a patterned pixel embedding method and is customized for binary text strings and drawings, etc. The sixth enlarger 416 applies a multiple patterned pixel embedding method and is customized for anti-alias processed text strings and drawings, text strings and drawings having shadows, etc.

Figure 39:
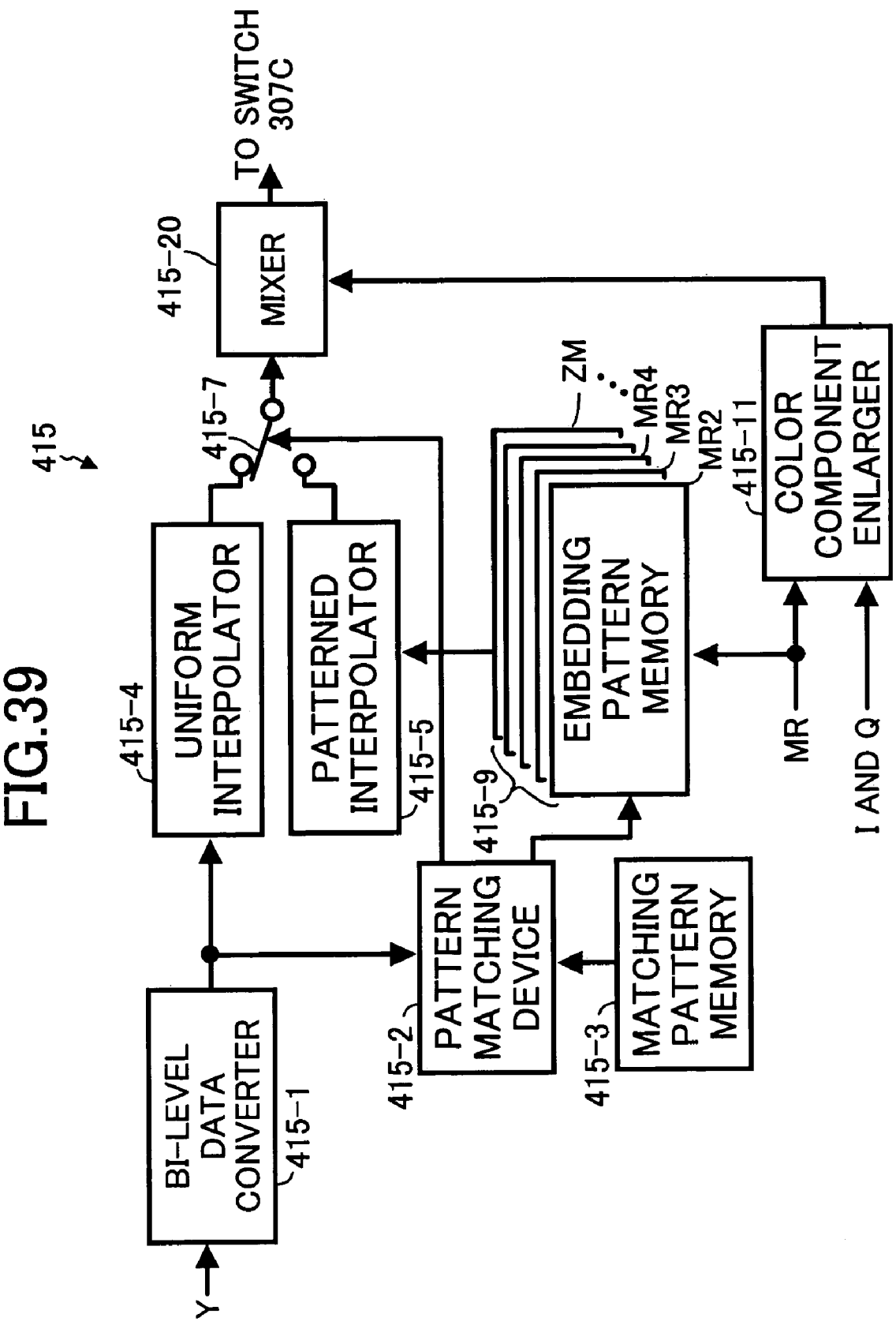
FIG. 39 is a block diagram illustrating a third enlarger of the color image resolution converting apparatus of FIG. 38.

FIG. 39 is a block diagram illustrating the fifth enlarger 415 of the color image resolution converting apparatus 400 of FIG. 38. Referring to FIG. 39, the fifth enlarger 415 includes a bi-level data converter 415-1, a pattern matching device 415-2, a matching pattern memory 415-3, a uniform interpolator 415-4, a patterned interpolator 415-5, a switch 415-7, an embedding pattern memory 415-9, a color component enlarger 415-11, and a mixer 415-20.

The bi-level data converter 415-1 receives luminance data Y of reference pixels including the target pixel X inside the YIQ M×N template 303 of FIG. 38, and converts the received data into bi-level data using a threshold value TH. The bi-level data converter 415-1 then sends the converted bi-level data to the uniform interpolator 415-4 and the pattern matching device 415-2. The embedding pattern memory 415-9 stores plural sets of embedding patterns. Each of the plural sets is denoted as MR2, MR3, MR4, and MZ each corresponding to a minimum multiplier MR value of 2 to a maximum value of MZ. The number of sets is equal to the number of input multiplier MR. In a set of embedding patterns, every embedding pattern has the same number of pixels, and the number is equal to the square of the multiplier (i.e., $MR^2$).

When the enlarging ratio ER for a horizontal direction and the enlarging ratio ER for a vertical direction are different, the number of sets of embedding patterns is increased. The matching pattern memory 415-3 stores a plurality of matching patterns, such as the matching patterns in the table illustrated in FIG. 19. The matching pattern memory 415-3 supplies the plurality of matching patterns one by one according to a predetermined priority. The pattern matching device 415-2 compares the bi-level reference pixel luminance data distribution, which is received from the bi-level converter 415-1, with the matching patterns received from the pattern matching memory 415-3. When the bi-level reference pixel luminance data distribution coincides with one of the matching patterns, the pattern matching device 415-2 outputs a coincidence signal to the embedding pattern memory 415-9. The pattern matching device 415-2 also outputs the coincidence signal to the switch 415-7 to close the path connecting the patterned interpolator 415-5 and the mixer 415-20.

After receiving the coincidence signal, the embedding pattern memory 415-9 sends an embedding pattern, which corresponds to the coincided matching pattern, to the patterned interpolator 415-5. Then, the patterned interpolator 316-5 outputs the embedding pattern to the mixer 415-20 via the closed switch 415-7.

When the bi-level reference pixel luminance data distribution does not coincide with any of the matching patterns, the pattern matching device 415-2 outputs a mismatch signal to the switch 415-7 to close the path connecting the uniform interpolator 415-4 and the mixer 415-20. The uniform interpolator 415-4 unconditionally generates MR×MR pixels having the same luminance data Y as that of the target pixel X. Thus, the uniformly filled embedding pattern is output to the mixer 415-20.

The color component enlarger 415-11 generates MR×MR sets of color difference components I and Q by duplicating those of the target pixel X, and sends the generated color difference components I and Q to the mixer 415-20. The mixer 415-20 mixes the luminance data Y with the same color difference data I and Q, and outputs the result to the switch 307C of FIG. 33.

Figure 40:
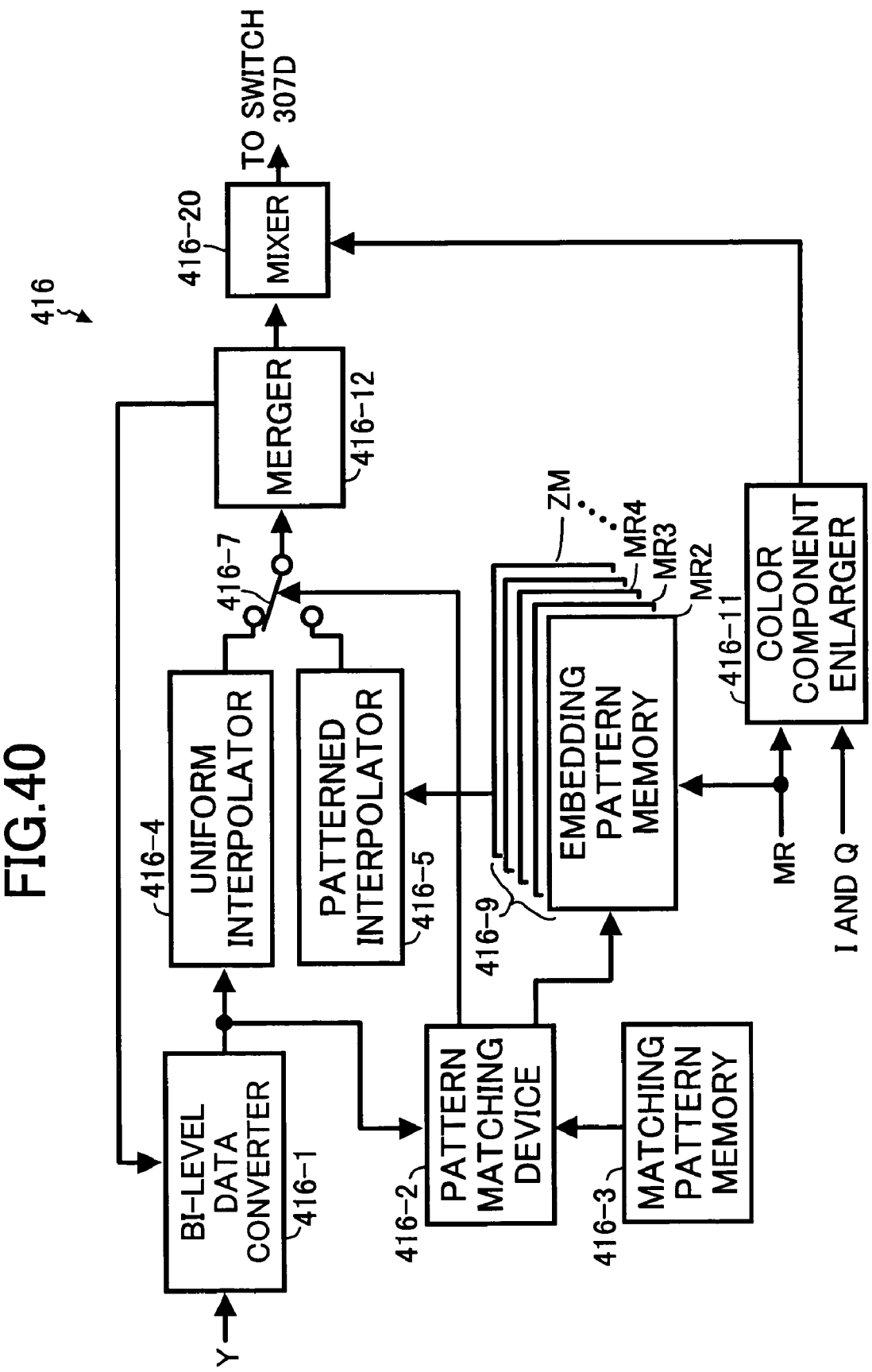
FIG. 40 is a block diagram illustrating a fourth enlarger of the color image resolution converting apparatus of FIG. 38.

FIG. 40 is a block diagram illustrating the sixth enlarger 416 of the color image resolution converting apparatus 400 of FIG. 38. Referring to FIG. 40, the sixth enlarger 416 includes a bi-level data converter 416-1, a pattern matching device 416-2, a matching pattern memory 416-3, a uniform interpolator 416-4, a patterned interpolator 416-5, a switch 416-7, an embedding pattern memory 416-9, a color component enlarger 416-11, a merger 416-12, and a mixer 416-20.

In this example, for a single target pixel X, two embedding patterns are sequentially generated, and then the generated two patterns are merged. In addition, the merged embedding pattern is mixed with color difference component, then the merged and mixed embedding pattern is output to the switch 307D of FIG. 38. As a first step, the bi-level data converter 416-1 receives luminance data Y of the reference pixels including the target pixel X in the YIQ M×N template 303 of FIG. 38. Then, the bi-level data converter 416-1 generates a plurality of threshold values. In this example, the bi-level data converter 416-1 generates two threshold values TH1 and TH2. In addition, the bi-level data converter 416-1 converts the luminance data Y into bi-level data using a first threshold value TH1. The bi-level data converter 416-1 then sends the converted data to the uniform interpolator 416-4 and the pattern matching device 416-2.

The pattern matching device 416-2 compares the bi-level reference pixel luminance data distribution with one of the matching patterns, one by one. When the input bi-level data distribution coincides with one of the matching patterns, the pattern matching device 416-2 outputs a coincidence signal to the embedding pattern memory 416-9 and to the switch 416-7 to close the path connecting the patterned interpolator 416-5 and the merger 416-12.

When the embedding pattern memory 416-9 receives the coincidence signal, the embedding pattern memory 416-9 sends an embedding pattern, with ⅓ luminance Y of the original embedding pattern that corresponds to the coincided matching pattern, to the patterned interpolator 416-5. Then, the patterned interpolator 416-5 outputs the received embedding pattern to the merger 416-12 through the switch 416-7.

The uniform interpolator 416-4 unconditionally generates MR×MR pixels having ⅓ luminance value of the target pixel X for each input target pixel X for the first step. When the bi-level reference pixel luminance data distribution does not coincide with any of the matching patterns, the pattern matching device 416-2 outputs a mismatch signal to the switch 416-7 to close the path connecting the uniform interpolator 416-4 and the merger 416-12. Thus, the uniformly filled embedding pattern is output to the merger 416-12 through the switch 416-7. The merger 416-12 temporally stores the firstly received embedding pattern.

As a second step, the bi-level data converter 416-1 converts luminance data Y of the same reference pixels including the target pixel X into bi-level data using a second threshold value TH2, then sends the converted data to the uniform interpolator 416-4 and the pattern matching device 416-2.

The pattern matching device 416-2 compares the bi-level reference pixel luminance data distribution with the matching patterns received from the pattern matching memory 416-3. When the bi-level reference pixel luminance data distribution coincides with one of the matching patterns, the pattern matching device 416-2 outputs a coincidence signal to the embedding pattern memory 416-9 and to the switch 416-7 to close the path connecting the patterned interpolator 416-5 and the merger 416-12.

When the embedding pattern memory 416-9 receives the coincidence signal, the embedding pattern memory 416-9 sends an embedding pattern, with ⅔ luminance Y of the original embedding pattern that corresponds to the coincided matching pattern, to the patterned interpolator 416-5. Then, the patterned interpolator 416-5 outputs the second embedding pattern to the merger 416-12 through the switch 416-7.

When the bi-level reference pixel luminance data distribution does not coincide any of the matching patterns, the pattern matching device 416-2 outputs an mismatch signal to the switch 416-7 to output MR×MR pixels having ⅔ luminance data Y of the second bi-level target pixel X. Thus, the uniformly filled embedding pattern is output to the merger 416-12. The merger 416-12 merges the firstly received embedding pattern and the secondly received embedding pattern such that the secondly received embedding pattern is overlaid on the firstly received embedding pattern. Therefore, a lighter pixel covered by a darker pixel becomes non-visible. The merger 416-12 then outputs the merged embedding pattern to the mixer 416-20.

The color component enlarger 416-11 generates and sends color difference data I and Q, by duplicating those of the target pixel, to the mixer 416-20. The mixer 416-20 mixes the received luminance data Y and the color difference data I and Q for all the generated pixels. Then, the mixed luminance Y and color difference data I and Q are output to the switch 307D of FIG. 38. Then, the next target pixel data is input to be processed.

Figure 41:
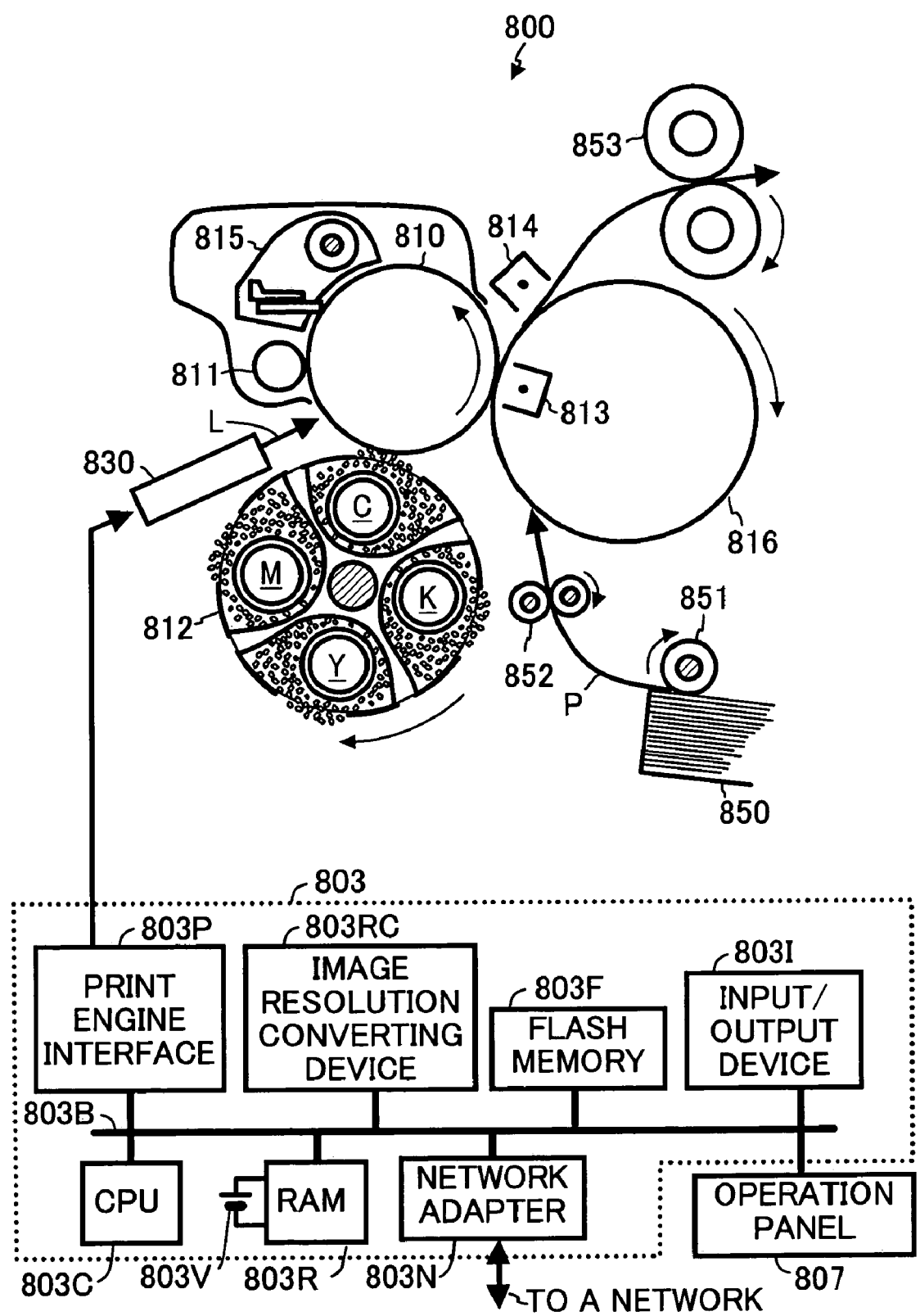
FIG. 41 is a schematic view illustrating an exemplary image forming apparatus configured according to the present invention.

FIG. 41 is a schematic view of a structure of a color image forming apparatus 800 as an example configured according to the present invention. The image forming apparatus 800 includes, a control module 803, an operation panel 807, a photoconductor drum 810, a charging device 811, a revolver color developing device 812, an image transfer device 813, a sheet-separating device 814, a cleaning device 815, a sheet drum 816, a laser scanning device 830, a sheet tray 850, a sheet feed roller 851, a register roller pair 852, and a fixing roller pair 853.

The control module 803 includes an address and data bus 803B, a network adaptor 803N, a central processing unit (CPU) 803C, an image resolution converting device 803RC, a print engine interface 803P, a random accesses memory (RAM) 803R, a flash memory 803F, and an input device 803I. The flash memory 803F stores instruction codes executed by the CPU 803C. The flash memory 803F may be replaced with another types of data storing devices, such as a read-only memory, a hard disk, a CD-ROM, a DVD-ROM, etc. The RAM 803R may have a backup battery 803V.

The revolver color developing device 812 includes a cyan developing module denoted as C, a magenta developing module denoted as M, a yellow developing module denoted as Y, and a black developing module denoted as K. The revolver color developing device 812 rotates clockwise so that each of the color developing modules C, M, Y and K can face to the photoconductive drum 810 to develop a latent image on the drum 800 with the respective color developer.

An image forming operation is performed as the followings. The control module 803 receives a print command accompanying color print data from an external apparatus, such as a personal computer, via a network and the network adaptor 803N. When the received print command includes an image resolution converting instruction, the CPU 803C sends the received color print data and image resolution converting instruction to the image resolution converting device 803RC. The image resolution converting device 803RC includes substantially the same structure and function as that of the image resolution converting apparatus 300 of FIG. 33 or image resolution converting apparatus 400 of FIG. 38. Therefore, the image resolution converting device 803RC converts the input print data having a relatively low image resolution, such as 72 dots per inch, into print data having the same image resolution of the color image forming apparatus 800, such as 600 dots per inch.

Then, the control module 803 activates a motor (not shown). The motor rotates the photoconductive drum 810 counterclockwise. The electrical charging device 811 then charges the surface of the photoconductive drum 810 at a substantially uniform voltage. Then the CPU 803C sends first color pixel data, such as cyan pixel data, of the resolution converted print data to the laser scanning device 830 via the bus 803B and the print engine interface 803P from the image resolution converting device 803RC. The charged photoconductive drum 810 is then exposed by a laser scanning beam denoted as L by the laser scanning device 830 according to the received color pixel data. Thus, an electrostatic latent image having relatively high image resolution is formed on the photoconductive drum 810.

After that, the developing device 812 develops the electrostatic latent image with the first color developer, and thus a toner image, such as a cyan image is formed on the photoconductive drum 810.

Meanwhile the sheet feed roller 851 and the register roll pair 852 convey a sheet of paper P from the sheet tray 850 toward the sheet drum 816, and the sheet drum 816 bears the sheet P on the circumference thereof. Then the toner image on the photoconductive drum 810 arrives a position where the sheet P being carried by the sheet drum 816 and the image transfer device 813 oppose each other. While the sheet P is conveyed at a substantially same speed of the circumferential speed of the photoconductive drum 810, a power supply supplies image transfer device 813 with an appropriate voltage with the polarity of the voltage is counter to a polarity of the electrically charged toner particles. Thereby, the first toner image on the photoconductive drum 810 is attracted toward the sheet P and transferred to the sheet P.

The toner particles remained on the photoconductive drum 810, i.e., toner particles which have not been transferred to the sheet P, are removed by the drum-cleaning device 815. After the cleaning operation, the electrical charging device 811 again charges the surface of the photoconductive drum 810 at a substantially uniform voltage for beginning a second color image forming. The color image forming processes for remaining color are repeated in substantially the same manner as in the first color image forming operation, and thus a four color toner image is formed on the sheet P carried on the sheet drum 816.

The power supply supplies the sheet-separating device 814 with an appropriate voltage, such as a DC biased AC voltage. Thereby, the sheet-separating device 814 separates the sheet P from the sheet drum 816. The sheet P having the transferred four color toner image thereon is conveyed to the fixing roll pair 853 where the toner image is fixed on the sheet P, and then the sheet P having relatively high resolution toner image is discharged outside the color image forming apparatus 800 as a printed sheet.

As described above, the novel method, computer readable medium and apparatus for converting color image resolution, convert a relatively low resolution image into a relatively high resolution image while reducing jaggedness at an image boundary and while providing a continuous toned color image.

In addition, the novel method, computer readable medium and apparatus for converting color image resolution, converts a relatively low resolution image into a relatively high resolution image in a relatively short time.

Further, the novel method, computer readable medium and apparatus for converting color image resolution, converts a relatively low resolution image into a relatively high resolution image while reducing improper coloring and blurring at an image boundary.

Numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

This document is based on Japanese patent application No. 11-126021 filed in the Japanese Patent Office on May 6, 1999, Japanese patent application No. 11-276996 filed in the Japanese Patent Office on Sep. 29, 1999, and Japanese patent application No. 11-295819 filed in the Japanese Patent Office on Oct. 18, 1999, the entire contents of which are incorporated herein by reference.

What is claimed as new and is desired to be secured by Letters Patent of the United States is:

1. A method for converting color image resolution comprising:
    inputting an image enlarging ratio;
    inputting target pixel data of an image in a first color space to be enlarged in a sequence;
    sampling reference pixels including the target pixel and pixels at least one of which links to the target pixel;
    converting the reference pixel data into a second color space data;
    extracting image feature quantities from the reference pixel data;
    selecting one of a plurality of pixel multiplying methods according to the extracted image feature quantities;
    multiplying the target pixel by the selected image multiplying method with an integer value based on the input image enlarging ratio; and
    outputting pixel data that have been generated by the target pixel multiplying step in a sequence, wherein
    the plurality of pixel multiplying methods comprise at least two of a uniform pixel multiplying method, a linear interpolation method, a patterned pixel embedding method, and a multiple patterned pixel embedding method.

2. A method for converting color image resolution comprising:
    inputting an image enlarging ratio;
    inputting target pixel data of an image in a first color space to be enlarged in a sequence;
    sampling reference pixels including the target pixel and pixels at least one of which links to the target pixel;
    converting the reference pixel data into a second color space data;
    extracting image feature quantities from the reference pixel data;
    selecting one of a plurality of pixel multiplying methods according to the extracted image feature quantities;
    multiplying the target pixel by the selected image multiplying method with an integer value based on the input image enlarging ratio;
    outputting pixel data that have been generated by the target pixel multiplying step in a sequence;
    determining a multiplier being an integer value and a correction factor of which product is substantially identical with the input image enlarging ratio; and
    adjusting a number of pixels, which are generated in the pixel multiplying step, by at least one of inserting pixels and deleting pixels based on the correction factor.

3. The method according to one of claims 1 and 2 wherein one of the image feature quantities is a number of colors of the reference pixels.

4. The method according to one of claims 1 and 2, wherein ones of the image feature quantities are a number of colors and a number of hues of the reference pixels.

5. The method according to one of claims 1 and 2, wherein ones of the image feature quantities are a number of colors and a number of hues of the reference pixels, and linking information on the reference pixels.

6. The method according to claim 2, wherein inserting pixels in the pixel number adjusting step is performed by inserting a pixel that is identical with a nearest neighboring pixel.

7. A color image resolution converting apparatus comprising:
- an enlarging ratio input device configured to input an image enlarging ratio;
- an image data input device configured to input target pixel data of an image in a first color space to be enlarged in a sequence;
- a pixel sampling device configured to sample reference pixels including the target pixel and pixels at least one of which links to the target pixel;
- a color space converting device configured to convert the reference pixel data into a second color space data;
- a feature quantity extracting device configured to extract image feature quantities from the reference pixel data;
- a plurality of pixel multiplying devices each of which configured to generate pixels by multiplying the target pixel with an integer value based on the input image enlarging ratio in different manners respectively;
- a multiplying device selecting device configured to select one of outputs of the plurality of pixel multiplying devices according to the extracted image feature quantities; and
- an image data output device configured to output the selected pixels, wherein
- the plurality of pixel multiplying devices comprise at least two of a uniform pixel multiplying device, a linear interpolation device, a patterned pixel embedding device, and a multiple patterned pixel embedding device.

8. A color image resolution converting apparatus comprising:
- an enlarging ratio input device configured to input an image enlarging ratio;
- an image data input device configured to input target pixel data of an image in a first color space to be enlarged in a sequence;
- a pixel sampling device configured to sample reference pixels including the target pixel and pixels at least one of which links to the target pixel;
- a color space converting device configured to convert the reference pixel data into a second color space data;
- a feature quantity extracting device configured to extract image feature quantities from the reference pixel data;
- a plurality of pixel multiplying devices each of which configured to generate pixels by multiplying the target pixel with an integer value based on the input image enlarging ratio in different manners respectively;
- a multiplying device selecting device configured to select one of outputs of the plurality of pixel multiplying devices according to the extracted image feature quantities;
- an image data output device configured to output the selected pixels;
- an enlarging ratio divider configured to determine a multiplier being an integer value and a correction factor of which product is substantially identical with the input image enlarging ratio; and
- a correction enlarging device configured to adjust a number of pixels, which are generated by the pixel multiplying devices, by at least one of inserting pixels and deleting pixels based on the correction factor.

9. The apparatus according to one of claims 7 and 8, wherein the feature quantity extracting device extracts a number of colors of the reference pixels as one of the image feature quantities.

10. The apparatus according to one of claims 7 and 8, wherein the feature quantity extracting device extracts a number of colors and a number of hues of the reference pixels as ones of the image feature quantities.

11. The apparatus according to one of claims 7 and 8, wherein the feature quantity extracting device extracts a number of colors and a number of hues of the reference pixels, and linking information on the reference pixels as ones of the image feature quantities.

12. The apparatus according to claim 8, wherein inserting pixels is performed by inserting a pixel that is identical with a nearest neighboring pixel by the correction enlarging device.

* * * * *